US009344276B2

(12) United States Patent
Kawai et al.

(10) Patent No.: US 9,344,276 B2
(45) Date of Patent: May 17, 2016

(54) CRYPTOGRAPHIC SYSTEM, RE-ENCRYPTION KEY GENERATION DEVICE, RE-ENCRYPTION DEVICE, CRYPTOGRAPHIC METHOD, AND CRYPTOGRAPHIC PROGRAM

(71) Applicants: Yutaka Kawai, Tokyo (JP); Katsuyuki Takashima, Tokyo (JP)

(72) Inventors: Yutaka Kawai, Tokyo (JP); Katsuyuki Takashima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/424,109

(22) PCT Filed: Jan. 16, 2013

(86) PCT No.: PCT/JP2013/050653
§ 371 (c)(1),
(2) Date: Feb. 26, 2015

(87) PCT Pub. No.: WO2014/112048
PCT Pub. Date: Jul. 24, 2014

(65) Prior Publication Data
US 2015/0318988 A1        Nov. 5, 2015

(51) Int. Cl.
*H04L 29/06*        (2006.01)
*H04L 9/08*         (2006.01)
(Continued)

(52) U.S. Cl.
CPC ............ *H04L 9/0861* (2013.01); *H04L 9/3073* (2013.01); *H04L 9/3247* (2013.01); *H04L 2209/76* (2013.01)

(58) Field of Classification Search
USPC ........................................................ 380/44
See application file for complete search history.

(56) References Cited

U.S. PATENT DOCUMENTS 8,094,810 B2    1/2012  Hohenberger et al.
8,688,973 B2 *  4/2014  Kerschbaum ........... H04L 9/002
                                                              380/282
(Continued)

FOREIGN PATENT DOCUMENTS

JP    2008-054315 A    3/2008
JP    2008-172736 A    7/2008
(Continued)

OTHER PUBLICATIONS

International Search Report issued Apr. 2, 2013 in PCT/JP2013/050653 filed Jan. 16, 2013.
(Continued)

*Primary Examiner* — Jason Lee
(74) *Attorney, Agent, or Firm* — Oblon, McClelland, Maier & Neustadt, L.L.P.

(57) ABSTRACT

It is an object to implement a functional proxy re-encryption scheme. A decryption device 300 transmits to a re-encryption device 400 a decryption key $k^{*rk}$ which is generated by converting, using conversion information $W_1$, a decryption key $k^*$ in which is set one of attribute information x and attribute information v corresponding to each other, and encrypted conversion information $\psi^{rk}$ which is generated by encrypting the conversion information $W_1$ with one of attribute information x' and attribute information v' corresponding to each other being set. The re-encryption device 400 generates a re-encrypted ciphertext CT, constituted by a ciphertext $c^{renc}$ which is generated by setting at least one of additional information H and additional information Θ corresponding to each other in a ciphertext $c^{enc}$ in which is set the other one of the attribute information x and the attribute information v, and a decryption key $k^{*renc}$ which is generated by setting at least the other one of the additional information H and the additional information Θ in the decryption key $k^{*rk}$.

10 Claims, 30 Drawing Sheets

(51) Int. Cl.
*H04L 9/30* (2006.01)
*H04L 9/32* (2006.01)

(56) References Cited

U.S. PATENT DOCUMENTS

| | | | |
|---|---|---|---|
| 8,873,754 B2* | 10/2014 | Xu | H04L 9/0861 380/255 |
| 8,938,623 B2 | 1/2015 | Takashima et al. | |
| 2008/0170701 A1 | 7/2008 | Matsuo et al. | |

FOREIGN PATENT DOCUMENTS

| | | |
|---|---|---|
| JP | 2011-055309 A | 3/2011 |
| JP | 2011-147047 A | 7/2011 |
| JP | 2012-133214 A | 7/2012 |
| JP | 2012-150378 A | 8/2012 |
| JP | 2012-150399 A | 8/2012 |

OTHER PUBLICATIONS

Matthew Green, et al., "Identity-Based Proxy Re-encryption," Applied Cryptography and Network Security, vol. 4521 of LNCS, 2007, Total 21 pages.
Xiaohui Liang, et al., "Attribute Based Proxy Re-encryption with Delegating Capabilities," ASIACCS '09, Mar. 2009, pp. 276-286.
Tatsuaki Okamoto, et al., "Decentralized Attribute-Based Signatures," ePrint, http://eprint.iacr.org/2011/701, cover and pp. 1-57.
Tatsuaki Okamoto, et al., "Fully Secure Unbounded Inner-Product and Attribute-Based Encryption," ePrint http://eprint.iacr.org/2012/671, pp. 1-90.
Tatsuaki Okamoto, et al., "Achieving Short Ciphertexts or Short Secret-Keys for Adaptively Secure General Inner-Product Encryption," CANS 2011, LNCS vol. 7092, 2011, pp. 138-159.
Tatsuaki Okamoto, et al., "A Modular Approach in Inner-Product Encryption with Short Ciphertexts or Short Secret-Keys," 2012 Nen Symposium on Cryptography and Information Security, SCIS2012, Jan. 30, 2012, pp. 1-4, index and cover page.
Katsuyuki Takashima, et al., "Recent Progresses of Functional Encryption Technology for Cloud," Mitsubishi Denki Giho, vol. 86, No. 7, Jul. 25, 2012, pp. 12-15.
Kazuya Matsuda, et al., "Key-Private Identity-Based Proxy Re-Encryption," 2011 Nen Symposium on Cryptography and Information Security, SCIS2011, Jan. 25, 2011, pp. 1-8, index (2 pages), and cover page.
Yutaka Kawai, et al., "Functional Proxy-Re-Encryption," 2013 Nen Symposium on Cryptography and Information Security, SCIS2013, Jan. 22, 2013, pp. 1-8, index and cover page.
Matt Blaze, et al., "Divertible Protocols and Atomic Proxy Cryptography," EUROCRYPT 1998, vol. 1403 of LNCS, Springer 1998, Total 18 pages.
Giuseppe Ateniese, et al., "Improved Proxy Re-encryption Schemes with Applications to Secure Distributed Storage," NDSS, 2005 (full version at "Applications to Secure Distributed Storage," ACM Transactions on Information and System Security, vol. 9, No. 1, Feb. 2006, pp. 1-30).
Toshihiko Matsuo, "Proxy Re-encryption Systems for Identity-based Encryption," Pairing-Based Cryptography—Pairing 2007, vol. 4575 of LNCS, 2007, Total 21 pages.
Ran Canetti, et al., "Chosen-Ciphertext Secure Proxy Re-Encryption," Proceedings of the 14th ACM Conference on Computer and Communications Security, Oct. 23, 2007, Total 22 pages.
Benoit Libert, et al., "Unidirectional Chosen-Ciphertext Secure Proxy Re-Encryption," Public Key Cryptography PKC 2008, vol. 4939 of LNCS, 2008, Total 27 pages.
Robert H. Deng, et al., "Chosen-Ciphertext Secure Proxy Re-encryption without Pairings," CANS 2008, vol. 5339 of LNCS, Springer-Verlag 2008, pp. 1-17.
Xu an Wang, et al., "On the Role of PKG for Proxy Re-encryption in Identity Based Setting," IACR Cryptology ePrint Archive 2008/410, pp. 1-41.
Sherman S.M. Chow, et al., "Efficient Unidirectional Proxy Re-Encryption," AFRICACRYPT 2010, vol. 6055 of LNCS, 2010, Total 26 pages.
Song Luo, et al., "New Construction of Identity-based Proxy Re-encryption," Proceedings of the 10th Annual ACM Workshop on Digital Rights Management, 2010, Total 9 pages.
Jun-Zuo Lai, et al., "New Constructions for Identity-Based Unidirectional Proxy Re-Encryption," Journal of Computer Science and Technology, vol. 25, No. 4, Springer 2010, pp. 793-806.
Keita Emura, et al., "An Identity-Based Proxy Re-Encryption Scheme with Source Hiding Property, and its Application to a Mailing-List System," EuroPKI 2010, vol. 6711 of LNCS, 2010, pp. 77-92.
Toshihide Matsuda, et al., "CCA Proxy Re-Encryption without Bilinear Maps in the Standard Model," PKC 2010, vol. 6056 of LNCS, 2010, pp. 261-278.
Jun Shao, et al., "CCA-Secure Proxy Re-Encryption without Pairings," PKC 2009, vol. 5443 of LNCS, 2009, Total 20 pages.
Xi Zhang, et al., "Comments on Shao-Cao's Unidirectional Proxy Re-Encryption Scheme from PKC 2009," Cryptology ePrint Archive, Report 2009/344, 2009, pp. 1-9.
Jian Weng, et al., "On the Security of a Bidirectional Proxy Re-Encryption Scheme from PKC 2010," PKC'11, vol. 6571 of LNCS, 2011, Total 10 pages.
Ryotaro Hayashi, et al., "Unforgeability of Re-Encryption Keys against Collusion Attack in Proxy Re-Encryption," IWSEC'11, vol. 7038 of LNCS, 2011, pp. 210-229.
Goichiro Hanaoka, et al., "Generic Construction of Chosen Ciphertext Secure Proxy Re-Encryption," CT-RSA'12, vol. 7178 of LNCS, 2012, Total 16 pages.
Jonathan Katz, et al., "Predicate Encryptiion Supporting Disjunctions, Polynomial Equations, and Inner Prodcuts," EUROCRYPT 2008, vol. 4965 of LNCS, 2008, Total 28 pages.
Tatsuaki Okamoto, et al., "Hierarchical Predicate Encryption for Inner-Products," ASIACRYPT 2009, vol. 5912 of LNCS, 2009, pp. 214-231 and 3 cover pages.
Allison Lewko, et al., "Fully Secure Functional Encryption: Attribute-Based Encryption and (Hierarchical) Inner Product Encryption," EUROCRYPT 2010, vol. 6110 of LNCS, 2010, Total 57 pages.
Tatsuaki Okamoto, et al., "Fully Secure Functional Encryption with General Relations from the Decisional Linear Assumption," CRYPTO 2010, vol. 6223 of LNCS, 2010, pp. 191-208.
Tatsuaki Okamoto, et al., "Adaptively Attribute-Hiding (Hierarchical) Inner Product Encryption," David Pointcheval and Thomas Johansson, editors, Eurocrypt 2010, vol. 7237 of LNCS, 2012, Total 39 pages.

* cited by examiner

Fig. 3

$$s_0 = \underbrace{(1,\ldots,1)}_{r\text{ COLUMNS}} \begin{pmatrix} f_1 \\ \vdots \\ f_r \end{pmatrix} = \sum_{k=1}^{r} f_k$$

Fig. 4

$$\vec{s}^T = \underbrace{\begin{pmatrix} M_{1,1} & M_{1,2} & \cdots & M_{1,r} \\ M_{2,1} & M_{2,2} & \cdots & M_{2,r} \\ & & \cdots & \\ M_{L,1} & M_{L,2} & \cdots & M_{L,r} \end{pmatrix}} \begin{pmatrix} f_1, & \cdots & , f_r \end{pmatrix} = \begin{pmatrix} s_1, & \cdots & , s_L \end{pmatrix}$$

CRYPTOGRAPHIC SYSTEM, RE-ENCRYPTION KEY GENERATION DEVICE, RE-ENCRYPTION DEVICE, CRYPTOGRAPHIC METHOD, AND CRYPTOGRAPHIC PROGRAM

TECHNICAL FIELD

The present invention relates to functional proxy re-encryption (FPRE).

BACKGROUND ART

Proxy re-encryption (PRE) is a system which allows decryption rights for ciphertexts to be delegated to third parties without decrypting the ciphertexts. Non-Patent Literature 1 discusses an identity-based PRE (IBPRE) scheme. Non-Patent Literature 2 discusses an attribute-based PRE (AB-PRE) scheme. According to the PRE scheme discussed in Non-Patent Literature 2, only attributes consisting of AND and negative elements can be specified for ciphertexts.

Patent Literature 1 discusses functional encryption (FE).

CITATION LIST

Patent Literature

Patent Literature 1: JP 2012-133214 A

Non-Patent Literature

Non-Patent Literature 1: M. Green, and G. Ateniese, Identity-Based Proxy Re-encryption. In Applied Cryptography and Network Security. volume 4521 of LNCS, pp 288-306, 2007.
Non-Patent Literature 2: Xiaohui Liang, Zhenfu Cao, Huang Lin, Jun Shao. Attribute based proxy re-encryption with delegating capabilities. ASIA CCS 2009 pp. 276-286.
Non-Patent Literature 3: Okamoto, T Takashima, K.: Decentralized Attribute-Based Signatures. ePrint http://eprint.iacr.org/2011/701
Non-Patent Literature 4: Okamoto, T Takashima, K.: Fully Secure Unbounded Inner-Product and Attribute-Based Encryption. ePrint http://eprint.iacr.org/2012/671
Non-Patent Literature 5: Okamoto, T., Takashima, K.: Achieving Short Ciphertexts or Short Secret-Keys for Adaptively Secure General Inner-Product Encryption. CANS 2011, LNCS, vol. 7092, pp. 138-159 Springer Heidelberg (2011)

SUMMARY OF INVENTION

Technical Problem

There has been no implementation of an FPRE scheme.

For PRE schemes that have been implemented, there has been a problem, which is that third parties to whom delegation is possible with a single re-encryption key are limited to only a single user or users having very restricted attributes.

It is an object of the present invention to provide a PRE scheme which allows flexible selection of third parties to whom delegation is possible with a single re-encryption key.

Solution to Problem

A cryptographic system according to the present invention implements a proxy re-encryption function in a cryptographic scheme according to which when two pieces of information correspond to each other, a ciphertext in which is set one of the two pieces of information can be decrypted with a decryption key in which is set the other one of the two pieces of information, and includes a re-encryption key generation device and a re-encryption device, wherein the re-encryption key generation device includes a decryption key $k^{*rk}$ generation part that generates a decryption key $k^{*rk}$ by converting, using conversion information $W_1$, a decryption key $k^*$ in which is set one of attribute information x and attribute information v corresponding to each other;

a conversion information $W_1$ encryption part that generates encrypted conversion information $\psi^{rk}$ by encrypting the conversion information $W_1$ with one of attribute information x' and attribute information v' corresponding to each other being set; and a re-encryption key transmission part that transmits to the re-encryption device the decryption key $k^{*rk}$ and the encrypted conversion information $\psi^{rk}$, as a re-encryption key rk; and wherein the re-encryption device includes a ciphertext receiving part that receives a ciphertext $c^{enc}$ in which is set the other one of the attribute information x and the attribute information v;

a ciphertext $c^{renc}$ generation part that generates a ciphertext $c^{renc}$ by setting at least one of additional information H and additional information Θ corresponding to each other in the ciphertext $c^{enc}$ received by the ciphertext receiving part;

a decryption key $k^{*renc}$ generation part that generates a decryption key $k^{*renc}$ by setting at least the other one of the additional information H and the additional information Θ in the decryption key $k^{*rk}$ included in the re-encryption key rk; and a re-encrypted ciphertext transmission part that transmits the ciphertext $c^{renc}$, the decryption key $k^{*renc}$, and the encrypted conversion information $\psi^{rk}$, as a re-encrypted ciphertext CT.

Advantageous Effects of Invention

A cryptographic system according to the present invention can implement an FPRE scheme. Thus, a single re-encryption key can be used to forward a ciphertext to a set of various types of users. Specifically, a general non-monotonic access structure can be embedded in a re-encryption key, allowing flexible forwarding settings without restrictions on forwarding destination users.

BRIEF DESCRIPTION OF DRAWINGS

FIG. 3 is an explanatory drawing of $s_0$;
FIG. 4 is an explanatory drawing of $\vec{s}^T$.

DESCRIPTION OF EMBODIMENTS

Figure 1:
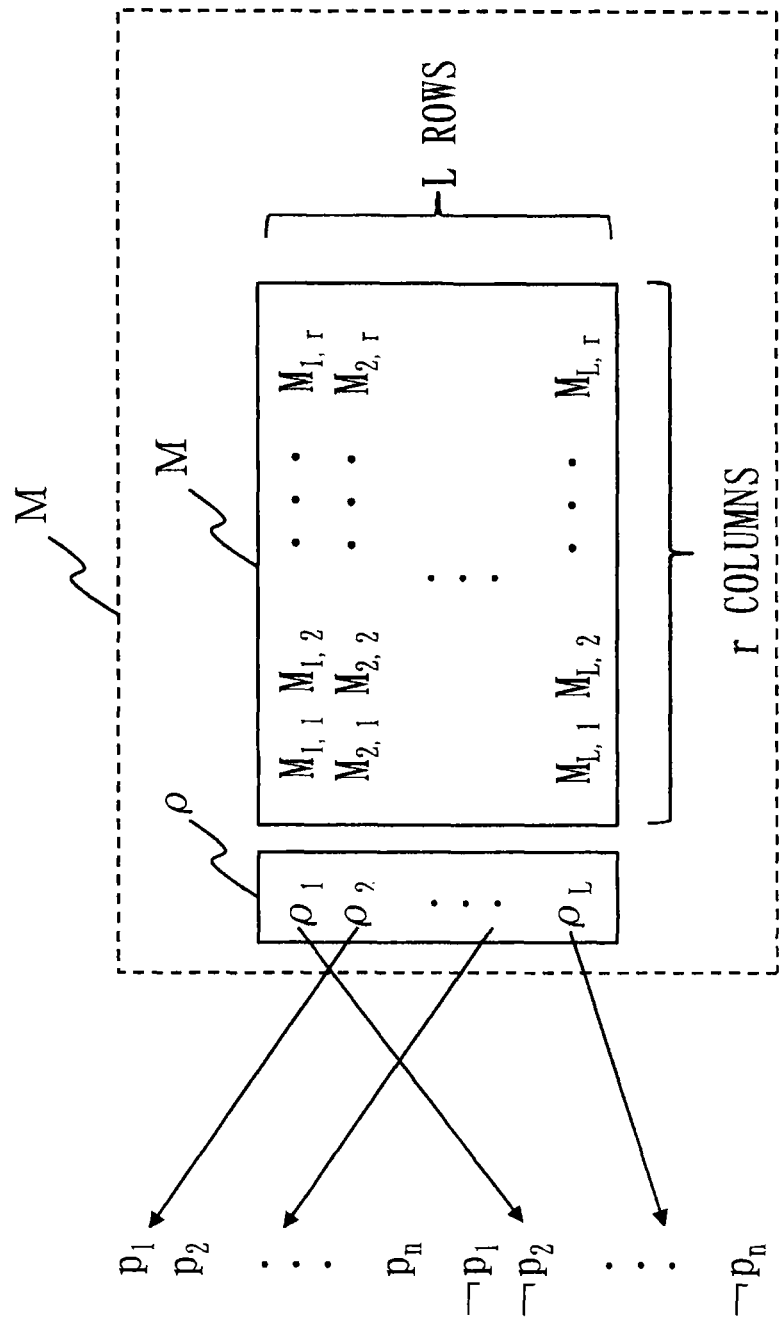
FIG. 1 is an explanatory drawing of a matrix M^.

Embodiments of the present invention will be described hereinafter with reference to the accompanying drawings.

In the following description, a processing device is a CPU 911 or the like to be described later. A storage device is a ROM 913, a RAM 914, a magnetic disk 920 or the like to be described later. A communication device is a communication board 915 or the like to be described later. An input device is a keyboard 902, the communication board 915 or the like to be described later. That is, the processing device, the storage device, the communication device, and the input device are hardware.

Notations to be used in the following description will be described.

When A is a random variable or distribution, Formula 101 denotes that y is randomly selected from A according to the distribution of A. That is, y is a random number in Formula 101.

$$y \xleftarrow{R} A \quad \text{[Formula 101]}$$

When A is a set, Formula 102 denotes that y is uniformly selected from A. That is, y is a uniform random number in Formula 102.

$$y \xleftarrow{U} A \quad \text{[Formula 102]}$$

Formula 103 denotes that y is a set defined or substituted by z.

$$y := z \quad \text{[Formula 103]}$$

When a is a fixed value, Formula 104 denotes that a machine (algorithm) A outputs a on input x.

$$A(x) \to a \quad \text{[Formula 104]}$$

For example, $$A(x) \to 1$$

Formula 105, namely $F_q$, denotes a finite field of order q.

$$\mathbb{F}_q \quad \text{[Formula 105]}$$

A vector symbol denotes a vector representation over the finite field $F_q$, as indicated in Formula 106.

[Formula 106]

$\vec{x}$ denotes $$(x_1, \ldots, x_n) \in \mathbb{F}_q^n.$$

Formula 107 denotes that the inner-product, indicated in Formula 109, of two vectors $\vec{x}$ and $\vec{v}$ indicated in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n) \quad \text{[Formula 108]}$$

$$\Sigma_{i=1}^n x_i v_i \quad \text{[Formula 109]}$$

Note that $X^T$ denotes the transpose of a matrix X.

For a basis B and a basis B* indicated in Formula 110, Formula 111 is established.

$$\mathbb{B} := (b_1, \ldots, b_N),$$

$$\mathbb{B} := (b^*_1, \ldots, b^*_N) \quad \text{[Formula 110]}$$

$$(x_1, \ldots, x_N)_{\mathbb{B}} := \Sigma_{i=1}^N x_i b_i,$$

$$(y_1, \ldots, y_N)_{\mathbb{B}^*} := \Sigma_{i=1}^N y_i b^*_i \quad \text{[Formula 111]}$$

Note that $\vec{e}_j$ denotes an orthonormal basis vector indicated in Formula 112.

$$\vec{e}_j := (\overbrace{0 \ldots 0}^{j-1}, 1, \overbrace{0 \ldots 0}^{n-j}) \in \mathbb{F}_q^n \text{ for } j = 1, \ldots, n, \quad \text{[Formula 112]}$$

In the following description, when "Vt", "nt", "ut", and "zt" are each represented as a subscript or superscript, these Vt, nt, ut and, zt respectively denote $V_t$, $n_t$, $u_t$, and $z_t$. Likewise, when "δi,j" is represented as a superscript, this δi,j denotes $\delta_{i,j}$.

When "→" denoting a vector is attached to a subscript or superscript, it is meant that this "→" is attached as a superscript to the subscript or superscript.

In the following description, cryptographic processes include a key generation process, an encryption process, a re-encryption key generation process, a re-encryption process, a decryption process, and a re-encrypted ciphertext decryption process.

Embodiment 1

This embodiment describes a basic concept for implementing an FPRE scheme, and then describes a structure of the FPRE scheme according to this embodiment.

First, FPRE will be briefly described.

Second, a space having a rich mathematical structure called "dual pairing vector spaces (DPVS)" which is a space for implementing the FPRE scheme will be described.

Third, a concept for implementing the FPRE scheme will be described. Here, a span program, an inner-product of attribute vectors and an access structure, and a secret distribution scheme (secret sharing scheme) will be described.

Fourth, the FPRE scheme according to this embodiment will be described. In this embodiment, a ciphertext-policy FPRE scheme (CP-FPRE) scheme will be described. First, a basic structure of the CP-FPRE scheme will be described. Then, a basic configuration of a cryptographic processing system 10 that implements the CP-FPRE scheme will be described. Then, items used for implementing the CP-FPRE scheme will be described. Then, the CP-FPRE scheme and the cryptographic processing system 10 according to this embodiment will be described in detail.

<1. FPRE>

FPRE is a proxy re-encryption scheme which provides more sophisticated and flexible relations among an encryption key (ek), a decryption key (dk), and a re-encryption key (rk).

FPRE has the following two properties. First, attribute information x and attribute information v are respectively set in an encryption key and a decryption key. If and only if a relation $R(x, v)$ holds, a decryption key $dk_v$ can decrypt a ciphertext encrypted with an encryption key $ek_x$. Second, in addition to the attribute information x and the attribute information v being respectively set in the encryption key and the decryption key, two pieces of attribute information (x', v) are set in a re-encryption key. If and only if $R(x, v)$ holds, a re-encryption key $rk_{(x',v)}$ can transform a ciphertext encrypted with the encryption key $ek_x$ to a ciphertext which can be decrypted with a decryption key $dk_{v'}$ with which $R(x', v')$ holds, that is, to a ciphertext encrypted with an encryption key $ek_{x'}$.

In a case where $R(x, v)$ holds if and only if a relation R is an equality relation, i.e., x=v, this PRE scheme is IDPRE.

ABPRE is available as more generalized PRE than IDPRE. In ABPRE, attribute information which is set in an encryption key and attribute information which is set in a decryption key are each a set of attribute information. For example, the attribute information which is set in the encryption key is $X:=(x_1, \ldots, x_d)$, and the attribute information which is set in the decryption key is $V:=(v_1, \ldots, v_d)$.

An equality relation for each pair of components of the attribute information (for example, $\{x_t=v_t\}t\in\{1, \ldots, d\}$) is inputted to an access structure S, and $R(X, V)$ holds if and only if the access structure accepts this input. That is, a ciphertext encrypted with the encryption key can be decrypted with the decryption key. Non-Patent Literature 2 proposes a ciphertext-policy PRE scheme according to which an access structure S is embedded in a ciphertext. The access structure in this case consists of only AND and negative elements.

There is ordinary FE in which a ciphertext forwarding function does not exist, that is, a re-encryption key does not exist. In FE, a re-encryption key and a re-encryption process do not exist, and attribute information x and attribute information v are respectively set in an encryption key and a decryption key. If and only if a relation $R(x, v)$ holds, a decryption key $dk_v:=(dk, v)$ can decrypt a ciphertext encrypted with an encryption key $ek_x:=(ek, x)$.

<2. Dual Pairing Vector Spaces>

First, symmetric bilinear pairing groups will be described.

Symmetric bilinear pairing groups $(q, G, G^T, g, e)$ are a tuple of a prime q, a cyclic additive group G of order q, a cyclic multiplicative group $G^T$ of order q, $g\neq 0\in G$, and a polynomial-time computable nondegenerate bilinear pairing $e: G \times G \to G_T$. The nondegenerate bilinear pairing signifies $e(sg, tg)=e(g, g)^{st}$, and $e(g, g)\neq 1$.

In the following description, let $G_{bpg}$ be an algorithm that takes as input $1^\lambda$ and outputs values of a parameter $param_G:=(q, G, G_T, g, e)$ of bilinear pairing groups with a security parameter $\lambda$.

Dual pairing vector spaces will now be described.

Dual pairing vector spaces $(q, V, G_T, A, e)$ can be constructed by a direct product of the symmetric bilinear pairing groups $(param_G:=(q, G, G_T, g, e))$. The dual pairing vector spaces $(q, V, G_T, A, e)$ are a tuple of a prime q, an N-dimensional vector space V over $F_q$ indicated in Formula 113, a cyclic group $G_T$ of order q, and a canonical basis $A:=(a_1, \ldots, a_N)$ of the space V, and have the following operations (1) and (2), where $a_i$ is as indicated in Formula 114.

$$\mathbb{V} := \overbrace{\mathbb{G} \times \ldots \times \mathbb{G}}^{N} \quad \text{[Formula 113]}$$

$$a_i := (\overbrace{0, \ldots, 0}^{i-1}, g, \overbrace{0, \ldots, 0}^{N-i}) \quad \text{[Formula 114]}$$

Operation (1): Nondegenerate Bilinear Pairing

A pairing in the space V is defined by Formula 115.

$$e(x,y):=\Pi_{i=1}^N e(G_i, H_i) \in \mathbb{G}_T \quad \text{[Formula 115]}$$

where $(G_1, \ldots, G_N):=x \in \mathbb{V}$, $(H_1, \ldots, H_N):=y \in \mathbb{V}$.

This is nondegenerate bilinear, that is, $e(sx, ty)=e(x, y)^{st}$ and if $e(x, y)=1$ for all $y \in V$, then $x=0$. For all i and j, $e(a_i, a_j)=e(g, g)^{\delta_{i,j}}$, where $\delta_{i,j}=1$ if i=j, and $\delta_{i,j}=0$ if i≠j, and $e(g, g)\neq 1\in G_T$.

Operation (2): Distortion Maps

Linear transformations $\phi_{i,j}$ on the space V indicated in Formula 116 can achieve Formula 117.

if $\phi_{i,j}(a_j) = a_i$ and $k \neq j$, then $\phi_{i,j}(a_k) = 0$. [Formula 116]

$$\phi_{i,j}(x):= (\overbrace{0, \ldots, 0}^{i-1}, g_j, \overbrace{0, \ldots, 0}^{N-i}) \quad \text{[Formula 117]}$$

where $(g_1, \ldots g_N):= x.$

The linear transformations $\phi_{i,j}$ will be called distortion maps.

In the following description, let $G_{dpvs}$ be an algorithm that takes as input $1^\lambda$ ($\lambda \in$ natural number), $N \in$ natural number, and values of a parameter $param_G := (q, G, G_T, g, e)$ of bilinear pairing groups, and outputs values of a parameter $param_V := (q, V, G_T, A, e)$ of dual pairing vector spaces with a security parameter $\lambda$ and an N-dimensional space V.

Description will be directed herein to a case where the dual pairing vector spaces are constructed using the above-described symmetric bilinear pairing groups. The dual pairing vector spaces can also be constructed using asymmetric bilinear pairing groups. The following description can easily be adapted to a case where the dual pairing vector spaces are constructed using asymmetric bilinear pairing groups.

<3. Concept for Implementing FPRE Scheme>

<3-1. Span Program>

FIG. 1 is an explanatory drawing of a matrix M^.

Let $\{p_1, \ldots, p_n\}$ be a set of variables. $M^\wedge := (M, \rho)$ is a labeled matrix. The matrix M is an (L rows×r columns) matrix over $F_q$, and $\rho$ is a label of columns of the matrix M and is related to one of literals $\{p_1, \ldots p_n, \neg p_1, \ldots, \neg p_n\}$. A label $\rho_i$ (i=1, ..., L) of each row of M is related to one of the literals. That is, $\rho\{1, \ldots, L\} \to \{p_1, \ldots, p_n, \neg p_1, \ldots, \neg p_n\}$.

For every input sequence $\delta \in \{0, 1\}^n$, a submatrix $M_\delta$ of the matrix M is defined. The matrix $M_\epsilon$ is a submatrix consisting of those rows of the matrix M the labels $\rho$ of which are related to a value "1" by the input sequence $\delta$. That is, the matrix $M_\delta$ is a submatrix consisting of the rows of the matrix M which are related to $p_i$ such that $\delta_i=1$ and the rows of the matrix M which are related to $\neg p_i$ such that $\delta_i=0$.

Figure 2:
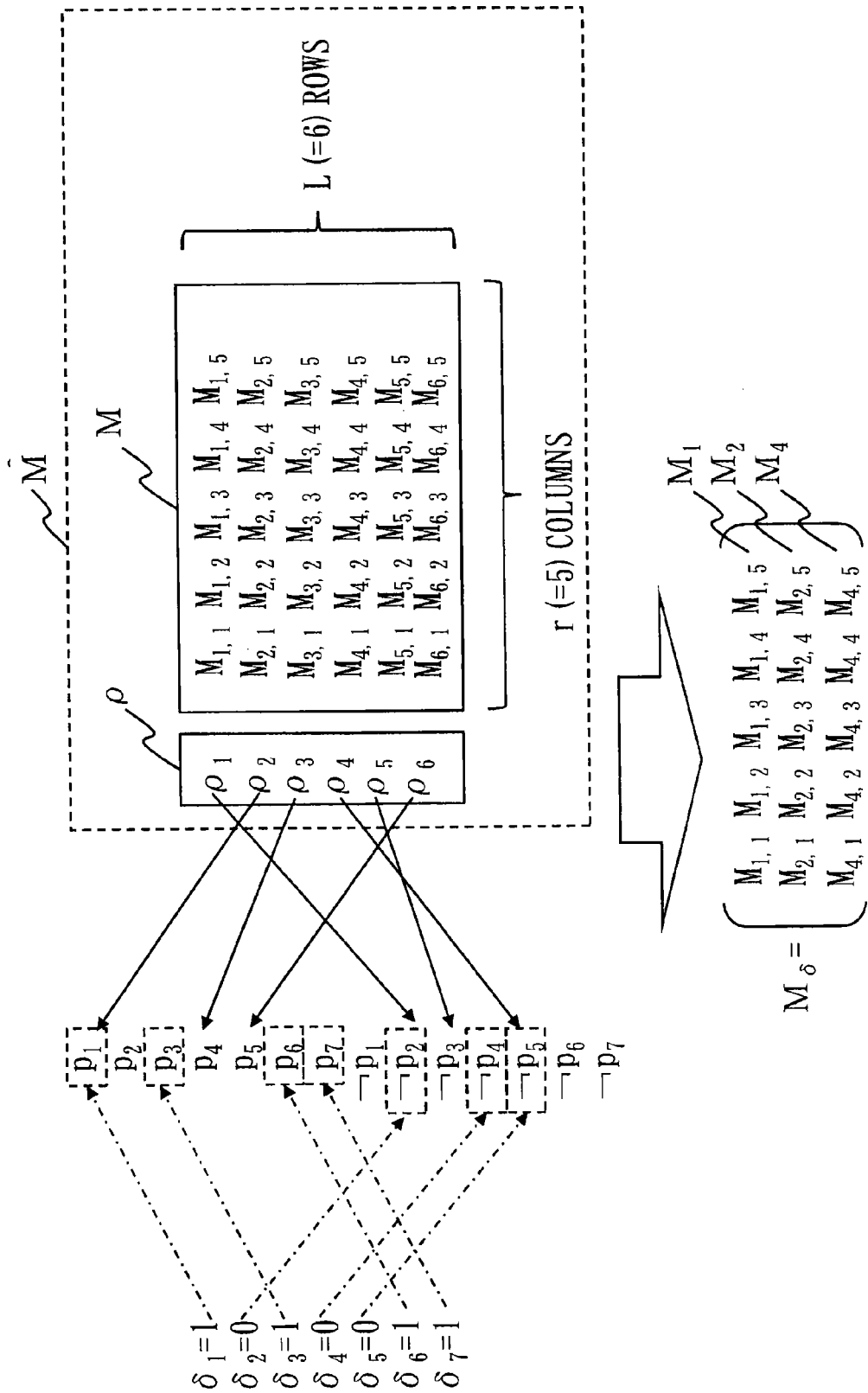
FIG. 2 is an explanatory drawing of a matrix $M_δ$.

FIG. 2 is an explanatory drawing of the matrix $M_\delta$. In FIG. 2, note that n=7, L=6, and r=5. That is, the set of variables is $\{p_1, \ldots, p_7\}$, and the matrix M is a (6 rows×5 columns) matrix. In FIG. 2, assume that the labels p are related such that $\rho_1$ is related to $\neg p_2$, $\rho_2$ to $p_1$, $\rho_3$ to $p_4$, $\rho_4$ to $\neg p_5$, $\rho_5$ to $\neg p_3$, and $\rho_6$ to $p_5$.

Assume that in an input sequence $\delta \in \{0, 1\}^7$, $\delta_1=1$, $\delta_2=0$, $\delta_3=1$, $\delta_4=0$, $\delta_5=0$, $\delta_6=1$, and $\delta_7=1$. In this case, a submatrix consisting of the rows of the matrix M which are related to literals ($p_1, p_3, p_6, p_7, \neg p_2, \neg p_4, \neg p_5$) surrounded by broken lines is the matrix $M_\delta$. That is, the submatrix consisting of the first row ($M_1$), second row ($M_2$), and fourth row ($M_4$) of the matrix M is the matrix $M_\delta$.

In other words, when map $\gamma$: $\{1, \ldots, L\} \to \{0, 1\}$ is $[\rho(j)=p_i]\wedge[\delta_i=1]$ or $[\rho(j)=\neg p_i]\wedge[\delta_i=0]$, then $\gamma(j)=1$; otherwise $\gamma(j)=0$. In this case, $M_\delta := (M_j)_{\gamma(j)=1}$. Note that $M_j$ is the j-th row of the matrix M.

That is, in FIG. 2, map $\gamma(j)=1$ (j=1, 2, 4), and map $\gamma(j)=0$ (j=3, 5, 6). Hence, $(M_j)_{\gamma(j)=1}$ is $M_1$, $M_2$, and $M_4$, and is the matrix $M_\delta$.

More specifically, whether or not the j-th row of the matrix M is included in the matrix $M_\delta$ is determined by whether the value of the map $\gamma(j)$ is "0" or "1".

The span program M^ accepts an input sequence $\delta$ if and only if $1^\to \in \text{span}<M_\delta>$, and rejects the input sequence $\delta$ otherwise. That is, the span program M^ accepts the input sequence $\delta$ if and only if linear combination of the rows of the matrix $M_\delta$ which are obtained from the matrix M^ by the input sequence $\delta$ gives $1^\to$. $1^\to$ is a row vector which has a value "1" in each element.

For example, in FIG. 2, the span program M^ accepts the input sequence $\delta$ if and only if linear combination of the respective rows of the matrix $M_\delta$ consisting of the first, second, and fourth rows of the matrix M gives $1^\to$. That is, if there exist $\alpha_1$, $\alpha_2$, and $\alpha_4$ with which $\alpha_1(M_1)+\alpha_2(M_2)+\alpha_4(M_4)=1^\to$, the span program M^ accepts the input sequence $\delta$.

The span program is called monotone if its labels $\rho$ are related to only positive literals $\{p_1, \ldots, p_n\}$. The span program is called non-monotone if its labels $\rho$ are $\neg$ related to the literals $\{p_1, \ldots, p_n, \neg p_1, \ldots, \neg p_n\}$. It is assumed herein that the span program is non-monotone. An access structure (non-monotone access structure) is constructed using the non-monotone span program. Briefly, an access structure controls access to encryption, that is, it controls whether a ciphertext is to be decrypted or not.

As will be described in detail later, the span program being non-monotone, instead of being monotone, allows for a wider range of applications of the FPRE scheme constructed using the span program.

<3-2. Inner-Product of Attribute Information and Access Structure>

The above-described map $\gamma(j)$ is computed using the inner-product of attribute information. That is, the inner-product of attribute information is used to determine which row of the matrix M is to be included in the matrix $M_\delta$.

$U_t$ (t=1, ..., d and $U_t \subset \{0, 1\}^*$) is a sub-universe and a set of attributes. Each $U_t$ includes identification information (t) of the sub-universe and an n-dimensional vector ($v^\to$). That is, $U_t$ is (t, $v^\to$), where t $\in \{1, \ldots, d\}$ and $v^\to \in F_q^n$.

Let $U_t := (t, v^\to)$ be a variable p of the span program $M^\wedge := (M, \rho)$. That is, p:=(t, $v^\to$). Let the span program $M^\wedge := (M, \rho)$ having the variable (p:=(t, $v^\to$), (t, $v'^\to$), ... ) be an access structure S.

That is, the access structure S:=(M, $\rho$) and $\rho:\{1, \ldots, L\} \to \{(t, v^\to), (t, v'^\to), \ldots, \neg(t, v^\to), \neg(t, v'^\to), \ldots\}$.

Let $\Gamma$ be a set of attributes. That is, $\Gamma := \{(t, x^\to_t) | x^\to_t \in F_q^n, 1 \le t \le d\}$.

When $\Gamma$ is given to the access structure S, map $\gamma: \{1, \ldots, L\} \to \{0, 1\}$ for the span program $M^\wedge := (M, \rho)$ is defined as follows. For each integer i=1, ..., L, set $\gamma(j)=1$ if $[\rho(i)=(t, v^\to_i)] \wedge [(t, x^\to_t) \in \Gamma] \wedge [v^\to_i \cdot x^\to_t=0]$ or $[\rho(i)=\neg(t, v^\to_i)] \wedge [(t, x^\to_t) \in \Gamma] \wedge [v^\to_i \cdot x^\to_t \ne 0]$. Set $\gamma(j)=0$ otherwise.

That is, the map $\gamma$ is computed based on the inner-product of the attribute information $v^\to$ and $x^\to$. As described above, which row of the matrix M is to be included in the matrix $M_\delta$ is determined by the map $\gamma$. More specifically, which row of the matrix M is to be included in the matrix $M_\delta$ is determined by the inner-product of the attribute information $v^\to$ and $x^\to$. The access structure S:=(M, $\rho$) accepts $\Gamma$ if and only if $1^\to \in \text{span}<(M_i)_{\gamma(i)=1}>$.

<3-3. Secret Distribution Scheme>

A secret distribution scheme for the access structure S:=(M, $\rho$) will be described.

The secret distribution scheme is distributing secret information to render it nonsense distributed information. For example, secret information s is distributed into 10 pieces to generate 10 pieces of distributed information. Each of the 10 pieces of distributed information does not have information on the secret information s. Hence, even when one of the pieces of distributed information is obtained, no information can be obtained on the secret information s. On the other hand, if all of the 10 pieces of distributed information are obtained, the secret information s can be recovered.

Another secret distribution scheme is also available according to which the secret information s can be recovered if some (for example, 8 pieces) of distributed information can be obtained, without obtaining all of the 10 pieces of distributed information. A case like this where the secret information s can be recovered using 8 pieces out of 10 pieces of distributed information will be called 8-out-of-10. That is, a case where the secret information s can be recovered using t pieces out of n pieces of distributed information will be called t-out-of-n. This t will be called a threshold.

Still another secret distribution scheme is available according to which when 10 pieces of distributed information $d_1, \ldots, d_{10}$ are generated, the secret information s can be recovered with 8 pieces of distributed information $d_1, \ldots, d_8$, but the secret information s cannot be recovered with 8 pieces of distributed information $d_3, \ldots, d_{10}$. In other words, secret distribution schemes include a scheme according to which whether or not the secret information s can be recovered is controlled not only by the number of pieces of distributed information obtained, but also the combination of distributed information obtained.

FIG. 3 is an explanatory drawing of $s_0$. FIG. 4 is an explanatory drawing of $\vec{s}^T$.

Let a matrix M be an (L rows×r columns) matrix. Let $\vec{f}^T$ be a column vector indicated in Formula 118.

$$\vec{f}^T := (f_1, \ldots f_r)^T \xleftarrow{U} \mathbb{F}_q^r \quad \text{[Formula 118]}$$

Let $s_0$ indicated in Formula 119 be secret information to be shared.

$$s_0 := \vec{1} \cdot \vec{f}^T := \Sigma_k = 1^r f_k \quad \text{[Formula 119]}$$

Let $\vec{s}^T$ indicated in Formula 120 be a vector of L pieces of distributed information of $s_0$.

$$\vec{s}^T := (s_1, \ldots s_L)^T := M \cdot \vec{f}^T \quad \text{[Formula 120]}$$

Let the distributed information $s_i$ belong to $\rho(i)$.

If the access structure $S:=(M, \rho)$ accepts $\Gamma$, that is, $1^{\to} \epsilon$ span<$(M_i)_{\gamma(i)=1}$> for $\gamma:\{1, \ldots, L\} \to \{0, 1\}$, then there exist constants $\{\alpha_i \epsilon F_q | i \epsilon I\}$ such that $I \subseteq \{i \epsilon \{1, \ldots, L\} | \gamma(i) = 1\}$.

This is obvious from the explanation about the example of FIG. 2 that if there exist $\alpha_1, \alpha_2$, and $\alpha_4$ with which $\alpha_1(M_1) + \alpha_2(M_2) + \alpha_4(M_4) = 1^{\to}$, the span program M^ accepts the input sequence δ. That is, if the span program M^ accepts the input sequence δ when there exist $\alpha_1, \alpha_2$, and $\alpha_4$ with which $\alpha_1(M_1) + \alpha_2(M_2) + \alpha_4(M_4) = 1^{\to}$, then there exist $\alpha_1, \alpha_2$, and $\alpha_4$ with which $\alpha_1(M_1) + \alpha_2(M_2) + \alpha_4(M_4) = 1^{\to}$.

Note Formula 121.

$$\Sigma_{i \in I} \alpha_i s_i = s_0 \quad \text{[Formula 121]}$$

Note that the constants $\{\alpha_i\}$ can be computed in time polynomial in the size of the matrix M.

With the FPRE scheme according to the following embodiments, an access structure is constructed by applying the inner-product predicate and the secret distribution scheme to the span program, as described above. Therefore, access control can be designed flexibly by designing the matrix M in the span program and the attribute information x and the attribute information v (predicate information) in the inner-product predicate. That is, access control can be designed very flexibly. Designing of the matrix M corresponds to designing of conditions such as a threshold of the secret distribution scheme.

For example, the attribute-based encryption scheme described above corresponds to a case where designing of the inner-product predicate is limited to a certain condition in the access structure in the FPRE scheme according to the following embodiments. That is, when compared to the access structure in the FPRE scheme according to the following embodiments, the access structure in the attribute-based encryption scheme has a lower flexibility in access control design because it lacks the flexibility in designing the attribute information x and the attribute information v (predicate information) in the inner-product predicate. More specifically, the attribute-based encryption scheme corresponds to a case where attribute information $\{\vec{x}_t\}_{t \in \{1, \ldots, d\}}$ and $\{\vec{v}_t\}_{t \in \{1, \ldots, d\}}$ are limited to two-dimensional vectors for the equality relation, for example, $\vec{x}_t := (1, x_t)$ and $\vec{v}_t := (v_t, -1)$.

An inner-product predicate PRE scheme corresponds to a case where designing of the matrix M in the span program is limited to a certain condition in the access structure in the FPRE scheme according to the following embodiments. That is, when compared to the access structure in the FPRE scheme according to the following embodiments, the access structure in the inner-product predicate encryption scheme has a lower flexibility in access control design because it lacks the flexibility in designing the matrix M in the span program. More specifically, the inner-product predicate encryption scheme corresponds to a case where the secret distribution scheme is limited to 1-out-of-1 (or d-out-of-d).

In particular, the access structure in the FPRE scheme according to the following embodiments constitutes a non-monotone access structure that uses a non-monotone span program. Thus, the flexibility in access control designing improves.

More specifically, since the non-monotone span program includes a negative literal (¬p), a negative condition can be set. For example, assume that First Company includes four departments, A, B, C, and D. Assume that access control is to be performed such that only users belonging to departments other than department B of First Company are capable of access (capable of decryption). In this case, if a negative condition cannot be set, a condition that "the user belongs to any one of departments A, C, and D of First Company" must be set. On the other hand, if a negative condition can be set, a condition that "the user is an employee of First Company and belongs to a department other than department B" can be set. In other words, since a negative condition can be set, natural condition setting is possible. Although the number of departments is small in this case, this scheme is very effective in a case where the number of departments is large.

<4. Basic Structure of FPRE Scheme>

<4-1. Basic Structure of CP-FPRE Scheme>

The structure of the CP-FPRE scheme will be briefly described. Note that CP (ciphertext policy) means that a policy, namely an access structure, is embedded in a ciphertext.

The CP-FPRE scheme consists of seven algorithms: Setup, KG, Enc, RKG, REnc, Dec1, and Dec2.

(Setup)

A Setup algorithm is a probabilistic algorithm that takes as input a security parameter λ and an attribute format $\vec{n}:=(d; n_1, \ldots, n_d; u_1, \ldots, u_d; z_1, \ldots, z_d)$, and outputs a public parameter pk and a master key sk.

(KG)

A KG algorithm is a probabilistic algorithm that takes as input an attribute set $\Gamma:=\{(t, \vec{x}_t) | \vec{x}_t \in F_q^{n_t}, 1 \leq t \leq d\}$, the public parameter pk, and the master key sk, and outputs a decryption key $sk_\Gamma$.

(Enc)

An Enc algorithm is a probabilistic algorithm that takes as input a message m, an access structure $S=(M, \rho)$, and the public parameter pk, and outputs a ciphertext $ct_S$.

(RKG)

An RKG algorithm is a probabilistic algorithm that takes as input the decryption key $sk_\Gamma$, an access structure $S':=(M', \rho')$, and the public parameter pk, and outputs a re-encryption key $rk_{(\Gamma, S')}$.

(REnc)

An REnc algorithm is a probabilistic algorithm that takes as input the ciphertext $ct_S$, the re-encryption key $rk_{(\Gamma,S')}$, and the public parameter pk, and outputs a re-encrypted ciphertext $CT_{S'}$.

(Dec1)

A Dec1 algorithm is an algorithm that takes as input the re-encrypted ciphertext $CT_{S'}$, the decryption key $sk_\Gamma$, and the public parameter pk, and outputs the message m or a distinguished symbol ⊥.

(Dec2)

A Dec2 algorithm is an algorithm that takes as input the ciphertext $ct_S$, the decryption key $sk_\Gamma$, and the public parameter pk, and outputs the message m or the distinguished symbol ⊥.

<4-2. Cryptographic Processing System 10>

The cryptographic processing system 10 that executes the algorithms of the CP-FPRE scheme will be described.

Figure 5:
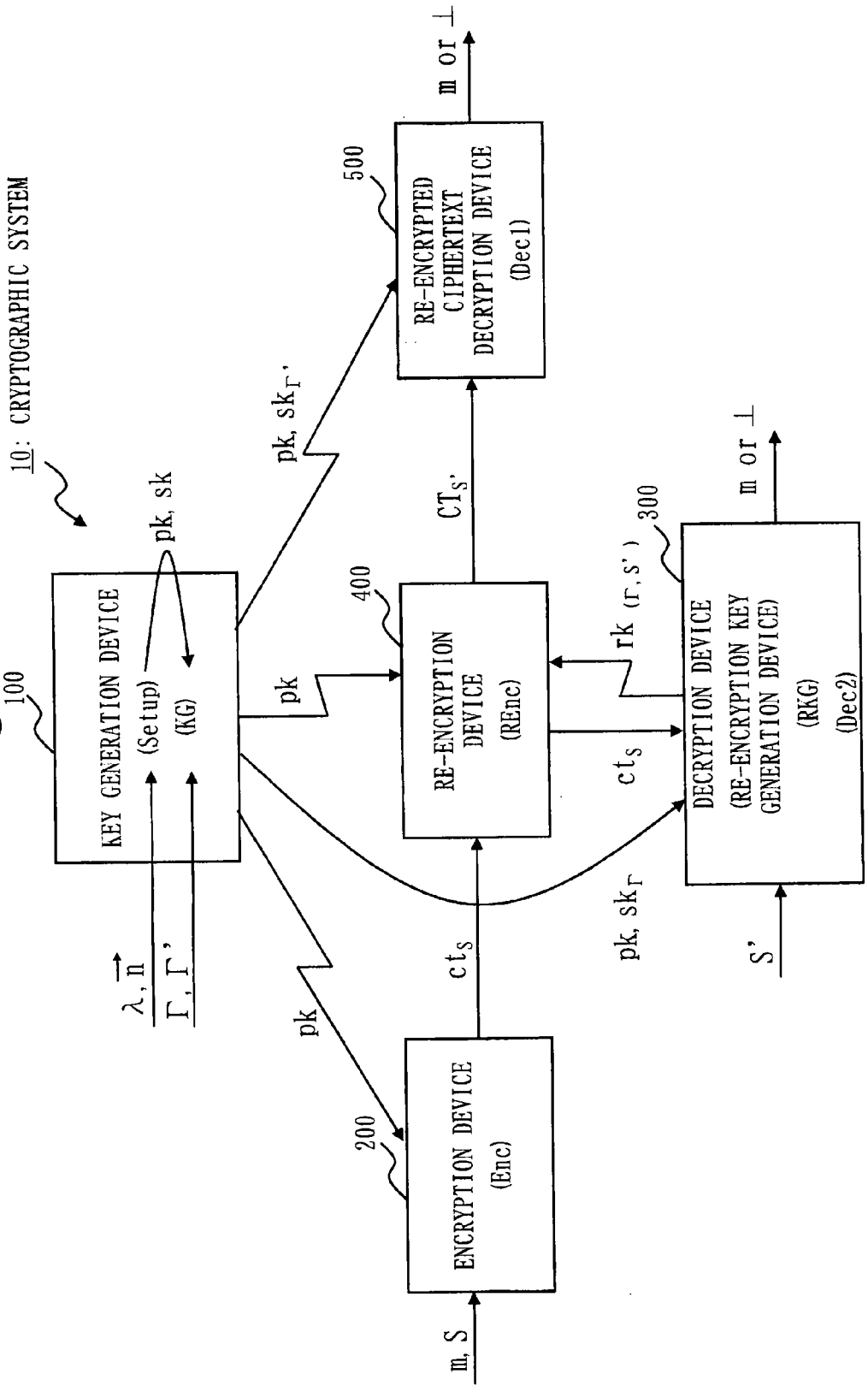
FIG. 5 is a configuration diagram of a cryptographic processing system 10 that implements a CP-FPRE scheme.

FIG. 5 is a configuration diagram of the cryptographic processing system 10 that implements the CP-FPRE scheme.

The cryptographic processing system 10 includes a key generation device 100, an encryption device 200, a decryption device 300 (re-encryption key generation device), a re-encryption device 400, and a re-encrypted ciphertext decryption device 500.

The key generation device 100 executes the Setup algorithm taking as input a security parameter λ and an attribute format $\vec{n}:=(d; n_1, \ldots, n_d; u_1, \ldots, u_d; z_1, \ldots, z_d)$, and thus generates a public parameter pk and a master key sk.

Then, the key generation device 100 publishes the public parameter pk. The key generation device 100 also executes the KG algorithm taking as input an attribute set Γ, and thus generates a decryption key $sk_\Gamma$, and transmits the decryption key $sk_\Gamma$ to the decryption device 300 in secrecy. The key generation device 100 also executes the KG algorithm taking as input an attribute set Γ, and thus generates a decryption key $sk_\Gamma$, and transmits the decryption key $sk_\Gamma$ to the re-encrypted ciphertext decryption device 500 in secrecy.

The encryption device 200 executes the Enc algorithm taking as input a message m, an access structure S, and the public parameter pk, and thus generates a ciphertext $ct_S$. The encryption device 200 transmits the ciphertext $ct_S$ to the re-encryption device 400.

The decryption device 300 executes the RKG algorithm taking as input the public parameter pk, the decryption key $sk_\Gamma$, and an access structure S', and thus generates a re-encryption key $rk_{(\Gamma,S')}$. The decryption device 300 transmits the re-encryption key $rk_{(\Gamma,S')}$ to the re-encryption device in secrecy.

The decryption device 300 also executes the Dec2 algorithm taking as input the public parameter pk, the decryption key $sk_\Gamma$, and the ciphertext $ct_S$, and outputs the message m or the distinguished symbol ⊥.

The re-encryption device 400 executes the REnc algorithm taking as input the public parameter pk, the re-encryption key $rk_{(\Gamma,S')}$, and the ciphertext $ct_S$, and thus generates a re-encrypted ciphertext $CT_{S'}$. The re-encryption device 400 transmits the re-encrypted ciphertext $CT_{S'}$ to the re-encrypted ciphertext decryption device 500.

The re-encrypted ciphertext decryption device 500 executes the Dec1 algorithm taking as input the public parameter pk, the decryption key $sk_\Gamma$, the re-encrypted ciphertext $CT_{S'}$, and outputs the message m or the distinguished symbol ⊥.

<4-3. Items Used to Implement CP-FPRE Scheme>

To implement the CP-FPRE scheme, ciphertext-policy functional encryption (CP-FE) and one-time signature are used. Since both are publicly known techniques, schemes to be used in the following description will be briefly described. An example of a CP-FE scheme is discussed in Patent Literature 1.

The CP-FE scheme consists of four algorithms: $\text{Setup}_{CP\text{-}FE}$, $\text{KG}_{CP\text{-}FE}$, $\text{EnC}_{CP\text{-}FE}$, and $\text{Dec}_{CP\text{-}FE}$4.

($\text{Setup}_{CP\text{-}FE}$)

A $\text{Setup}_{CP\text{-}FE}$ algorithm is a probabilistic algorithm that takes as input a security parameter λ and an attribute format $\vec{n}:=(d; n_1, \ldots, n_d)$, and outputs a public parameter $pk^{CP\text{-}FE}$ and a master key $sk^{CP\text{-}FE}$.

($\text{KG}_{CP\text{-}FE}$)

A $\text{KG}_{CP\text{-}FE}$ algorithm is a probabilistic algorithm that takes as input an attribute set $\Gamma:=\{(t, \vec{x}_t)|\vec{x}_t \in F_q^{nt}, 1\leq t\leq d\}$, the public parameter $pk^{CP\text{-}FE}$, and the master key $sk^{CP\text{-}FE}$, and outputs a decryption key $sk_\Gamma^{CP\text{-}FE}$.

($\text{Enc}_{CP\text{-}FE}$)

An $\text{Enc}_{CP\text{-}FE}$ algorithm is a probabilistic algorithm that takes as input a message m, an access structure S=(M, ρ), and the public parameter $pk^{CP\text{-}FE}$, and outputs a ciphertext ψ.

($\text{Dec}_{CP\text{-}FE}$)

A $\text{Dec}_{CP\text{-}FE}$ algorithm is an algorithm that takes as input the ciphertext ψ, the decryption key $sk_\Gamma^{CP\text{-}FE}$, and the public parameter $pk^{CP\text{-}FE}$, and outputs the message m or the distinguished symbol ⊥.

A one-time signature scheme consists of three algorithms: SigKG, Sig, and Ver.

(SigKG)

A SigKG algorithm is a probabilistic algorithm that takes as input a security parameter λ, and outputs a signature key sigk and a verification key verk.

(Sig)

A Sig algorithm is a probabilistic algorithm that takes as input the signature key sigk and a message m, and outputs a signature S.

(Ver)

A Ver algorithm is an algorithm that takes as input the verification key verk, the message m, and the signature S, and outputs 1 if the signature S is valid for the verification key verk and the message m and outputs 0 if not valid.

<4-4. CP-FPRE Scheme and Cryptographic Processing System 10 in Detail>

With reference to FIG. 6 through FIG. 17, the CP-FPRE scheme will be described, and the function and operation of the cryptographic processing system 10 that implements the CP-FPRE scheme will be described.

Figure 6:
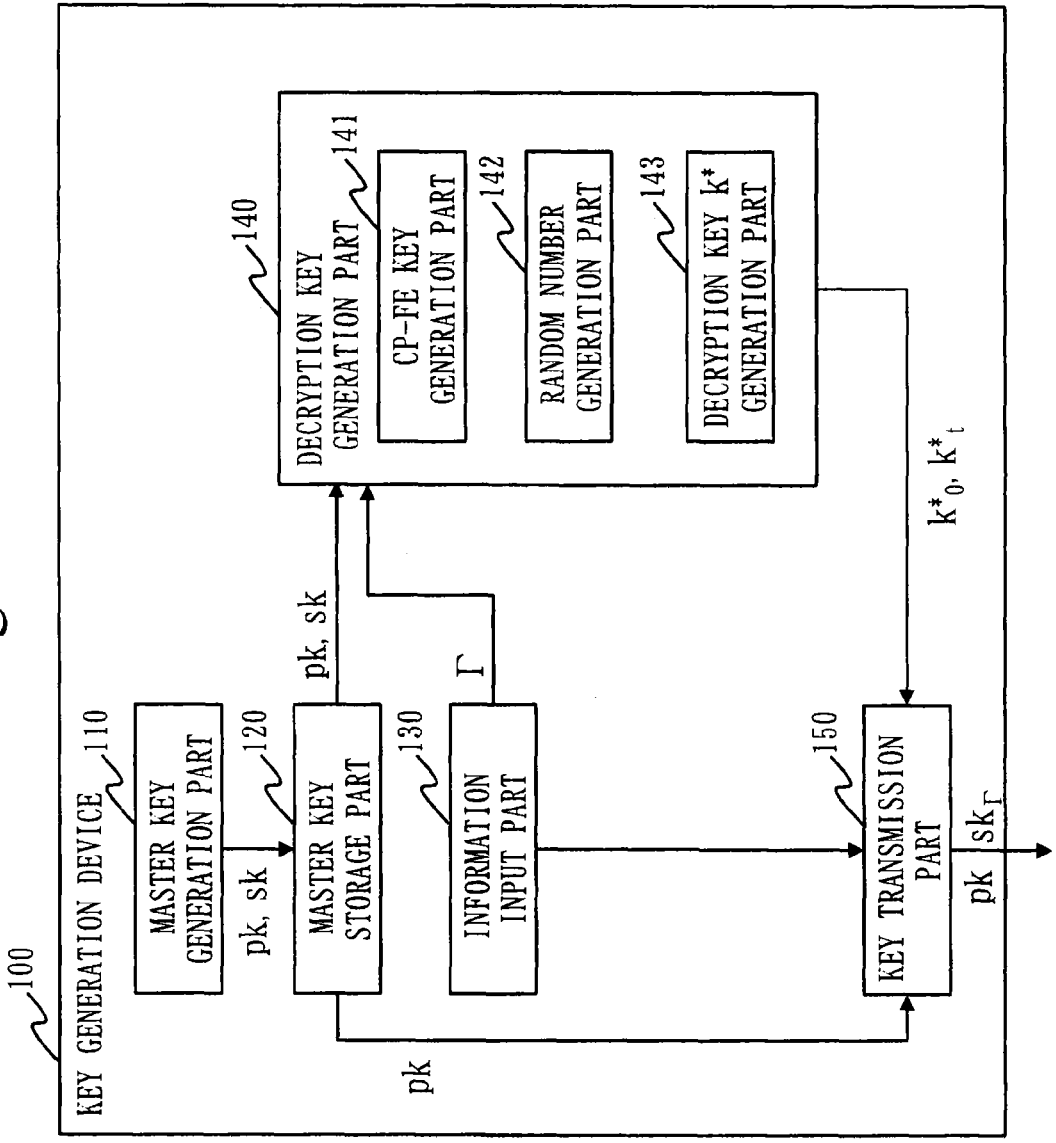
FIG. 6 is a functional block diagram illustrating the function of a key generation device 100.
Figure 7:
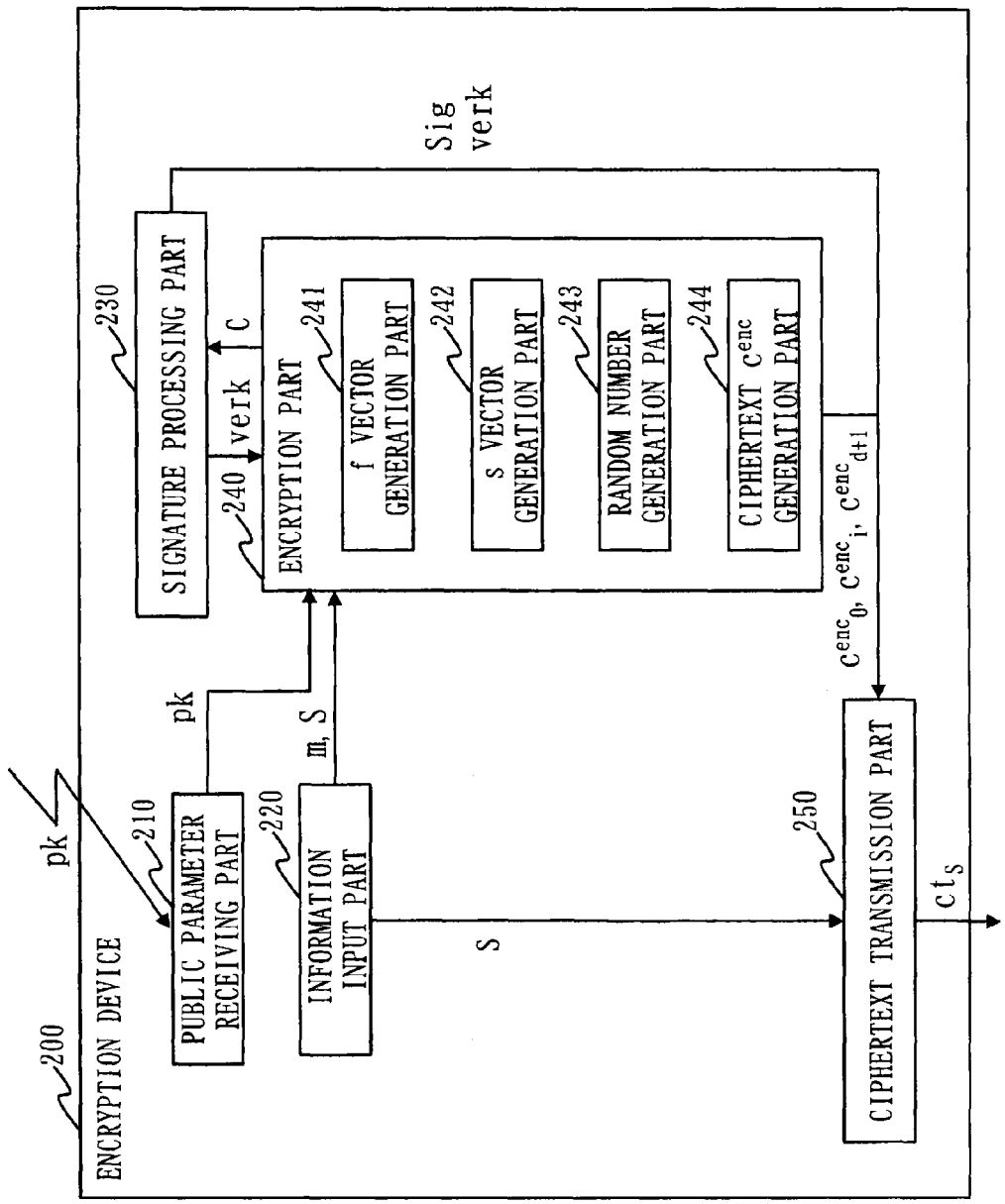
FIG. 7 is a functional block diagram illustrating the function of an encryption device 200.
Figure 8:
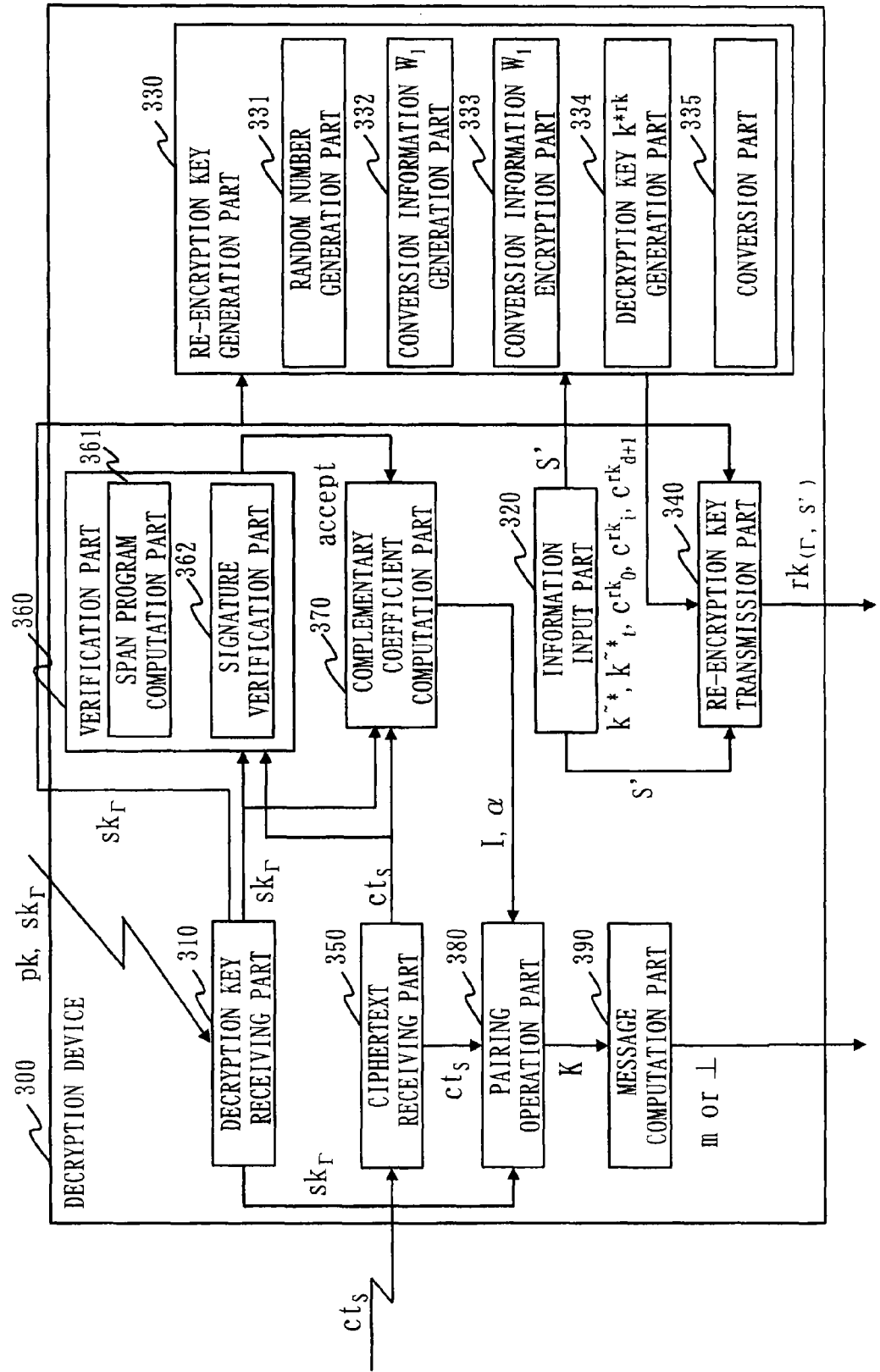
FIG. 8 is a functional block diagram illustrating the function of a decryption device 300.
Figure 9:
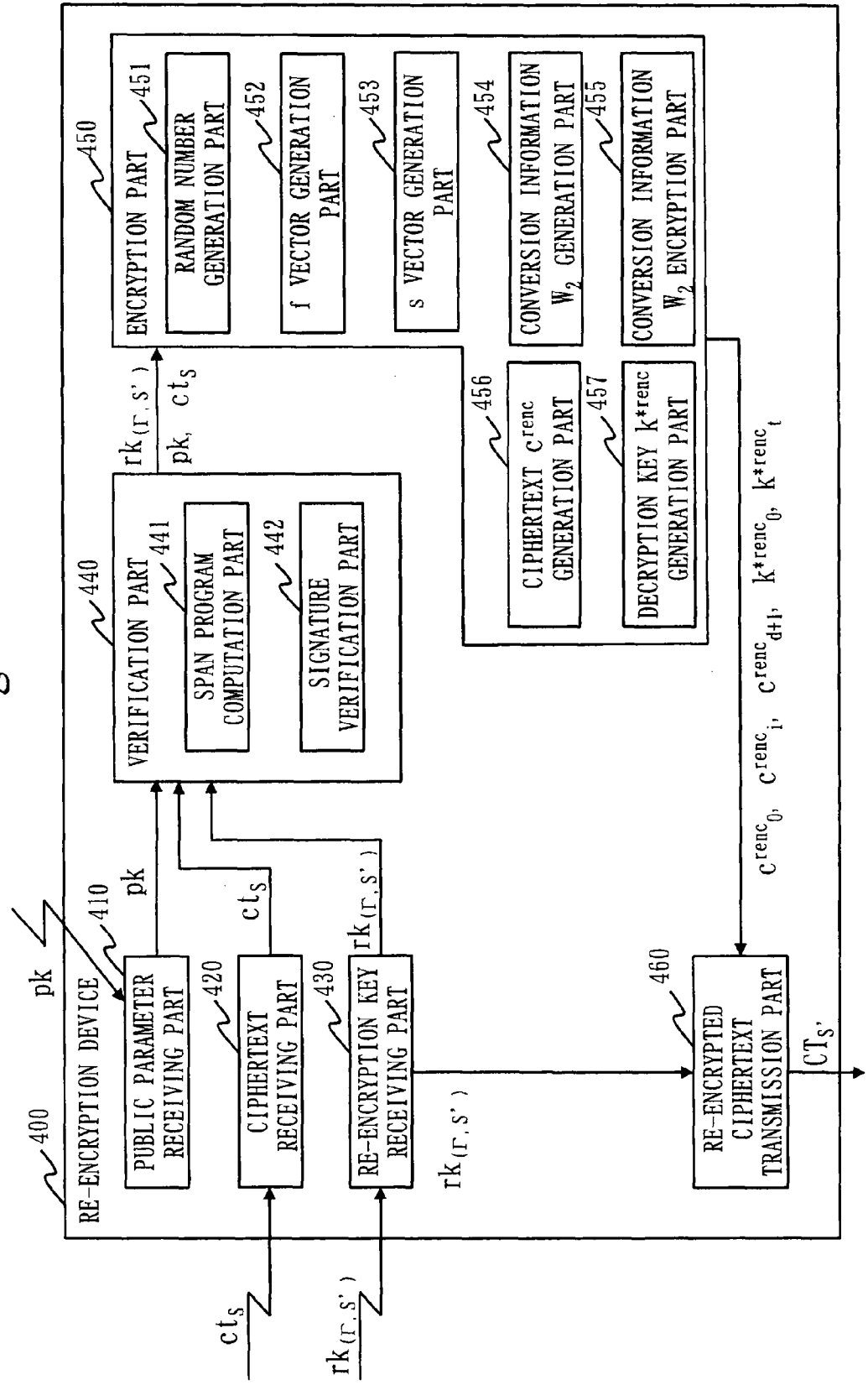
FIG. 9 is a functional block diagram illustrating the function of a re-encryption device 400.
Figure 10:
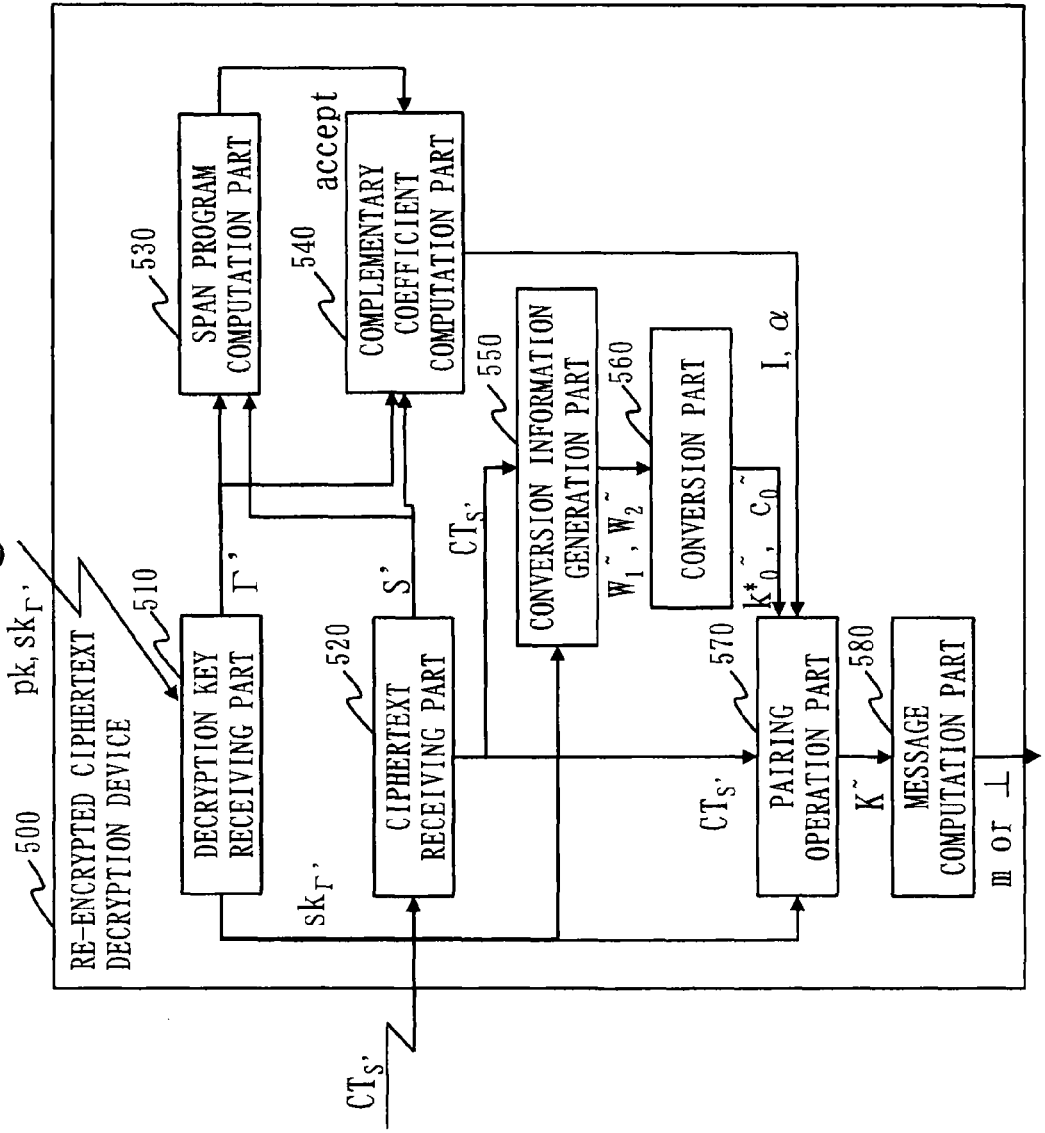
FIG. 10 is a functional block diagram illustrating the function of a re-encrypted ciphertext decryption device 500.

FIG. 6 is a functional block diagram illustrating the function of the key generation device 100. FIG. 7 is a functional block diagram illustrating the function of the encryption device 200. FIG. 8 is a functional block diagram illustrating the function of the decryption device 300. FIG. 9 is a functional block diagram illustrating the function of the re-encryption device 400. FIG. 10 is a functional block diagram illustrating the function of the re-encrypted ciphertext decryption device 500.

Figure 11:
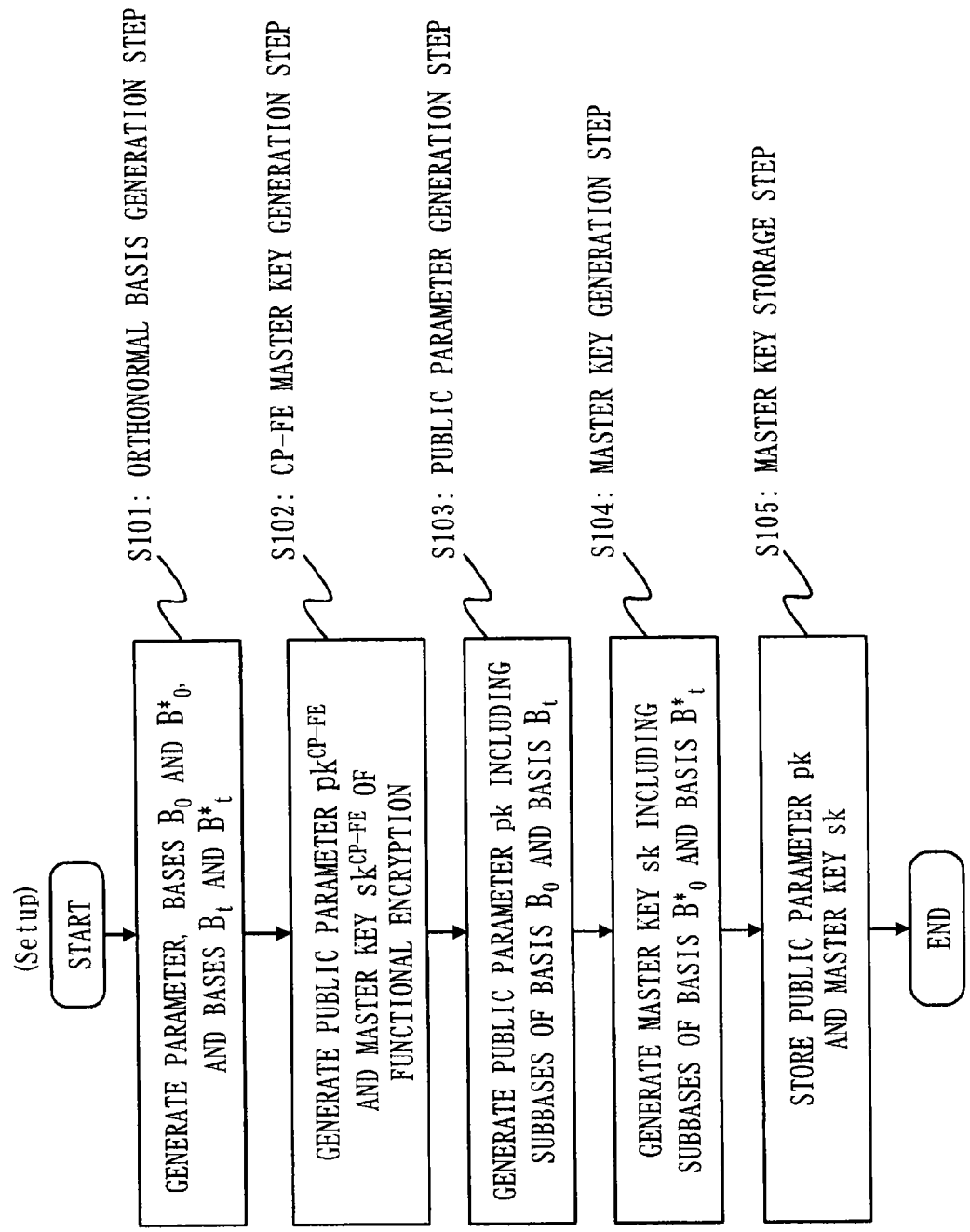
FIG. 11 is a flowchart illustrating the process of a Setup algorithm.
Figure 12:
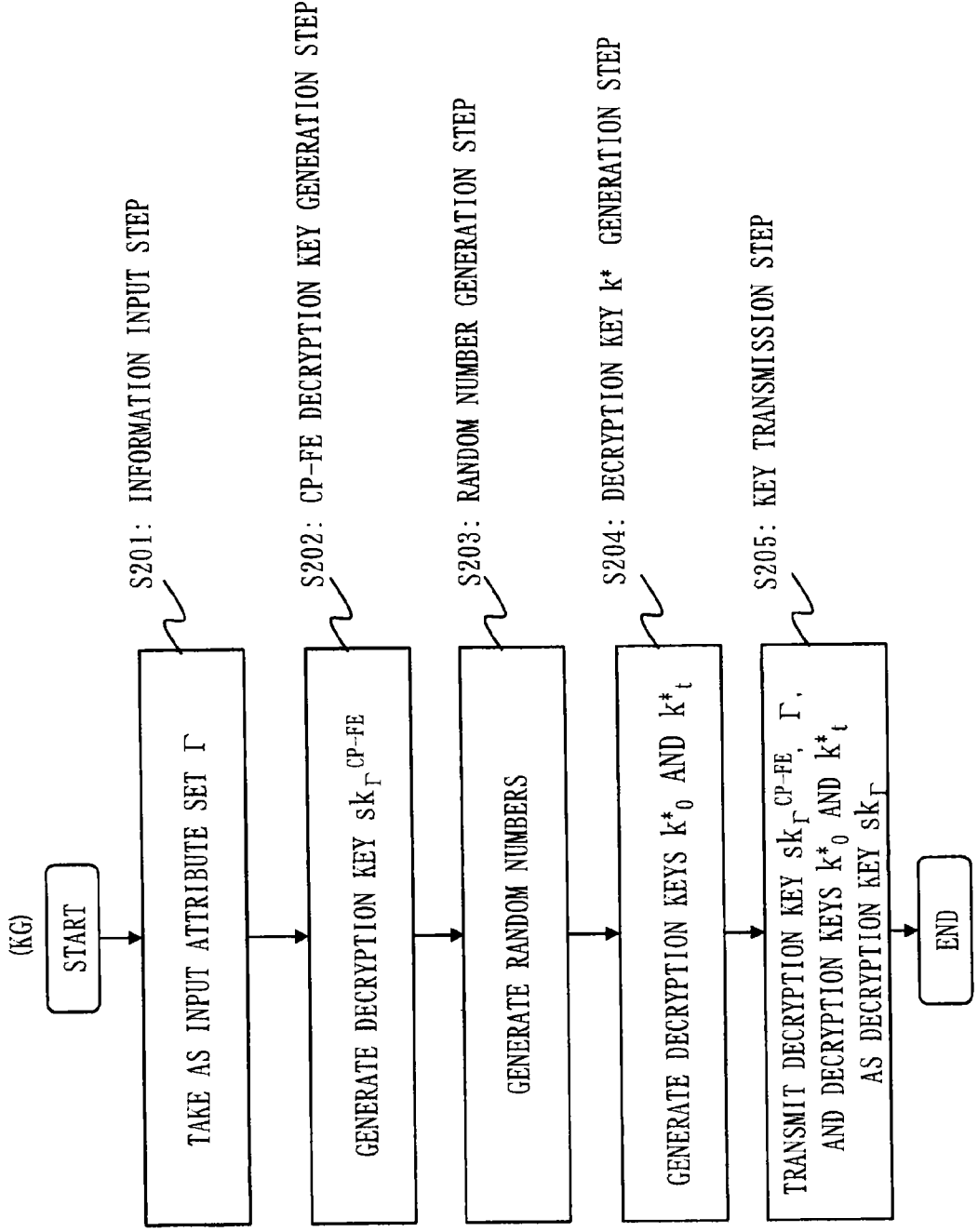
FIG. 12 is a flowchart illustrating the process of a KG algorithm.
Figure 13:
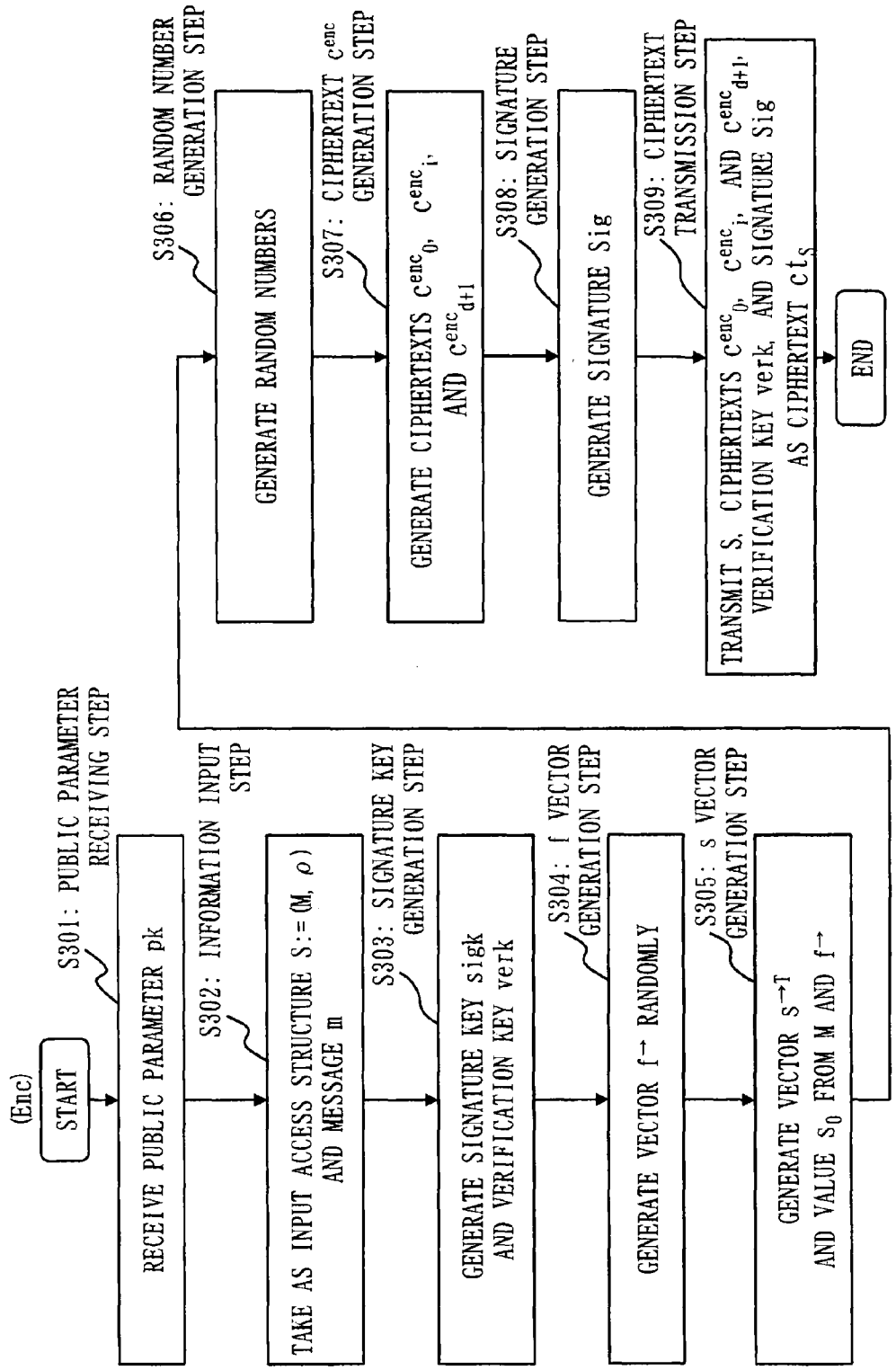
FIG. 13 is a flowchart illustrating the process of an Enc algorithm.
Figure 14:
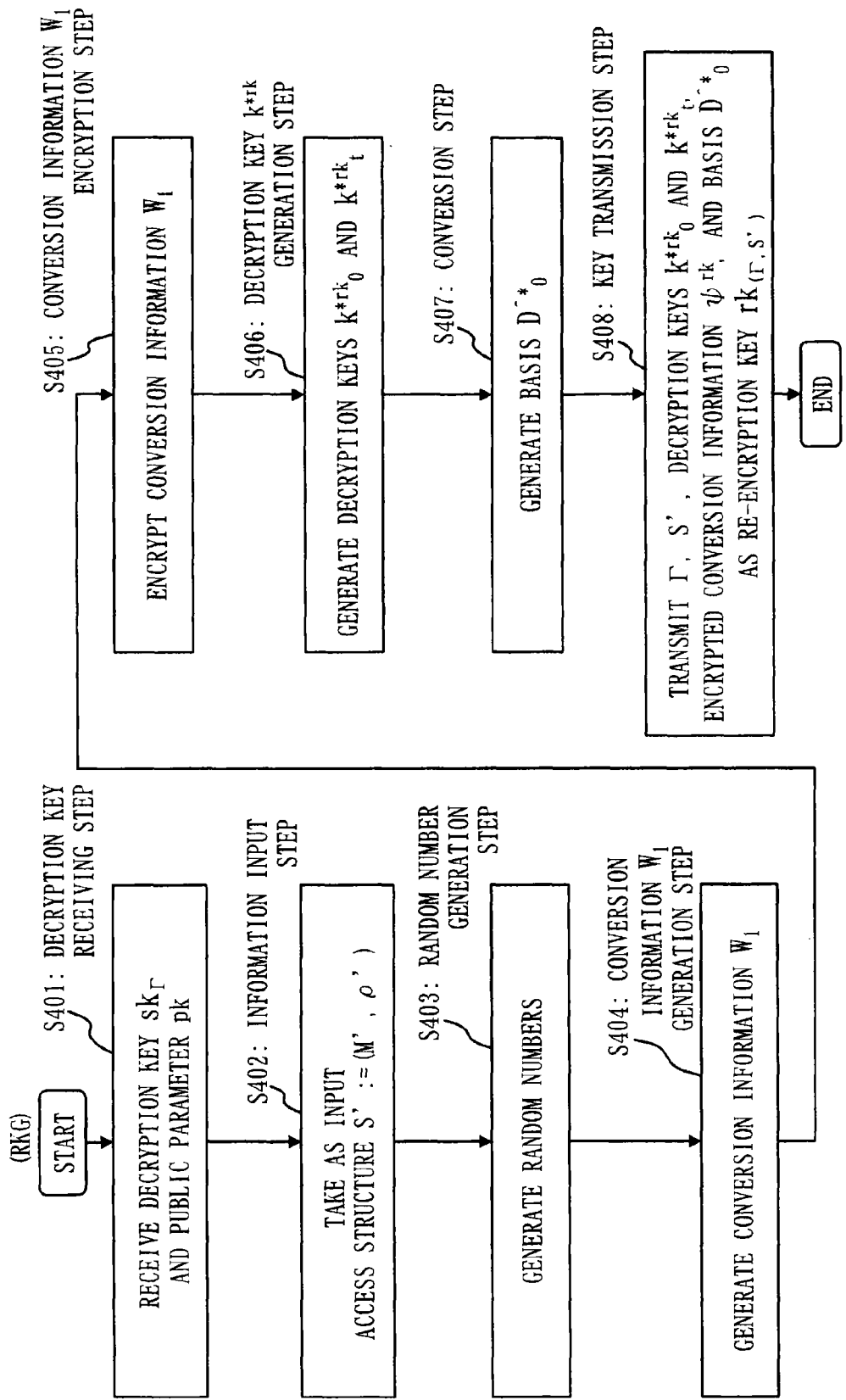
FIG. 14 is a flowchart illustrating the process of an RKG algorithm.
Figure 15:
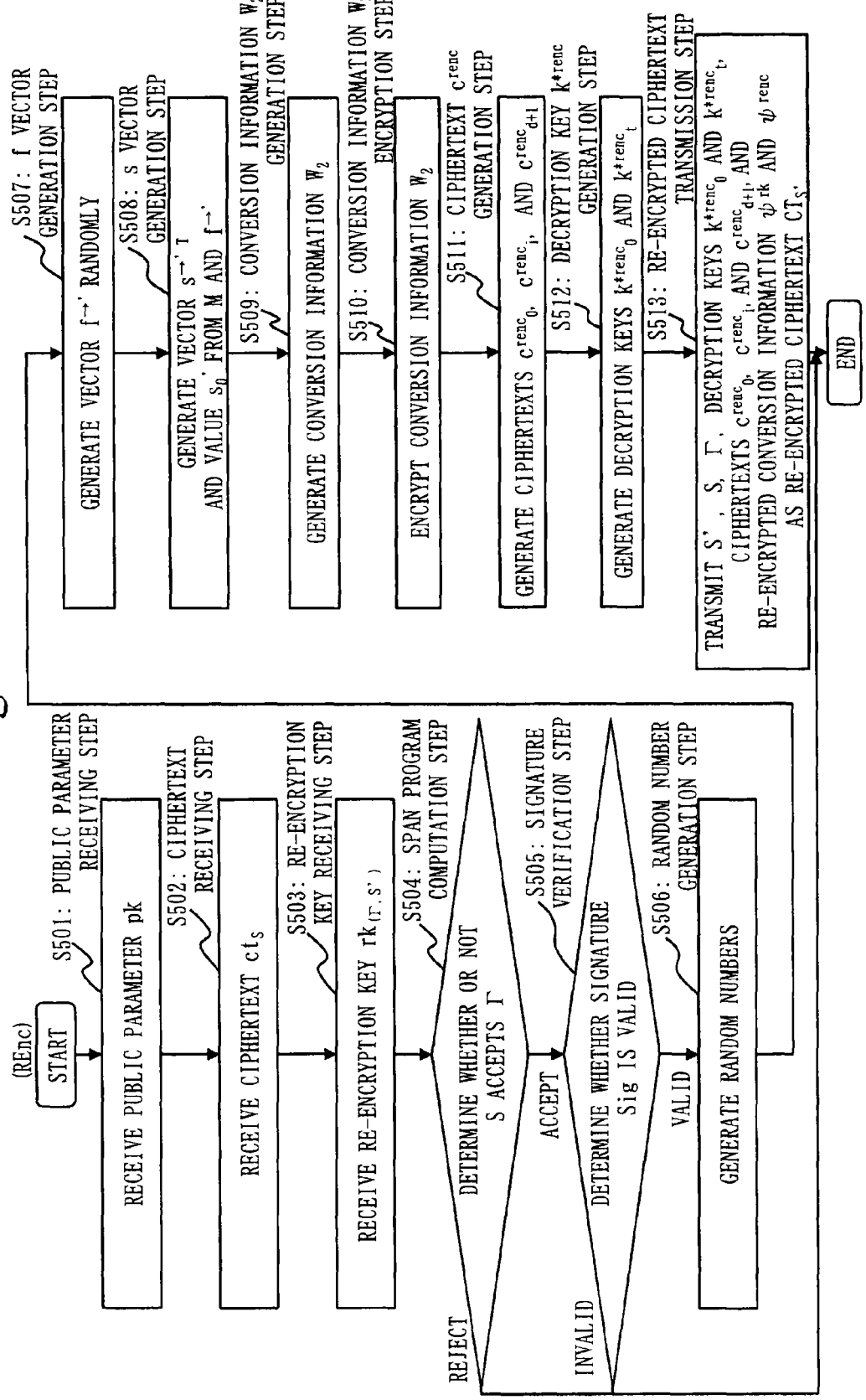
FIG. 15 is a flowchart illustrating the process of an REnc algorithm.
Figure 16:
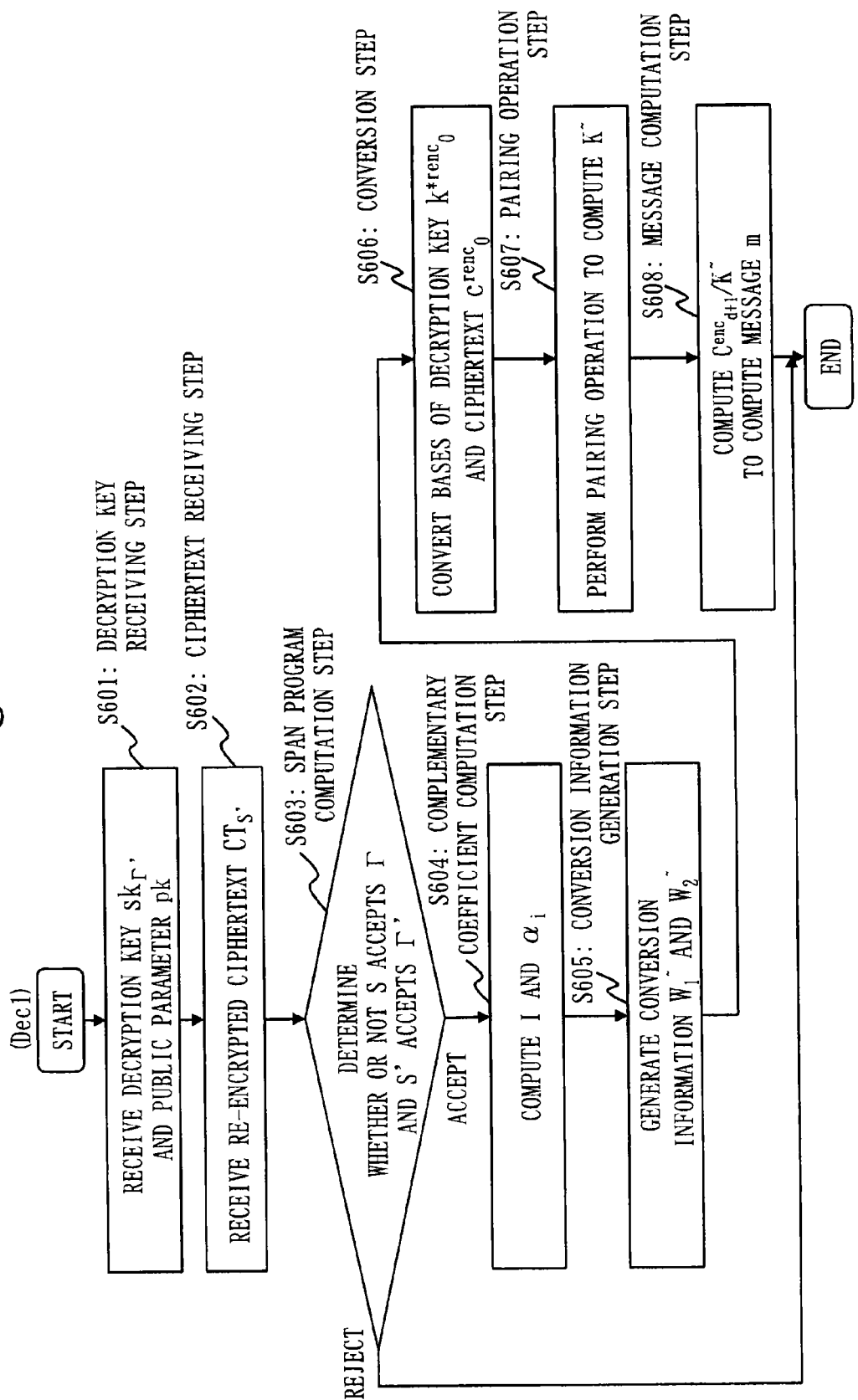
FIG. 16 is a flowchart illustrating the process of a Dec1 algorithm.
Figure 17:
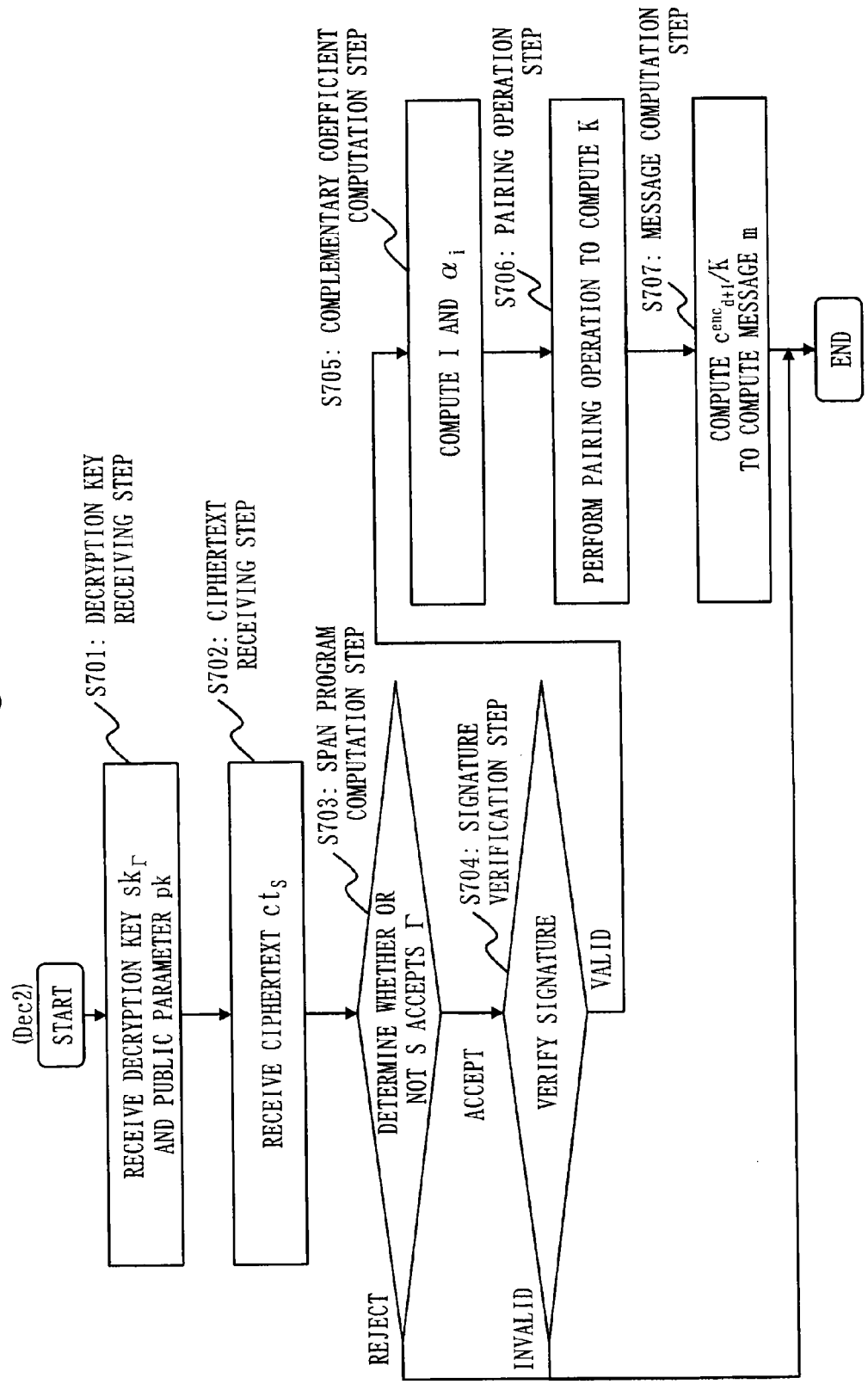
FIG. 17 is a flowchart illustrating the process of a Dec2 algorithm.

FIGS. 11 and 12 are flowcharts illustrating the operation of the key generation device 100. FIG. 11 is a flowchart illustrating the process of the Setup algorithm, and the FIG. 12 is a flowchart illustrating the process of the KG algorithm. FIG. 13 is a flowchart illustrating the operation of the encryption device 200 and illustrating the process of the Enc algorithm. FIG. 14 is a flowchart illustrating the operation of the decryption device 300 and illustrating the process of the RKG algorithm. FIG. 15 is a flowchart illustrating the operation of the re-encryption device 400 and illustrating the process of the REnc algorithm. FIG. 16 is a flowchart illustrating the operation of the re-encrypted ciphertext decryption device 500 and illustrating the process of the Dec1 algorithm. FIG. 17 is a flowchart illustrating the operation of the decryption device 300 and illustrating the process of the Dec2 algorithm.

The function and operation of the key generation device 100 will be described.

The key generation device 100 includes a master key generation part 110, a master key storage part 120, an information input part 130, a decryption key generation part 140, and a key transmission part 150. The decryption key generation part 140 includes a CP-FE key generation part 141, a random number generation part 142, and a decryption key k* generation part 143.

With reference to FIG. 11, the process of the Setup algorithm will be described.

(S101: Orthonormal Basis Generation Step)

Using the processing device, the master key generation part 110 computes Formula 122, and thus generates a parameter $param_{\vec{n}}$, a basis $B_0$ and a basis $B^*_0$, and a basis $B_t$ and a basis $B^*_t$.

[Formula 122]

(1) input $1^\lambda, \vec{n}$ (2) $param_{\mathbb{G}} := (q, \mathbb{G}, \mathbb{G}_T, g, e) \xleftarrow{R} \mathcal{G}_{bpg}(1^\lambda)$ (3) $N_0 := 7, N_t := n_t + u_t + z_t + 1$ for $t = 1, \ldots, d$, $\psi \xleftarrow{U} \mathbb{F}_q^\times, g_T := e(g, g)^\psi$ The process of (4) through (7) is executed for each integer $t=0, \ldots, d$.

(4) $param_{\mathbb{V}_t} := (q, \mathbb{V}, \mathbb{G}_T, \mathbb{A}_T, e) \xleftarrow{R} \mathcal{G}_{dpvs}(1^\lambda, N_t, param_{\mathbb{G}})$, (5) $X_t = \begin{pmatrix} \vec{\chi}_{t,1} \\ \vdots \\ \vec{\chi}_{t,N_t} \end{pmatrix} := (\chi_{t,i,j})_{i,j} \xleftarrow{U} GL(N_t, \mathbb{F}_q)$, (6) $\begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1}$, (7) $b_{t,i} := \sum_{j=1}^{N_t} \chi_{t,i,j} a_{t,j}, \mathbb{B}_t := (b_{t,1}, \ldots, b_{t,N_t})$, $b^*_{t,i} := \sum_{j=1}^{N_t} v_{t,i,j} a_{t,j}, \mathbb{B}^*_t := (b^*_{t,1}, \ldots, b^*_{t,N_t})$, (8) $param_{\vec{n}} := (\{param_{\mathbb{V}_t}\}_{t=0, \ldots, d}, g_T)$ That is, the master key generation part 110 executes the following process.

(1) Using the input device, the master key generation part 110 takes as input a security parameter $\lambda(1^\lambda)$ and an attribute format $\vec{n} := (d; n_1, \ldots, n_d; u_1, \ldots, u_d; z_1, \ldots, z_d)$. Note that d is an integer of 1 or more, and that $n_t$ is an integer of 1 or more, and $u_t$ and $z_t$ are integers of 0 or more, for each integer $t=1, \ldots, d$.

(2) Using the processing device, the master key generation part 110 executes the algorithm $\mathcal{G}_{bpg}$ taking as input the security parameter $\lambda$ inputted in (1), and thus generates values of a parameter $param_G := (q, G, G_T, g, e)$ of bilinear pairing groups.

(3) The master key generation part 110 sets 7 in $N_0$ and sets $n_t+u_t+z_t+1$ in $N_t$ for each integer $t=1, \ldots, d$. The master key generation part 110 also generates a random number $\psi$. The master key generation part 110 also sets $e(G, G)^\psi$ in $g_T$.

Then, the master key generation part 110 executes the following process (4) through (7) for each integer $t=0, \ldots, d$.

(4) The master key generation part 110 executes the algorithm $\mathcal{G}_{dpvs}$ taking as input the security parameter $\lambda$ ($1^\lambda$) inputted in (1), $N_t$ set in (3), and the values of $param_G := (q, G, G_T, g, e)$ generated in (2), and thus generates values of a parameter $param_{Vt} := (q, V_t, G_T, A_t, e)$ of dual pairing vector spaces.

(5) The master key generation part 110 takes as input $N_t$ set in (3) and $F_q$, and randomly generates a linear transformation $X_t := (\chi_{t,i,j})_{i,j}$. Note that GL stands for general linear. In other words, GL is a general linear group, a set of square matrices with nonzero determinants, and a group under multiplication. Note that $(\chi_{t,i,j})_{i,j}$ denotes a matrix concerning the suffixes i and j of the matrix $\chi_{t,i,j}$, where $i, j=1, \ldots, N_t$.

(6) Based on the random number $\psi$ and the linear transformation $X_t$, the master key generation part 110 generates $(v_{t,i,j})_{i,j} := \psi \cdot (X_t^T)^{-1}$. Like $(\chi_{t,i,j})_{i,j}$, $(v_{t,i,j})_{i,j}$ denotes a matrix concerning the suffixes i and j of the matrix $v_{t,i,j}$, where $i, j=1, \ldots, N_t$.

(7) Based on the linear transformation $X_t$ generated in (5), the master key generation part 110 generates a basis $B_t$ from the orthonormal basis $A_t$ generated in (4). Based on $(v_{t,i,j})_{i,j}$ generated in (6), the master key generation part 110 generates a basis $B^*_t$ from the orthonormal basis $A_t$ generated in (4).

(8) The master key generation part 110 sets $\{param_{Vt}\}_{t=0, \ldots, d}$ generated in (4) and $g_T$ in $param_{\vec{n}}$.

(S102: CP-FE Master Key Generation Step)

Using the processing device, the master key generation part 110 computes Formula 123, and thus generates a public parameter $pk^{CP-FE}$ and a master key $sk^{CP-FE}$ of functional encryption.

$$(pk^{CP-FE}, sk^{CP-FE}) \xleftarrow{R} Setup_{CP-FE}(1^\lambda, \vec{n}) \qquad \text{[Formula 123]}$$

(S103: Public Parameter Generation Step)

Using the processing device, the master key generation part 110 generates a subbasis $\hat{B}_0$ of the basis $B_0$ and a subbasis $\hat{B}_t$ of the basis $B_t$, as indicated in Formula 124.

$\hat{\mathbb{B}}_0 := (b_{0,1}, b_{0,2}, b_{0,3}, b_{0,4}, b_{0,7})$, $\hat{\mathbb{B}}_t := (b_{t,1}, \ldots, b_{t,n_t}, b_{t,N_t})$ for $t=1, \ldots, d$ [Formula 124]

The master key generation part 110 generates a public parameter pk by putting together the public parameter $pk^{CP-FE}$, the security parameter $\lambda$, $param_{\vec{n}}$, the subbasis $\hat{B}_0$ and the subbasis $\hat{B}_t$, basis vectors $b^*_{0,2}, b^*_{0,3}, b^*_{0,4}$, and $b^*_{0,6}$, and basis vectors $b^*_{t,1}, \ldots, b^*_{t,nt}, b^*_{t,nt+ut+1}, \ldots,$ and $b^*_{t,nt+ut+z}$ for each integer $t=1, \ldots, d$.

(S104: Master Key Generation Step)

The master key generation part 110 generates a subbasis $\hat{B}^*_0$ of the basis $B^*_0$ generated in (S101), as indicated in Formula 125.

$\hat{\mathbb{B}}^*_0 := (b^*_{0,1}, b^*_{0,2}, b^*_{0,3}, b^*_{0,4}, b^*_{0,7})$, $\hat{\mathbb{B}}^*_t := (b^*_{t,1}, \ldots, b^*_{t,n_t}, b^*_{t,N_t})$ for $t=1, \ldots, d$ [Formula 125]

The master key generation part 110 generates a master key sk which is constituted by the master key $sk^{CP-FE}$ and a basis vector $b^*_{0,1}$.

(S105: Master Key Storage Step)

The master key storage part 120 stores the public parameter pk generated in (S103) in the storage device. The master key storage part 120 also stores the master key sk generated in (S104) in the storage device.

In brief, in (S101) through (S104), the key generation device 100 generates the public parameter pk and the master key sk by executing the Setup algorithm indicated in Formula 126-1 and Formula 126-2. In (S105), the key generation device 100 stores the generated public parameter pk and master key sk in the storage device.

The public parameter is published, for example, via the network, and is made available for the encryption device 200, the decryption device 300, the re-encryption device 400, and the re-encrypted ciphertext decryption device 500.

$$\text{Setup}(1^\lambda, \vec{n} = \quad [\text{Formula 126-1}]$$
$$(d; n_1, \ldots, n_d; u_1, \ldots, u_d; z_1, \ldots, z_d)):$$
$$param_\mathbb{G} := (q, \mathbb{G}, \mathbb{G}_T, g, e) \xleftarrow{R} \mathcal{G}_{bpg}(1^\lambda),$$
$$N_0 := 7,$$
$$N_t := n_t + u_t + z_t + 1 \text{ for } t = 1, \ldots, d,$$
$$\psi \xleftarrow{U} \mathbb{F}_q^\times, g_T := e(g, g)^\psi,$$
$$\text{for } t = 0, \ldots, d,$$
$$parm_{\mathbb{V}_t} :=$$
$$(q, \mathbb{V}, \mathbb{G}_T, \mathbb{A}_T, e) \xleftarrow{R} \mathcal{G}_{dpvs}(1^\lambda, N_t, param_\mathbb{G}),$$
$$X_t = \begin{pmatrix} \vec{\chi}_{t,1} \\ \vdots \\ \vec{\chi}_{t,N_t} \end{pmatrix} := (\chi_{t,i,j})_{i,j} \xleftarrow{U} GL(N_t, \mathbb{F}_q),$$
$$\begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1},$$
$$b_{t,i} := \sum_{j=1}^{N_t} \chi_{t,i,j} a_{t,j}, \mathbb{B}_t := (b_{t,1}, \ldots, b_{t,N_t}), \quad [\text{Formula 126-2}]$$
$$b_{t,i}^* := \sum_{j=1}^{N_t} v_{t,i,j} a_{t,j}, \mathbb{B}_t^* := (b_{t,1}^*, \ldots, b_{t,N_t}^*),$$
$$(pk^{CP-FE}, sk^{CP-FE}) \xleftarrow{R} \text{Setup}_{CP-FE}(1^\lambda, \vec{n})$$
$$\hat{\mathbb{B}}_0 := (b_{0,1}, b_{0,2}, b_{0,3}, b_{0,4}, b_{0,7}),$$
$$\hat{\mathbb{B}}_t := (b_{t,1}, \ldots, b_{t,n_t}, b_{t,N_t}) \text{ for } t = 1,$$
$$\ldots, d,$$
$$\hat{\mathbb{B}}_0^* := (b_{0,1}^*, b_{0,2}^*, b_{0,3}^*, b_{0,4}^*, b_{0,6}^*),$$
$$\hat{\mathbb{B}}_t^* := (b_{t,1}^*, \ldots, b_{t,n_t}^*, b_{t,n_t+u_t+1}^*, \ldots, b_{t,n_t+u_t+z_t}^*)$$
$$\text{for } t = 1, \ldots, d,$$
$$param_{\vec{n}} := (\{param_{\mathbb{V}_t}\}_{t=0,\ldots,d}, g_T),$$
$$pk := (pk^{CP-FE}, 1^\lambda, param_{\vec{n}},$$
$$\{\hat{\mathbb{B}}_t\}_{t=0,\ldots,d}, b_{0,2}^*, b_{0,3}^*, b_{0,4}^*, b_{0,6}^*,$$
$$\{b_{t,1}^*, \ldots, b_{t,n_t}^*, b_{t,n_t+u_t+1}^*, \ldots, b_{t,n_t+u_t+z_t}^*\}|t=1,$$
$$\ldots, d),$$
$$sk := (sk^{CP-FE}, \hat{\mathbb{B}}_0^*),$$
$$\text{return } pk, sk.$$

With reference to FIG. 12, the process of the KG algorithm will be described.

(S201: Information Input Step)

Using the input device, the information input part 130 takes as input an attribute set $\Gamma := \{(t, \vec{x}_t := (x_{t,1}, \ldots,$ $x_{t,n_t} \in \mathbb{F}_q^{n_t} \setminus \{\vec{0}\}))| 1 \le t \le d\}$. Note that t may be at least some of integers from 1 to d, instead of being all of integers from 1 to d. Also note that attribute information of a user of a decryption key $sk_\Gamma$ is set in the attribute set $\Gamma$, for example.

(S202: CP-FE Decryption Key Generation Step)

Using the processing device, the CP-FE key generation part 141 computes Formula 127, and thus generates a decryption key $sk_\Gamma^{CP-FE}$ of functional encryption.

$$sk_\Gamma^{CP-FE} \xleftarrow{R} KG_{CP-FE}(pk^{CP-FE}, sk^{CP-FE}, \Gamma) \quad [\text{Formula 127}]$$

(S203: Random Number Generation Step)

Using the processing device, the random number generation part 142 generates random numbers, as indicated in Formula 128.

$$\delta, \varphi \xleftarrow{U} \mathbb{F}_q, \quad [\text{Formula 128}]$$
$$\vec{\varphi}_t \xleftarrow{U} \mathbb{F}_q^{z_t} \text{ for } (t, \vec{x}_t) \in \Gamma$$

(S204: Decryption Key k* Generation Step)

Using the processing device, the decryption key k* generation part 143 generates a decryption key $k^*_0$, as indicated in Formula 129.

$$k^*_0 := (1, \delta, 0, 0, 0, \varphi, 0)_{\mathbb{B}_0^*} \quad [\text{Formula 129}]$$

For the basis B and the basis B* indicated in Formula 110, Formula 111 is established. Thus, Formula 129 means that 1 is set as the coefficient of the basis vector $b^*_{0,1}$ of the basis $B^*_0$, $\delta$ is set as the coefficient of the basis vector $b^*_{0,2}$, 0 is set as the coefficient of each of the basis vectors $b^*_{0,3}, \ldots, b^*_{0,5}$, $\varphi$ is set as the coefficient of the basis vector $b^*_{0,6}$, and 0 is set as the coefficient of the basis vector $b^*_{0,7}$.

Using the processing device, the decryption key k* generation part 143 generates a decryption key $k^*_t$ for each integer t included in the attribute set $\Gamma$, as indicated in Formula 130.

$$k^*_t := \left( \overbrace{\delta \vec{x}_t}^{n_t}, \overbrace{0^{u_t}}^{u_t}, \overbrace{\vec{\varphi}_t}^{z_t}, \overbrace{0}^{1} \right)_{\mathbb{B}_t^*}, \text{ for } (t, \vec{x}_t) \in \Gamma \quad [\text{Formula 130}]$$

In Formula 130, $\delta x_{t,1}, \ldots, \delta x_{t,n_t}$ are respectively set as the coefficient of the basis vectors $b^*_{t,1}, \ldots, b^*_{t,n_t}$ of the basis $B^*_t$, 0 is set as the coefficient of each of the basis vectors $b^*_{t,n_t+}, \ldots, b^*_{t,n_t+u_t}, \phi_{t,1}, \ldots, \phi_{t,z_t}$ are respectively set as the coefficient of the basis vectors $b^*_{t,n_t+u_t+1}, \ldots, b^*_{t,n_t+u_t+z_t}$, and 0 is set as the coefficient of the basis vector $b_{t,n_t+u_t+z_t+1}$.

(S205: Key Transmission Step)

Using the communication device and via the network, for example, the key transmission part 150 transmits the decryption key $sk_\Gamma$ having, as elements, the decryption key $sk_\Gamma^{CP-FE}$ of functional encryption, the attribute set $\Gamma$, and the decryption keys $k^*_0$ and $k^*_t$ to the decryption device 300 in secrecy. As a matter of course, the decryption key $sk_\Gamma$ may be transmitted to the decryption device 300 by another method.

In brief, in (S201) through (S204), the key generation device 100 generates the decryption key $sk_\Gamma$ by executing the KG algorithm indicated in Formula 131. In (S205), the key generation device 100 transmits the decryption key $sk_\Gamma$ to the decryption device 300.

$$KG(pk, sk, \Gamma := \{(t, \vec{x}_t) \mid \vec{x}_t \in \mathbb{F}_q^{n_t} \setminus \{\vec{0}\}, 1 \leq t \leq d\}):$$ [Formula 131]

$$sk_\Gamma^{CP\text{-}FE} \xleftarrow{R} KG_{CP\text{-}FE}(pk^{CP\text{-}FE}, sk^{CP\text{-}FE}, \Gamma)$$

$$\delta, \varphi \xleftarrow{U} \mathbb{F}_q, \vec{\varphi}_t \xleftarrow{U} \mathbb{F}_q^{z_t} \text{ for } (t, \vec{x}_t) \in \Gamma$$

$$k_0^* := (1, \delta, 0, 0, 0, \varphi, 0)_{\mathbb{B}_0^*},$$

$$k_t^* := \left(\frac{n_t}{\delta \vec{x}_t}, \frac{u_t}{0^{u_t}}, \frac{z_t}{\vec{\varphi}_t}, \frac{1}{0}\right)_{\mathbb{B}_t^*}, \text{ for } (t, \vec{x}_t) \in \Gamma$$

$$sk_\Gamma := (sk_\Gamma^{CP\text{-}FE}, \Gamma, k_0^*, \{k_t^*\}_{(t,\vec{x}_t) \in \Gamma}),$$

$$\text{return } sk_\Gamma.$$

In (S201), the key generation device 100 generates a decryption key $sk_\Gamma$ by executing the KG algorithm taking as input an attribute set $\Gamma':=\{(t, x'^{\rightarrow}_t:=(x\rightarrow^{\rightarrow}_{t,1}, \ldots, x\rightarrow^{\rightarrow}_{t,nt} \delta \mathbb{F}_q^{nt}\setminus\{0^{\rightarrow}\}))\mid 1\leq t\leq d\}$ in which attribute information $\Gamma':=\{(t, x'^{\rightarrow}_t:=(x\rightarrow^{\rightarrow}_{t,1}, \ldots, x'_{t,nt}\in\mathbb{F}_q^{nt}\setminus\{0^{\rightarrow}\}))\mid 1\leq t\leq d\}$ of a user of the decryption key $sk_\Gamma$ is set. Then, the key generation device 100 transmits the decryption key $sk_\Gamma:=(sk_\Gamma^{CP\text{-}FE}, \Gamma', k'^*_0, \{k'^*_t\}_{(t, x\rightarrow t)\in\Gamma'})$ to the re-encrypted ciphertext decryption device 500.

The function and operation of the encryption device 200 will be described.

The encryption device 200 includes a public parameter receiving part 210, an information input part 220, a signature processing part 230, an encryption part 240, and a ciphertext transmission part 250. The encryption part 240 includes an f vector generation part 241, an s vector generation part 242, a random number generation part 243, and a ciphertext $c^{enc}$ generation part 244.

With reference to FIG. 13, the process of the Enc algorithm will be described.

(S301: Public Parameter Receiving Step)

Using the communication device and via the network, for example, the public parameter receiving part 210 receives the public parameter pk generated by the key generation device 100.

(S302: Information Input Step)

Using the input device, the information input part 220 takes as input an access structure S:=(M, ρ). Note that the access structure S is to be set according to the conditions of a system to be implemented, and that attribute information of a user capable of decrypting a ciphertext $ct_S$ is set in ρ of the access structure S, for example. Note that $\rho(i)=(t, v^{\rightarrow}_i:=(v_{i,1}, \ldots, v_{i,nt})\in\mathbb{F}_q^{nt}\setminus\{0^{\rightarrow}\})$ $(v_{i,nt}\neq 0)$.

Using the input device, the information input part 220 also takes as input a message m to be transmitted to the decryption device 300.

(S303: Signature Key Generation Step)

Using the processing device, the signature processing part 230 computes Formula 132, and thus generates a signature key sigk and a verification key verk of one-time signature.

$$(sigk, verk) \xleftarrow{R} SigKG(1^\lambda)$$ [Formula 132]

(S304: f Vector Generation Step)

Using the processing device, the f vector generation part 241 randomly generates a vector f having r pieces of elements, as indicated in Formula 133.

$$\vec{f} \xleftarrow{U} \mathbb{F}_q^r$$ [Formula 133]

(S305: s Vector Generation Step)

Using the processing device and based on the (L rows×r columns) matrix M included in the access structure S and the vector $f^{\rightarrow}$, the s vector generation part 242 generates a vector $s^{\rightarrow T}$, as indicated in Formula 134.

$$\vec{s}^T:=(s_1, \ldots, s_L)^T:=M\cdot\vec{f}^T$$ [Formula 134]

Using the processing device and based on the vector $f^{\rightarrow}$, the s vector generation part 242 also generates a value so, as indicated in Formula 135.

$$s_0:=\vec{1}\cdot\vec{f}^T$$ [Formula 135]

(S306: Random Number Generation Step)

Using the processing device, the random number generation part 243 generates random numbers, as indicated in Formula 136.

$$\rho, \eta, \zeta \xleftarrow{U} \mathbb{F}_q,$$
$$\theta_i, \eta_i \xleftarrow{U} \mathbb{F}_q \text{ for } i = 1, \ldots, L$$ [Formula 136]

(S307: Ciphertext $c^{enc}$ Generation Step)

Using the processing device, the ciphertext $c^{enc}$ generation part 244 generates a ciphertext $c^{enc}_0$, as indicated in Formula 137.

$$c_0^{enc}:=(\zeta, -s_0, \rho(verk, 1), 0, 0, \eta)_{\mathbb{B}_0}$$ [Formula 137]

Using the processing device, the ciphertext $c^{enc}$ generation part 244 also generates a ciphertext $c^{enc}_i$ for each integer $i=1, \ldots, L$, as indicated in Formula 138.

for $i = 1, \ldots, L$ [Formula 138]

if $\rho(i) =$ $(t, \vec{v}_i := (v_{i,1}, \ldots, v_{i,n_t}) \in \mathbb{F}_q^{n_t} \setminus \{\vec{0}\})(v_{i,n_t} \neq 0),$ $$c_i^{enc} := \left(\frac{n_t}{s_i\vec{e}_{t,1} + \theta_i\vec{v}_i}, \frac{u_t}{0^{u_t}}, \frac{z_t}{0^{z_t}}, \frac{1}{\eta_i}\right)_{\mathbb{B}_t},$$

if $\rho(i) = \neg (t, \vec{v}_i),$ $$c_i^{enc} := \left(\frac{n_t}{s_i\vec{v}_i}, \frac{u_t}{0^{u_t}}, \frac{z_t}{0^{z_t}}, \frac{1}{\eta_i}\right)_{\mathbb{B}_t}$$

Using the processing device, the ciphertext $c^{enc}$ generation part 244 also generates a ciphertext $c^{enc}_{d+1}$, as indicated in Formula 139.

$$c_{d+1}^{enc} = m \cdot g_T^\zeta$$ [Formula 139]

(S308: Signature Generation Step)

Using the processing device, the signature processing part 230 computes Formula 140, and thus generates a signature Sig for an element C:=(S, $\{c^{enc}_i\}_{i=0, \ldots, L}$, $c^{enc}_{d+1}$) of the ciphertext $ct_S$.

$$Sig \xleftarrow{R} Sig(sigk, C = (\mathbb{S}, \{c_i^{enc}\}_{i=0, \ldots L}, c_{d+1}^{enc}))$$ [Formula 140]

(S309: Ciphertext Transmission Step)

Using the communication device and via the network, for example, the ciphertext transmission part 250 transmits the ciphertext $ct_S$ having, as elements, the access structure S, the ciphertexts $c^{enc}_0, c^{enc}_1, \ldots, c^{enc}_L$, and $c^{enc}_{d+1}$, the verification key verk, and the signature Sig to the decryption device 300.

As a matter of course, the ciphertext $ct_S$ may be transmitted to the decryption device 300 by another method.

In brief, in (S301) through (S308), the encryption device 200 generates the ciphertext $ct_S$ by executing the Enc algorithm indicated in Formula 141. In (S309), the encryption device 200 transmits the generated ciphertext $ct_S$ to the decryption device 300.

$$Enc(pk, m, \mathbb{S} = (M, \rho)): \qquad \text{[Formula 141]}$$

$$(sigk, verk) \xleftarrow{R} SigKG(1^\lambda)$$

$$\vec{f} \xleftarrow{U} \mathbb{F}_q^r, \vec{s}^T := (s_1, \ldots, s_L)^T := M \cdot \vec{f}^T,$$

$$s_0 := \vec{1} \cdot \vec{f}^T,$$

$$\rho, \eta, \zeta \xleftarrow{U} \mathbb{F}_q,$$

$$c_0^{enc} := (\zeta, -s_0, \rho(verk), 1), 0, 0, \eta)_{\mathbb{B}_0},$$

for $i = 1, \ldots, L$ if $\rho(i) =$ $$(t, \vec{v}_i := (v_{i,1}, \ldots, v_{i,n_t}) \in \mathbb{F}_q^{n_t} \setminus \{\vec{0}\})(v_{i,n_t} \neq 0),$$

$$\theta_i, \eta_i \xleftarrow{U} \mathbb{F}_q,$$

$$c_i^{enc} := \left( \frac{n_t}{s_i \vec{e}_{t,1} + \theta_i \vec{v}_i}, \frac{u_t}{0^{u_t}}, \frac{z_t}{0^{z_t}}, \frac{1}{\eta_i} \right)_{\mathbb{B}_t},$$

if $\rho(i) = \neg (t, \vec{v}_i),$ $$\eta_i \xleftarrow{U} \mathbb{F}_q,$$

$$c_i^{enc} := \left( \frac{n_t}{s_i \vec{v}_i}, \frac{u_t}{0^{u_t}}, \frac{z_t}{0^{z_t}}, \frac{1}{\eta_i} \right)_{\mathbb{B}_t},$$

$$c_{d+1}^{enc} = m \cdot g_T^\zeta,$$

$$Sig \xleftarrow{R} Sig(sigk, C = (\mathbb{S}, \{c_i^{enc}\}_{i=0, \ldots, L}, c_{d+1}^{enc}))$$

$$ct_\mathbb{S} = (\mathbb{S}, \{c_i^{enc}\}_{i=0, \ldots, L}, c_{d+1}^{enc}, verk, Sig),$$

return $ct_\mathbb{S}$.

The function and operation of the decryption device 300 will be described.

The decryption device 300 includes a decryption key receiving part 310, an information input part 320, a re-encryption key generation part 330, a re-encryption key transmission part 340, a ciphertext receiving part 350, a verification part 360, a complementary coefficient computation part 370, a pairing operation part 380, and a message computation part 390. The re-encryption key generation part 330 includes a random number generation part 331, a conversion information $W_1$ generation part 332, a conversion information $W_1$ encryption part 333, a decryption key $k^{*rk}$ generation part 334, and a conversion part 335. The verification part 360 includes a span program computation part 361 and a signature verification part 362.

With reference to FIG. 14, the process of the RKG algorithm will be described. The Dec2 algorithm will be described later.

(S401: Decryption Key Receiving Step)

Using the communication device and via the network, for example, the decryption key receiving part 310 receives the decryption key $sk_\Gamma$ transmitted by the key generation device 100. The decryption key receiving part 310 also receives the public parameter pk generated by the key generation device 100.

(S402: Information Input step)

Using the input device, the information input part 320 takes as input an access structure $S' := (M', \rho')$. Note that the access structure S' is to be set according to the conditions of a system to be implemented, and that attribute information of a user capable of decrypting a re-encrypted ciphertext $CT_{S'}$ is set in $\rho'$ of the access structure S', for example. Note that $\rho'(i) = (t, \vec{v}'_i := (v'_{i,1}, \ldots, v'_{i,nt}) \in \mathbb{F}_q^{nt} \setminus \{\vec{0}\})(v'_{i,nt} \neq 0)$.

(S403: Random Number Generation Step)

Using the processing device, the random number generation part 331 generates random numbers, as indicated in Formula 142.

$$\delta', \varphi' \xleftarrow{U} \mathbb{F}_q, \qquad \text{[Formula 142]}$$

$$\vec{\varphi}'_t \xleftarrow{U} \mathbb{F}_q^{z_t} \text{ for } (t, \vec{x}_t) \in \Gamma$$

(S404: Conversion Information $W_1$ Generation Step)

Using the processing device, the conversion information $W_1$ generation part 332 generates conversion information $W_1$, as indicated in Formula 143.

$$W_1 \xleftarrow{R} GL(7, \mathbb{F}_q) \qquad \text{[Formula 143]}$$

(S405: Conversion Information $W_1$ Encryption Step)

Using the processing device, the conversion information $W_1$ encryption part 333 computes Formula 144, and thus encrypts the conversion information $W_1$ with functional encryption and generates encrypted conversion information $\psi^{rk}$. Since the conversion information $W_1$ is encrypted with functional encryption on input of the access structure S', the conversion information $W_1$ is encrypted with the attribute information of the user capable of decrypting the re-encrypted ciphertext $CT_{S'}$ being set.

$$\psi^{rk} \xleftarrow{R} Enc_{CP-FE}(pk^{CP-FE}, S', W_1) \qquad \text{[Formula 144]}$$

(S406: Decryption Key $k^{*rk}$ Generation Step)

Using the processing device, the decryption key $k^{*rk}$ generation part 334 generates a decryption key $k^{*rk}_0$, as indicated in Formula 145.

$$k^{*rk}_0 := (k^*_0 + (0, \delta', 0, 0, 0, \rho', 0)_{\mathbb{B}^*}) W_1 \qquad \text{[Formula 145]}$$

Using the processing device, the decryption key $k^{*rk}$ generation part 334 also generates a decryption key $k^{*rk}_t$ for each integer t included in the attribute set $\Gamma$, as indicated in Formula 146.

$$k^{*rk}_t := k^*_t + \left( \frac{n_t}{\delta' \vec{x}_t}, \frac{u_t}{0^{u_t}}, \frac{z_t}{\vec{\varphi}'_t}, \frac{1}{0} \right)_{\mathbb{B}^*_t}, \text{ for } (t, \vec{x}_t) \in \Gamma \qquad \text{[Formula 146]}$$

(S407: Conversion Step)

Using the processing device, the conversion part 335 computes Formula 147, and thus generates a basis $\hat{\mathbb{D}}^*_0$.

$$d^*_{0,i} := b^*_{0,i} W_1 \text{ for } i=2,3,4,6,$$

$$\hat{\mathbb{D}}^*_0 := (d^*_{0,2}, d^*_{0,3}, d^*_{0,4}, d^*_{0,6}) \qquad \text{[Formula 147]}$$

(S408: Key Transmission Step)

Using the communication device and via the network, for example, the re-encryption key transmission part 340 transmits the re-encryption key $rk_{(\Gamma,S')}$ having, as elements, the attribute set $\Gamma$, the access structure S', the decryption keys $k^{*rk}_0$ and $k^{*rk}_t$, the encrypted conversion information $\psi^{rk}$, and the basis $\hat{D}^*_0$ to the re-encryption device 400 in secrecy. As a matter of course, the re-encryption key $rk_{(\Gamma,S')}$ may be transmitted to the re-encryption device 400 by another method.

In brief, in (S401) through (S407), the decryption device 300 generates the re-encryption key $rk_{(\Gamma,S')}$ by executing the RKG algorithm indicated in Formula 148. In (S408), the decryption device 300 transmits the generated re-encryption key $rk_{(\Gamma,S')}$ to the re-encryption device 400.

$$RKG\left(pk, sk_\Gamma = \left(sk_\Gamma^{CP-FE}, \Gamma, k_0^*, \{k_t^*\}_{(t,\vec{x}_t)\in\Gamma}\right),\right.$$ [Formula 148]
$$\mathbb{S}' = (M', \rho')\Big):$$
$$\delta', \varphi' \xleftarrow{U} \mathbb{F}_q,$$
$$\vec{\varphi}'_t \xleftarrow{U} \mathbb{F}_q^{z_t} \text{ for } (t, \vec{x}_t) \in \Gamma,$$
$$W_1 \xleftarrow{R} GL(7, \mathbb{F}_q),$$
$$\psi^{rk} \xleftarrow{R} Enc_{CP-FE}(pk^{CP-FE}, \mathbb{S}', W_1),$$
$$k_0^{*rk} := \left(k_0^* + (0, \delta', 0, 0, 0, \varphi', 0)_{\mathbb{B}_0^*}\right)W_1,$$
$$k_t^{*rk} := k_t^* + \left(\overbrace{\delta'\vec{x}_t}^{n_t}, \overbrace{0_t^\mu}^{u_t}, \overbrace{\vec{\varphi}'_t, 0}^{z_t \; 1}\right)_{\mathbb{B}_t^*}, \text{ for } (t, \vec{x}_t) \in \Gamma,$$
$$d_{0,i}^* := b_{0,i}^* W_1 \text{ for } i = 2, 3, 4, 6,$$
$$\hat{\mathbb{D}}_0^* := (d_{0,2}^*, d_{0,3}^*, d_{0,4}^*, d_{0,6}^*),$$
$$rk_{(\Gamma,\mathbb{S}')} = \left(\Gamma, \mathbb{S}', k_0^{*rk}, \{k_t^{*rk}\}_{(t,\vec{x})\in\Gamma}, \psi^{rk}, \hat{\mathbb{D}}_0^*\right),$$
$$\text{return } rk_{(\Gamma,\mathbb{S}')}.$$

The function and operation of the re-encryption device 400 will be described.

The re-encryption device 400 includes a public parameter receiving part 410, a ciphertext receiving part 420, a re-encryption key receiving part 430, a verification part 440, an encryption part 450, and a re-encrypted ciphertext transmission part 460. The verification part 440 includes a span program computation part 441 and a signature verification part 442. The encryption part 450 includes a random number generation part 451, an f vector generation part 452, an s vector generation part 453, a conversion information $W_2$ generation part 454, a conversion information $W_2$ encryption part 455, a ciphertext $c^{renc}$ generation part 456, and a decryption key $k^{*renc}$ generation part 457.

With reference to FIG. 15, the process of the REnc algorithm will be described.

(S501: Public Parameter Receiving Step)

Using the communication device and via the network, for example, the public parameter receiving part 410 receives the public parameter pk generated by the key generation device 100.

(S502: Ciphertext Receiving Step)

Using the communication device and via the network, for example, the ciphertext receiving part 420 receives the ciphertext $ct_S$ transmitted by the encryption device 200.

(S503: Re-Encryption Key Receiving Step)

Using the communication device and via the network, for example, the re-encryption key receiving part 430 receives the re-encryption key $rk_{(\Gamma,S')}$ transmitted by the decryption device 300.

(S504: Span Program Computation Step)

Using the processing device, the span program computation part 441 determines whether or not the access structure S included in the ciphertext $ct_S$ accepts $\Gamma$ included in the re-encryption key $rk_{(\Gamma,S')}$. The method for determining whether or not the access structure S accepts $\Gamma$ is as described in "3. Concept for Implementing FPRE" in Embodiment 1.

If the access structure S accepts $\Gamma$ (accept in S504), the span program computation part 441 advances the process to (S505). If the access structure S rejects $\Gamma$ (reject in S504), the span program computation part 441 ends the process.

(S505: Signature Verification Step)

Using the processing device, the signature verification part 442 determines whether or not a result of computing Formula 149 is 1. If the result is 1 (valid in S505), the signature verification part 442 advances the process to (S506). If the result is 0 (invalid in S505), the signature verification part 442 ends the process.

$$Ver(verk, C=(\mathbb{S}, \{c_i^{enc}\}_{i=0,\ldots,L}, c_{d+1}^{enc}), Sig)$$ [Formula 149]

(S506: Random Number Generation Step)

Using the processing device, the random number generation part 451 generates random numbers, as indicated in Formula 150.

$$\delta'', \varphi'', \sigma, \rho', \eta', \zeta', \theta_i', \eta_i' \xleftarrow{U} \mathbb{F}_q \text{ for } i = 1, \cdots, L,$$ [Formula 150]
$$\vec{\varphi}_t'' \xleftarrow{U} \mathbb{F}_q^{z_t} \text{ for } (t, \vec{x}_t) \in \Gamma$$

(S507: f Vector Generation Step)

Using the processing device, the f vector generation part 452 randomly generates a vector $\vec{f}'$ having r pieces of elements, as indicated in Formula 151.

$$\vec{f}' \xleftarrow{R} \mathbb{F}_q^r$$ [Formula 151]

(S508: s Vector Generation Step)

Using the processing device and based on the (L rows×r columns) matrix M included in the access structure S and the vector $\vec{f}'$, the s vector generation part 453 generates a vector $\vec{s}'^T$, as indicated in Formula 152.

$$\vec{s}'^T := (s_1', \ldots, s_L')^T := M \cdot \vec{f}'^T$$ [Formula 152]

Using the processing device and based on the vector $\vec{f}'$, the s vector generation part 453 also generates a value $s_0'$, as indicated in Formula 153.

$$s_0' := \vec{1} \cdot \vec{f}'^T$$ [Formula 153]

(S509: Conversion Information $W_2$ Generation Step)

Using the processing device, the conversion information $W_2$ generation part 454 generates conversion information $W_2$, as indicated in Formula 154.

$$W_2 \xleftarrow{R} GL(7, \mathbb{F}_q)$$ [Formula 154]

(S510: Conversion Information $W_2$ Encryption Step)

Using the processing device, the conversion information $W_2$ encryption part 455 computes Formula 155, and thus encrypts the conversion information $W_2$ with functional encryption and generates encrypted conversion information $\psi^{renc}$. Since the conversion information $W_2$ is encrypted with functional encryption on input of the access structure S', the conversion information $W_2$ is encrypted with the attribute information of the user capable of decrypting the re-encrypted ciphertext $CT_{S'}$ being set.

$$\psi^{renc} \xleftarrow{R} Enc_{CP\text{-}FE}(pk^{CP\text{-}FE}, S', W_2) \quad \text{[Formula 155]}$$

(S511: Ciphertext $c^{renc}$ Generation Step)

Using the processing device, the ciphertext $c^{renc}$ generation part 456 also generates a ciphertext $c^{renc}_0$, as indicated in Formula 156.

$$c_0^{renc} := (c_0^{enc} + (\zeta', -s'_0, \rho'(verk, 1), 0, 0, \eta'^{\cdot})_{\mathbb{B}_0}) W_2 \quad \text{[Formula 156]}$$

Using the processing device, the ciphertext $c^{renc}$ generation part 456 also generates a ciphertext $c^{renc}_i$ for each integer i= 1, ..., L, as indicated in Formula 157.

$$\text{for } i = 1, \ldots, L \quad \text{[Formula 157]}$$

if $\rho(i) =$ $$(t, \vec{v}_i := (v_{i,1}, \ldots, v_{i,n_t}) \in \mathbb{F}_q^{n_t} \setminus \{\vec{0}\})(v_{i,n_t} \neq 0),$$

$$c_i^{renc} := c_i^{enc} + \left(\overbrace{s'_i \vec{e}_{t,1} + \theta'_i \vec{v}_i}^{n_t}, \overbrace{0^{u_t}}^{u_t}, \overbrace{0^{z_t}, \eta'_i}^{z_t \; 1}\right)_{\mathbb{B}_t},$$

if $\rho(i) = \neg (t, \vec{v}_i)$, $$c_i^{renc} := c_i^{enc} + \left(\overbrace{s'_i \vec{v}_i}^{n_t}, \overbrace{0^{u_t}}^{u_t}, \overbrace{0^{z_t}, \eta'_i}^{z_t \; 1}\right)_{\mathbb{B}_t}$$

Using the processing device, the ciphertext $c^{renc}$ generation part 456 also generates a ciphertext $c^{renc}_{d+1}$, as indicated in Formula 158.

$$c_{d+1}^{renc} = c_{d+1}^{enc} \cdot g_T^{\zeta'} \quad \text{[Formula 158]}$$

(S512: Decryption Key $k^{*renc}$ Generation Step)

Using the processing device, the decryption key $k^{*renc}$ generation part 457 generates a decryption key $k^{*renc}_0$, as indicated in Formula 159.

$$k^{*renc}_0 := k^{*rk} + (0, \delta'', \sigma(-1, verk), 0, \phi'', 0)_{\mathbb{B}^*_0} \quad \text{[Formula 159]}$$

Using the processing device, the decryption key $k^{*renc}$ generation part 457 also generates a decryption key $k^{*renc}_t$ for each integer t included in the attribute set $\Gamma$, as indicated in Formula 160.

$$k^{*renc}_t := k^{*rk}_t + \left(\overbrace{\delta'' \vec{x}_t}^{n_t}, \overbrace{0^{u_t}}^{u_t}, \overbrace{\vec{\phi}''_t, 0}^{z_t \; 1}\right)_{\mathbb{B}^*_t}, \text{ for } (t, \vec{x}_t) \in \Gamma \quad \text{[Formula 160]}$$

(S513: Re-Encrypted Ciphertext Transmission Step)

Using the communication device and via the network, for example, the re-encrypted ciphertext transmission part 460 transmits the re-encrypted ciphertext $CT_{S'}$, having, as elements, the access structure S', the access structure S, the attribute set $\Gamma$, the decryption keys $k^{*renc}_0$ and $k^{*renc}_t$, the ciphertexts $c^{renc}_0$, $c^{renc}_i$, and $c^{renc}_{d+1}$, the encrypted conversion information $\psi^{rk}$, and the encrypted conversion information $\psi^{renc}$ to the re-encryption device 400 in secrecy. As a matter of course, the re-encrypted ciphertext $CT_{S'}$ may be transmitted to the re-encryption device 400 by another method.

In brief, in (S501) through (S512), the re-encryption device 400 generates the re-encrypted ciphertext $CT_{S'}$ by executing the REnc algorithm indicated in Formula 161-1 and Formula 161-2. In (S513), the re-encryption device 400 transmits the generated re-encrypted ciphertext $CT_{S'}$ to the re-encrypted ciphertext decryption device 500.

$$REnc(rk_{(\Gamma, S')} = (\Gamma, S', k_0^{*rk}, \{k_t^{*rk}\}_{(t,\vec{x})\in\Gamma}, \psi^{rk}, \hat{\mathbb{D}}_0^*), \quad \text{[Formula 161-1]}$$

$$ct_S = (S, \{c_i^{enc}\}_{i=0,\ldots,L}, c_{d+1}^{enc}), verk, Sig)):$$

If $S$ accepts $\Gamma := \{(t, \vec{x}_t)\}$, and $$Ver(verk, C = (S, \{c_i^{enc}\}_{i=0,\ldots,L}, c_{d+1}^{enc}), Sig) = 1,$$

then compute following $\{c_i^{renc}\}_{i=0,\ldots,L}, c_{d+1}^{renc}), k_0^{*renc},$ and $\{k_t^{*renc}\}_{(t,\vec{x})\in\Gamma}$ $$\delta'', \varphi'', \sigma, \rho', \eta', \zeta' \xleftarrow{U} \mathbb{F}_q, \vec{\varphi}''_t \xleftarrow{U} \mathbb{F}_q^{z_t}, \text{ for } (t, \vec{x}_t) \in \Gamma$$

$$\vec{f}' \xleftarrow{R} \mathbb{F}_q^r,$$

$$\vec{s}'^T := (s'_1, \ldots, s'_L)^T := M \cdot \vec{f}'^T, s'_0 := \vec{1} \cdot \vec{f}'^T,$$

$$W_2 \xleftarrow{R} GL(7, \mathbb{F}_q),$$

$$\psi^{renc} \xleftarrow{R} Enc_{CP\text{-}FE}(pk^{CP\text{-}FE}, S', W_2),$$

The function and operation of the re-encrypted ciphertext decryption device 500 will be described.

The re-encrypted ciphertext decryption device 500 includes a decryption key receiving part 510, a ciphertext receiving part 520, a span program computation part 530, a complementary coefficient computation part 540, a conversion information generation part 550, a conversion part 560, a pairing operation part 570, and a message computation part 580. The pairing operation part 570 and the message computation part 580 will be referred to collectively as a decryption part.

With reference to FIG. 16, the process of the Dec1 algorithm will be described.

(S601: Decryption Key Receiving Step)

Using the communication device and via the network, for example, the decryption key receiving part 510 receives the decryption key $sk_\Gamma$, transmitted by the key generation device 100. The decryption key receiving part 310 also receives the public parameter pk generated by the key generation device 100.

(S602: Ciphertext Receiving Step)

Using the communication device and via the network, for example, the ciphertext receiving part 520 receives the re-encrypted ciphertext $CT_{S'}$, transmitted by the re-encryption device 400.

(S603: Span Program Computation Step)

Using the processing device, the span program computation part 530 determines whether or not the access structure S included in the re-encrypted ciphertext $CT_{S'}$, accepts $\Gamma$ included in the re-encrypted ciphertext $CT_{S'}$, and determines whether or not the access structure S' included in the re-encrypted ciphertext $CT_{S'}$, accepts $\Gamma'$ included in the decryption key $sk_{\Gamma'}$. The method for determining whether or not the access structure S accepts $\Gamma$ and whether or not the access structure S' accepts $\Gamma'$ is as described in "3. Concept for Implementing FPRE" in Embodiment 1.

If the access structure S accepts $\Gamma$ and the access structure S' accepts $\Gamma'$ (accept in S603), the span program computation part 530 advances the process to (S604). If the access structure S rejects Γ or the access structure S' rejects Γ' (reject in S603), the span program computation part 530 ends the process.

(S604: Complementary Coefficient Computation Step)

Using the processing device, the complementary coefficient computation part 540 computes I and a constant (complementary coefficient) $\{\alpha_i\}_{i \in I}$ such that Formula 162 is satisfied.

$$\vec{1} = \sum_{i \in I} \alpha_i M_i \quad \text{[Formula 162]}$$

where $M_i$ is the $i$-th row of $M$, and $I \subseteq$ $$\{i \in \{1, \ldots, L\} \mid [\rho(i) = (t, \vec{v}_i) \wedge (t, \vec{x}_t) \in \Gamma \wedge \vec{v}_i \cdot \vec{x}_t = 0] \vee [\rho(i) = \neg(t, \vec{v}_i) \wedge (t, \vec{x}_t) \in \Gamma \wedge \vec{v}_i \cdot \vec{x}_t \neq 0]\}$$

(S605: Conversion Information Generation Step)

Using the processing device, the conversion information generation part 550 generates conversion information $\tilde{W}_1$ and $\tilde{W}_2$, as indicated in Formula 163.

$$\tilde{W}_1 \xleftarrow{R} Dec_{CP\text{-}FE}\left(pk^{CP\text{-}FE}, sk_\Gamma^{CP\text{-}FE}, \psi^{rk}\right), \quad \text{[Formula 163]}$$

$$\tilde{W}_2 \xleftarrow{R} Dec_{CP\text{-}FE}\left(pk^{CP\text{-}FE}, sk_\Gamma^{CP\text{-}FE}, \psi^{renc}\right)$$

(S606: Conversion Step)

Using the processing device, the conversion part 560 generates a decryption key $\tilde{k}^*_0$ by converting the basis of the decryption key $k^{*renc}_0$, and generates a ciphertext $\tilde{c}_0$ by converting the basis of the ciphertext $c^{renc}$, as indicated in Formula 164.

$$\tilde{k}^*_0 := k^{*renc}_0 \tilde{W}_1^{-1},$$

$$\tilde{c}_0 := c_0^{renc} \tilde{W}_2^{-1} \quad \text{[Formula 164]}$$

(S607: Pairing Operation Step)

Using the processing device, the pairing operation part 570 computes Formula 156, and thus generates a session key $\tilde{K}$.

$$\tilde{K} := e(\tilde{c}_0, \tilde{k}^*_0) \cdot \prod_{i \in I \wedge \rho(i) = (t, \vec{v}_i)} e(c_i^{renc}, k_t^{*renc})^{\alpha_i} \cdot \quad \text{[Formula 165]}$$

$$\prod_{i \in I \wedge \rho(i) = \neg(t, \vec{v}_i)} e(c_i^{renc}, k_t^{*renc})^{\alpha_i / (\vec{v}_i \cdot \vec{x}_t)}$$

(S608: Message Computation Step)

Using the processing device, the message computation part 390 computes $m' = c^{enc}_{d+1} / \tilde{K}$, and thus generates a message $m'(=m)$.

In brief, in (S601) through (S608), the re-encrypted ciphertext decryption device 500 generates the message $m'(=m)$ by executing the Dec1 algorithm indicated in Formula 166.

$$Dec_1\left(pk, sk_{\Gamma'} = \left(sk_{\Gamma'}^{CP\text{-}FE}, \Gamma', k^*_0, \{k^*_t\}_{(t, \vec{x}'_t) \in \Gamma'}\right), \quad \text{[Formula 166]}$$

$$CT_{\mathbb{S}'} = \left(\mathbb{S}', \mathbb{S}, \Gamma, k^{*renc}_0, \{k^{*renc}_t\}_{(t, \vec{x}'_t) \in \Gamma'}\right),$$

$\{c_i^{renc}\}i = 0, \ldots, L, c^{renc}_{d+1}, \psi^{rk}, \psi^{renc}\bigr)$:

If $\mathbb{S}$ accepts $\Gamma := \{(t, \vec{x}_t)\}$ and $\mathbb{S}'$ accepts $\Gamma' := (t, (\vec{x}'_t))$, then compute $I$ and $\{\alpha_i\}_{i \in I}$ such that $$\vec{1} = \sum_{i \in I} \alpha_i M_i$$

where $M_i$ is the $i$-th row of $M$, and $I \subseteq \{i \in \{1, \ldots, L\} \mid [\rho(i) =$ $$(t, \vec{v}_i) \wedge (t, \vec{x}_t) \in \Gamma \wedge \vec{v}_i \cdot \vec{x}_t = 0] \vee [\rho(i) =$$

$$\neg(t, \vec{v}_i) \wedge (t, \vec{x}_t) \in \Gamma \wedge \vec{v}_i \cdot \vec{x}_t \neq 0]\},$$

$$\tilde{W}_1 \xleftarrow{R} Dec_{CP\text{-}FE}\left(pk^{CP\text{-}FE}, sk_\Gamma^{CP\text{-}FE}, \psi^{rk}\right),$$

$$\tilde{W}_2 \xleftarrow{R} Dec_{CP\text{-}FE}\left(pk^{CP\text{-}FE}, sk_\Gamma^{CP\text{-}FE}, \psi^{renc}\right),$$

$$\tilde{k}^*_0 := k^{*renc}_0 \tilde{W}_1^{-1},$$

$$\tilde{c}_0 := c_0^{renc} \tilde{W}_2^{-1},$$

$$\tilde{K} := e(\tilde{c}_0, \tilde{k}^*_0) \cdot \prod_{i \in I \wedge \rho(i) = (t, \vec{v}_i)} e(c_i^{renc}, k_t^{*renc})^{\alpha_i} \cdot$$

$$\prod_{i \in I \wedge \rho(i) = \neg(t, \vec{v}_i)} e(c_i^{renc}, k_t^{*renc})^{\alpha_i / (\vec{v}_i \cdot \vec{x}_t)}$$

$$m' := c^{enc}_{d+1} / \tilde{K},$$

return $m'$.

With reference to FIG. 17, the process of the Dec2 algorithm will be described.

(S701: Decryption Key Receiving Step)

Using the communication device and via the network, for example, the decryption key receiving part 310 receives the decryption key $sk_\Gamma$ transmitted by the key generation device 100. The decryption key receiving part 310 also receives the public parameter pk generated by the key generation device 100.

(S702: Ciphertext Receiving Step)

Using the communication device and via the network, for example, the ciphertext receiving part 350 receives the ciphertext $ct_S$ transmitted by the re-encryption device 400.

(S703: Span Program Computation Step)

Using the processing device, the span program computation part 361 determines whether or not the access structure S included in the ciphertext $ct_S$ accepts Γ included in the decryption key $sk_\Gamma$. The method for determining whether or not the access structure S accepts Γ is as described in "3. Concept for Implementing FPRE" in Embodiment 1.

If the access structure S accepts Γ (accept in S703), the span program computation part 361 advances the process to (S704). If the access structure S rejects Γ (reject in S703), the span program computation part 361 ends the process.

(S704: Signature Verification Step)

Using the processing device, the signature verification part 362 determines whether or not a result of computing Formula 167 is 1. If the result is 1 (valid in S704), the signature verification part 442 advances the process to (S705). If the result is 0 (invalid in S704), the signature verification part 442 ends the process.

$$Ver(verk, C = (\mathbb{S}, \{c_i^{enc}\}_{i=0, \ldots, L}, c^{enc}_{d+1}), Sig) \quad \text{[Formula 167]}$$

(S705: Complementary Coefficient Computation Step)

Using the processing device, the complementary coefficient computation part 370 computes I and a constant (complementary coefficient) $\{\alpha_i\}_{i \in I}$ such that Formula 168 is satisfied.

$$\vec{1} = \sum_{i \in I} \alpha_i M_i \quad \text{[Formula 168]}$$

where $M_i$ is the $i$-th row of $M$, and $I \subseteq$ $$\{i \in \{1, \ldots, L\} \mid [\rho(i) = (t, \vec{v}_i) \wedge (t, \vec{x}_t) \in \Gamma \wedge \vec{v}_i \cdot \vec{x}_t =$$
$$0] \vee [\rho(i) = \neg (t, \vec{v}_i) \wedge (t, \vec{x}_t) \in \Gamma \wedge \vec{v}_i \cdot \vec{x}_t \neq 0]\}$$

(S706: Pairing Operation Step)

Using the processing device, the pairing operation part 380 computes Formula 169, and thus generates a session key K.

$$K := e(c_0^{enc}, k_0^*) \cdot \prod_{i \in I \wedge \rho(i)=(t,\vec{v}_i)} e(c_i^{enc}, k_t^*) \quad \text{[Formula 169]}$$
$$\alpha_i \cdot \prod_{i \in I \wedge \rho(i) = \neg(t,\vec{v}_i)} e(c_i^{enc}, k_t^*) \alpha_i / (\vec{v}_i \cdot \vec{x}_t)$$

(S707: Message Computation Step)

Using the processing device, the message computation part 390 computes m'=$c^{enc}_{d+1}$/K, and thus generates a message m'(=m).

In brief, in (S701) through (S707), the decryption device 300 generates the message m'(=m) by executing the Dec2 algorithm indicated in Formula 170.

$$Dec_2(pk, sk_\Gamma = (sk_\Gamma^{CP-FE}, \Gamma, k_0^*, \{k_t^*\}_{(t,\vec{x}_t) \in \Gamma})), \quad \text{[Formula 170]}$$
$$ct_\mathbb{S} = (\mathbb{S}, \{c_i^{enc}\}_{i=0,\ldots,L}, c_{d+1}^{enc}, verk, Sig)):$$

If $\mathbb{S}$ accepts $\Gamma := \{(t, \vec{x}_t)\}$ and $Ver(verk, C = (\mathbb{S}, \{c_i^{enc}\}_{i=0,\ldots,L}, c_{d+1}^{enc}), Sig) = 1,$ then compute $I$ and $\{\alpha_i\}_{i \in I}$ such that $$\vec{1} = \sum_{i \in I} \alpha_i M$$

where $M_i$ is the $i$-th row of $M$, and $I \subseteq$ $$\{i \in \{1, \ldots, L\} \mid [\rho(i) = (t, \vec{v}_i) \wedge (t, \vec{x}_t) \in \Gamma \wedge \vec{v}_i \cdot \vec{x}_t =$$
$$0] \vee [\rho(i) = \neg (t, \vec{v}_i) \wedge (t, \vec{x}_t) \in \Gamma \wedge \vec{v}_i \cdot \vec{x}_t \neq 0]\}$$

$$K := e(c_0^{enc}, k_0^*) \cdot \prod_{i \in I \wedge \rho(i)=(t,\vec{v}_i)} e(c_i^{enc}, k_t^*)$$
$$\alpha_i \cdot \prod_{i \in I \wedge \rho(i) = \neg(t,\vec{v}_i)} e(c_i^{enc}, k_t^*) \alpha_i / (\vec{v}_i \cdot \vec{x}_t)$$

$m' = c_{d+1}^{enc} / K,$ return $m'$.

As described above, the cryptographic system according to Embodiment 1 can implement the CP-FPRE scheme. Thus, a ciphertext can be forwarded to a set of various types of users with a single re-encryption key.

As a result, for example, various ciphertexts existing on a network can be securely forwarded to users having various attributes, without decrypting the ciphertexts. It is thus possible to securely and practically entrust processing of ciphertexts to a trusted third party.

It has been described above that the decryption device 300 also functions as a re-encryption key generation device, and that the decryption device 300 executes the RKG algorithm as well as the Dec2 algorithm. However, the decryption device 300 and the re-encryption key generation device may be implemented separately. In this case, the decryption device 300 executes the Dec2 algorithm, and the re-encryption key generation device executes the RKG algorithm. In this case, therefore, the decryption device 300 includes functional components that are required to execute the Dec2 algorithm, and the re-encryption key generation device includes functional components that are required to execute the RKG algorithm.

Embodiment 2

The CP-FPRE scheme has been described in Embodiment 1. In Embodiment 2, a key-policy FPRE scheme (KP-FPRE) scheme will be described.

First, a basic structure of the KP-FPRE scheme will be described. Then, a basic configuration of a cryptographic processing system 10 that implements the KP-FPRE scheme will be described. Then, items used for implementing the KP-FPRE scheme will be described. Then, the KP-FPRE scheme and the cryptographic processing system 10 according to this embodiment will be described in detail.

The basic structure of the KP-FPRE scheme will be briefly described. KP (key policy) means that a policy, namely an access structure, is embedded in a key.

<1-1. Basic Structure of KP-FPRE Scheme>

The KP-FPRE scheme consists of seven algorithms: Setup, KG, Enc, RKG, Renc, Dec1, and Dec2.

(Setup)

A Setup algorithm is a probabilistic algorithm that takes as input a security parameter $\lambda$ and an attribute format $\vec{n} := (d; n_1, \ldots, n_d; u_1, \ldots, u_d; z_1, \ldots, z_d)$, and outputs a public parameter pk and a master key sk.

(KG)

A KG algorithm is a probabilistic algorithm that takes as input an access structure S=(M, $\rho$), the public parameter pk, and the master key sk, and outputs a decryption key $sk_S$.

(Enc)

An Enc algorithm is a probabilistic algorithm that takes as input a message m, an attribute set $\Gamma := \{(t, \vec{x}_t) \mid \vec{x}_t \in F_q^{nt}, 1 \leq t \leq d\}$, and the public parameter pk, and outputs a ciphertext $ct_\Gamma$.

(RKG)

An RKG algorithm is a probabilistic algorithm that takes as input the decryption key $sk_S$, an attribute set $\Gamma' := \{(t, \vec{x'}_t) \mid \vec{x'}_t \in F_q^{nt}, 1 \leq t \leq d\}$, and the public parameter pk, and output a re-encryption key $rk_{(S,\Gamma')}$.

(REnc)

An REnc algorithm is a probabilistic algorithm that takes as input the ciphertext $ct_\Gamma$, the re-encryption key $rk_{(S,\Gamma')}$, and the public parameter pk, and outputs a re-encrypted ciphertext $CT_\Gamma$.

(Dec1)

A Dec1 algorithm is an algorithm that takes as input the re-encrypted ciphertext $CT_\Gamma$, the decryption key $sk_S$, and the public parameter pk, and outputs the message m or the distinguished symbol $\perp$.

(Dec2)

A Dec2 algorithm is an algorithm that takes as input the ciphertext $ct_\Gamma$, the decryption key $sk_\Gamma$, and the public parameter pk, and outputs the message m or the distinguished symbol $\bot$.

<1-2. Cryptographic Processing System 10>

The cryptographic processing system 10 that executes the algorithms of the KP-FPRE scheme will be described.

Figure 18:
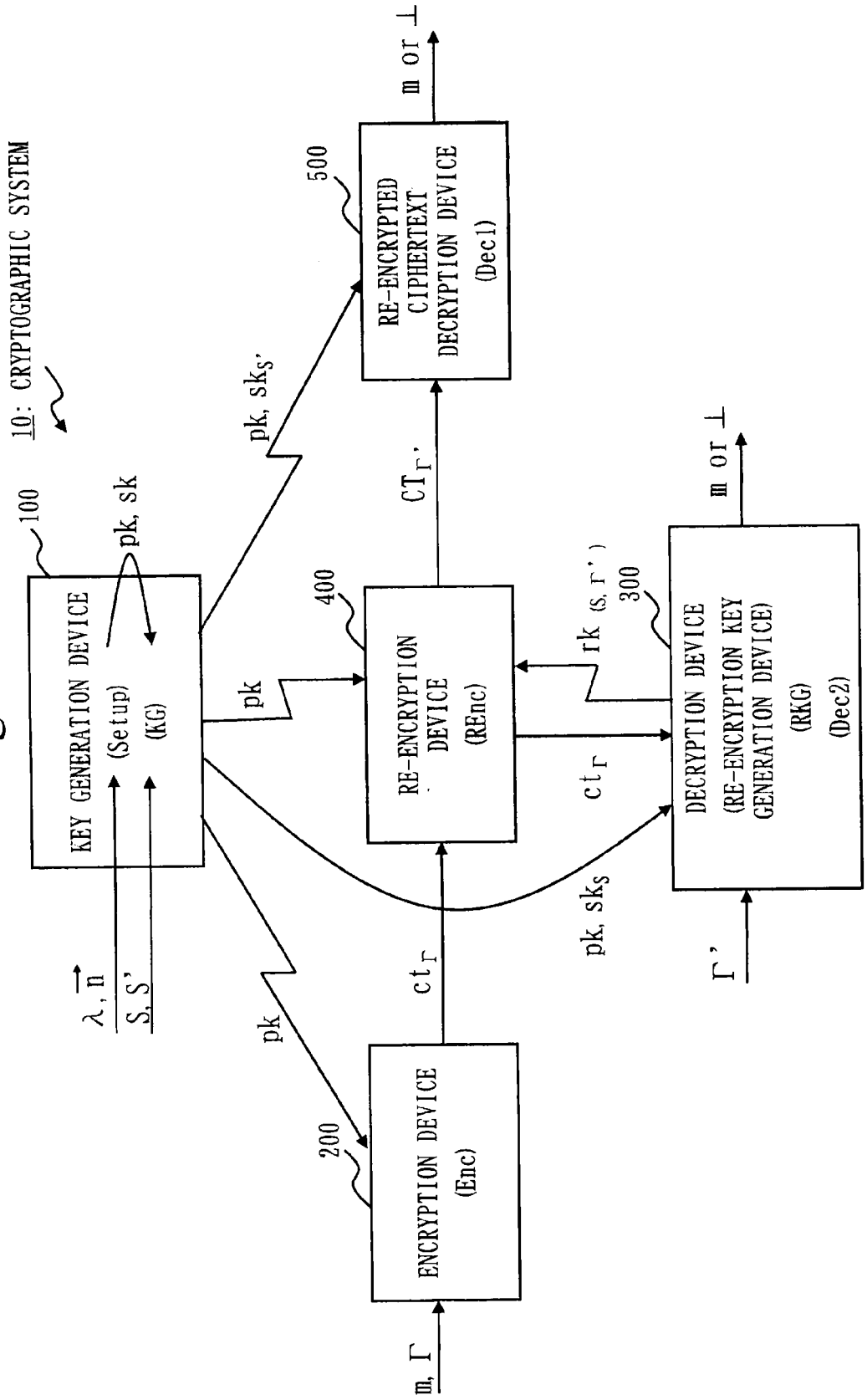
FIG. 18 is a configuration diagram of a cryptographic processing system 10 that implements a KP-FPRE scheme.

FIG. 18 is a configuration diagram of the cryptographic processing system 10 that implements the KP-FPRE scheme.

Like the cryptographic processing system 10 illustrated in FIG. 5, the cryptographic processing system 10 includes a key generation device 100, an encryption device 200, a decryption device 300 (re-encryption key generation device), a re-encryption device 400, and a re-encrypted ciphertext decryption device 500.

The key generation device 100 executes the Setup algorithm taking as input a security parameter $\lambda$ and an attribute format $\vec{n} := (d; n_1, \ldots, n_d; u_1, \ldots, u_d; z_1, \ldots, z_d)$, and thus generates a public parameter pk and a master key sk.

Then, the key generation device 100 publishes the public parameter pk. The key generation device 100 also executes the KG algorithm taking as input an access structure S, and thus generates a decryption key $sk_S$, and transmits the decryption key $sk_S$ to the decryption device 300 in secrecy. The key generation device 100 also executes the KG algorithm taking as input an access structure S', and thus generates a decryption key $sk_{S'}$, and transmits the decryption key $sk_{S'}$ to the re-encrypted ciphertext decryption device 500 in secrecy.

The encryption device 200 executes the Enc algorithm taking as input a message m, an attribute set $\Gamma$, and the public parameter pk, and thus generates a ciphertext $ct_\Gamma$. The encryption device 200 transmits the ciphertext $ct_\Gamma$ to the re-encryption device 400.

The decryption device 300 executes the RKG algorithm taking as input the public parameter pk, the decryption key $sk_S$, and an attribute set $\Gamma'$, and thus generates a re-encryption key $rk_{(S,\Gamma')}$. The decryption device 300 transmits the re-encryption key $rk_{(S,\Gamma')}$ to the re-encryption device 400 in secrecy.

The decryption device 300 also executes the Dec2 algorithm taking as input the public parameter pk, the decryption key $sk_S$, and the ciphertext $ct_\Gamma$, and outputs the message m or the distinguished symbol $\bot$.

The re-encryption device 400 executes the REnc algorithm taking as input the public parameter pk, the re-encryption key $rk_{(S,\Gamma')}$, and the ciphertext $ct_\Gamma$, and thus generates a re-encrypted ciphertext $CT_{\Gamma'}$. The re-encryption device 400 transmits the re-encrypted ciphertext $CT_{\Gamma'}$ to the re-encrypted ciphertext decryption device 500.

The re-encrypted ciphertext decryption device 500 executes the Dec1 algorithm taking as input the public parameter pk, the decryption key $sk_{S'}$, and the re-encrypted ciphertext $CT_{\Gamma'}$, and outputs the message m or the distinguished symbol 1.

<1-3. Items Used to Implement KP-FPRE Scheme>

To implement the KP-FPRE scheme, key-policy functional encryption (KP-FE) and one-time signature are used. Since both are publicly known techniques, a scheme to be used in the following description will be briefly described. An example of a KP-FE scheme is discussed in Patent Literature 1. One-time signature is as described in Embodiment 1, and description thereof will be omitted.

The KP-FE scheme consists of four algorithms: $\text{Setup}_{KP-FE}$, $\text{KG}_{KP-FE}$, $\text{Enc}_{KP-FE}$, and $\text{Dec}_{KP-FE}$.

($\text{Setup}_{KP-FE}$)

A $\text{Setup}_{KP-FE}$ algorithm is a probabilistic algorithm that takes as input a security parameter $\lambda$ and an attribute format $\vec{n} := (d; n_1, \ldots, n_d)$, and outputs a public parameter $pk^{KP-FE}$ and a master key $sk^{KP-FE}$.

($\text{KG}_{KP-FE}$)

A $\text{KG}_{KP-FE}$ algorithm is a probabilistic algorithm that takes as input an access structure $S = (M, \rho)$, the public parameter $pk^{KP-FE}$, and the master key $sk^{KP-FE}$, and outputs a decryption key $sk_S^{KP-FE}$ ($\text{Enc}_{KP-FE}$)

An $\text{Enc}_{KP-FE}$ algorithm is a probabilistic algorithm that takes as input a message m, an attribute set $\Gamma := \{(t, \vec{x}_t) | \vec{x}_t \in F_q^{n_t}, 1 \leq t \leq d\}$, and the public parameter $pk^{KP-FE}$, and outputs a ciphertext $\psi$.

($\text{Dec}_{KP-FE}$)

A $\text{Dec}_{KP-FE}$ algorithm is an algorithm that takes as input the ciphertext $\psi$, the decryption key $sk_S^{KP-FE}$, and the public parameter $pk^{KP-FE}$, and outputs the message m or the distinguished symbol $\bot$.

<1-4. KP-FPRE Scheme and Cryptographic Processing System 10 in Detail>

With reference to FIG. 19 through FIG. 29, the KP-FPRE scheme will be described, and the function and operation of the cryptographic processing system 10 that implements the KP-FPRE scheme will be described.

Figure 19:
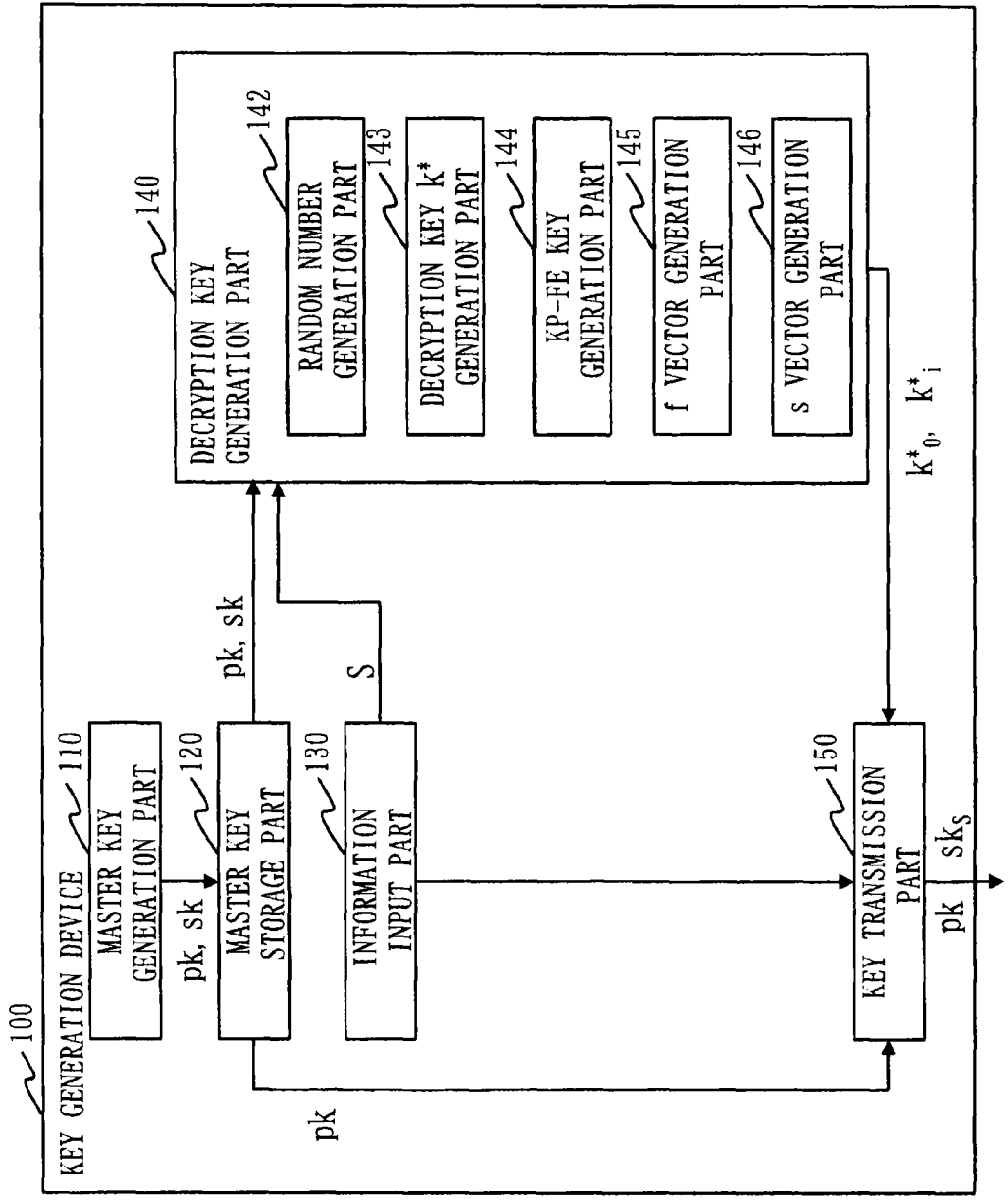
FIG. 19 is a functional block diagram illustrating the function of a key generation device 100.
Figure 20:
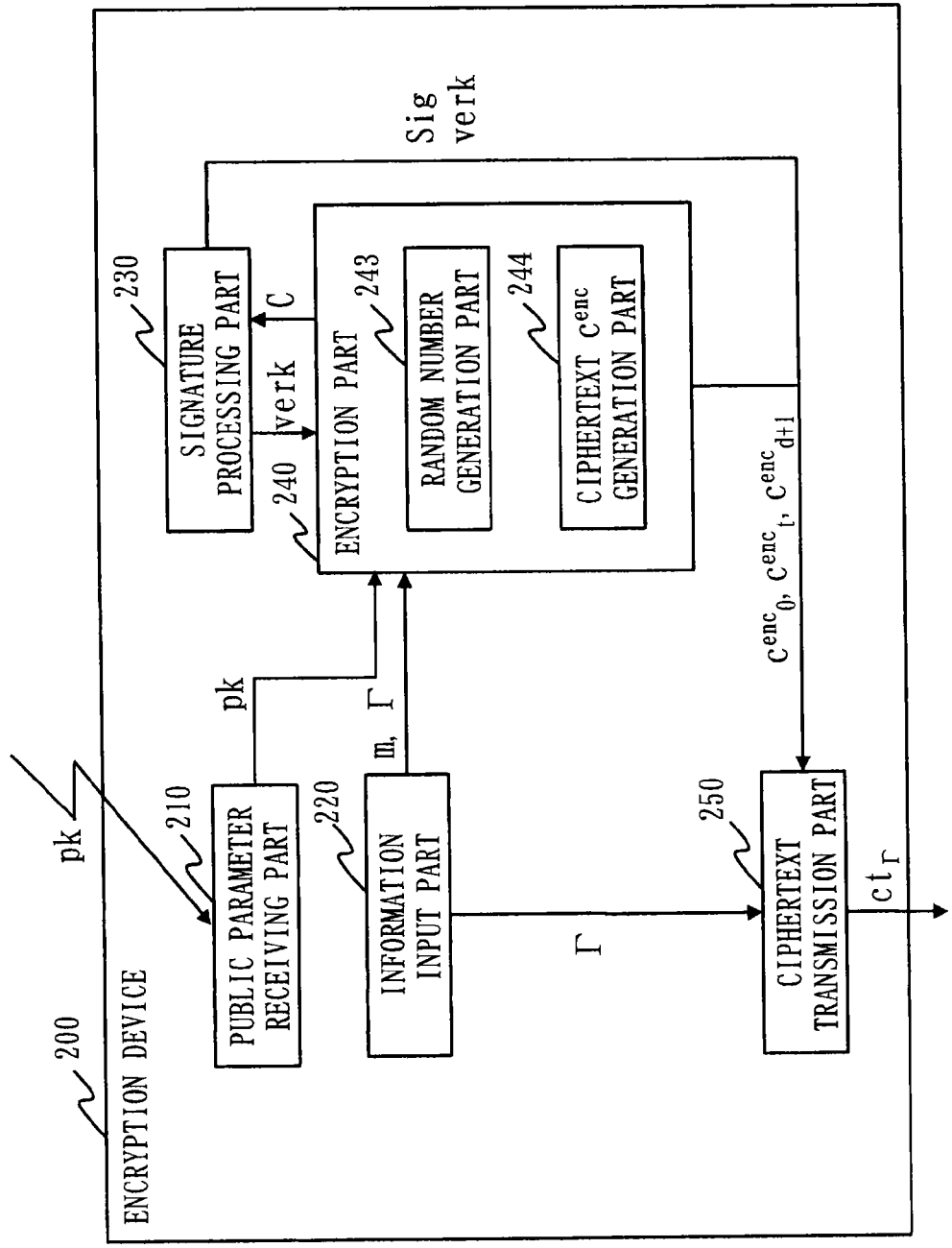
FIG. 20 is a functional block diagram illustrating the function of an encryption device 200.
Figure 21:
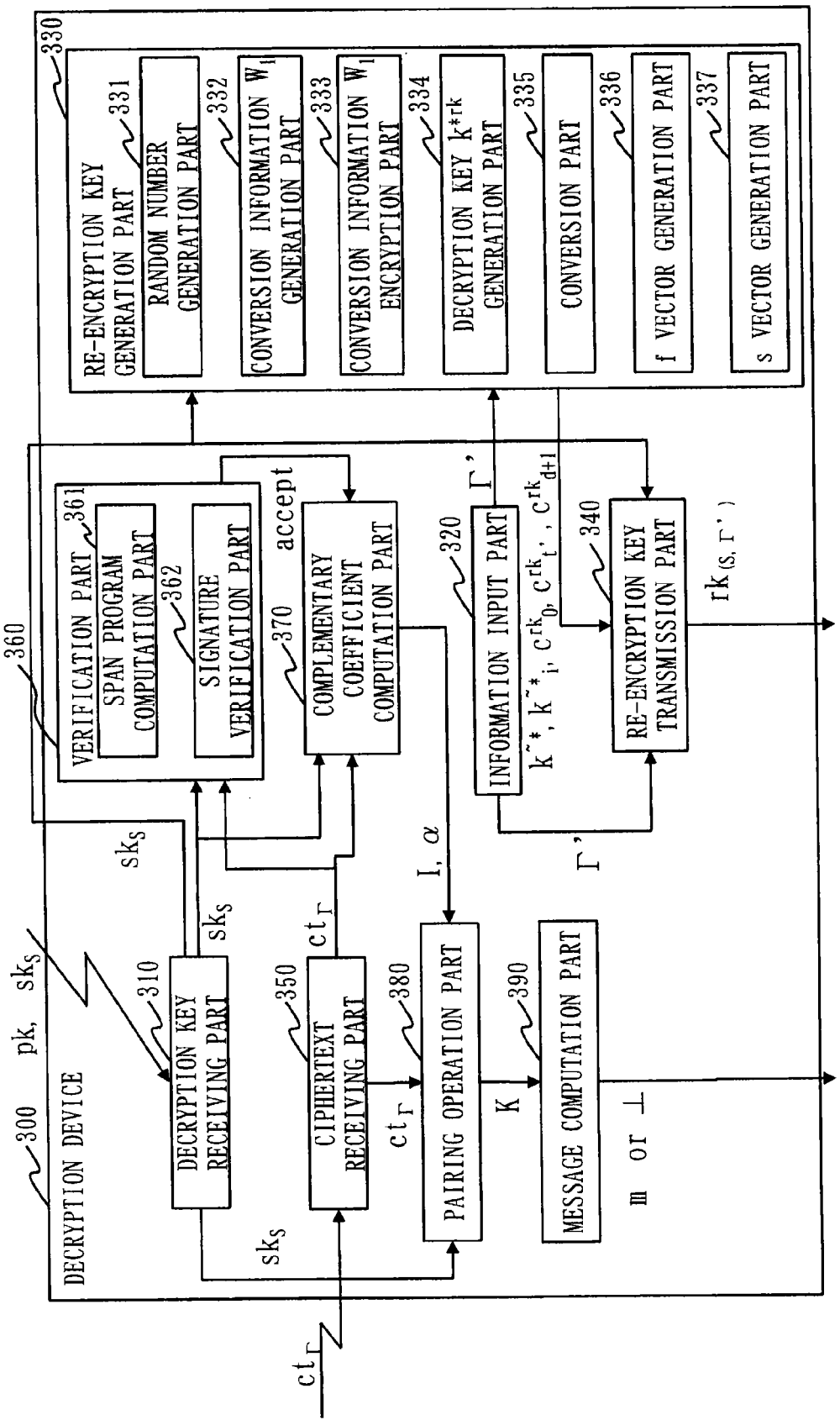
FIG. 21 is a functional block diagram illustrating the function of a decryption device 300.
Figure 22:
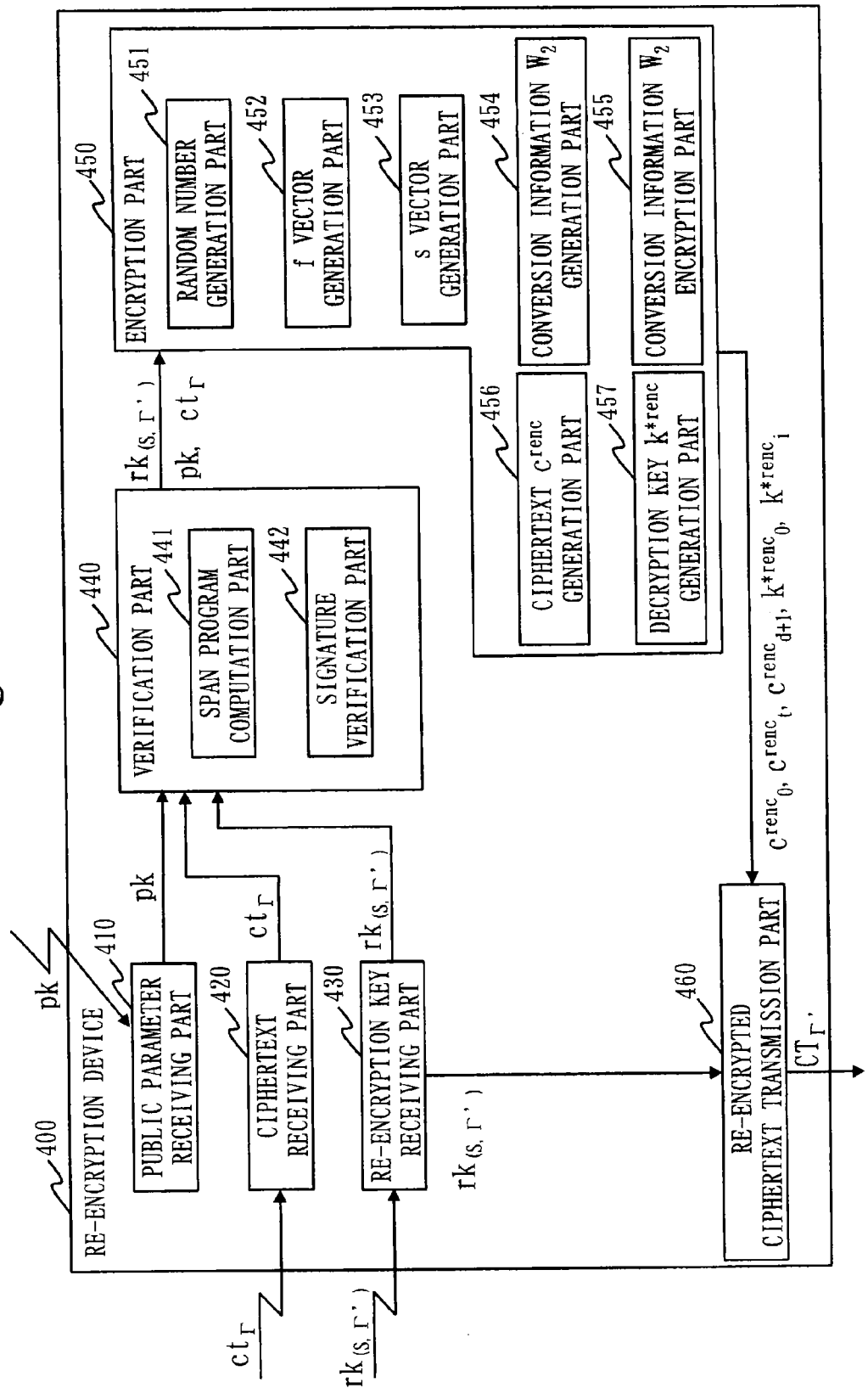
FIG. 22 is a functional block diagram illustrating the function of a re-encryption device 400.
Figure 23:
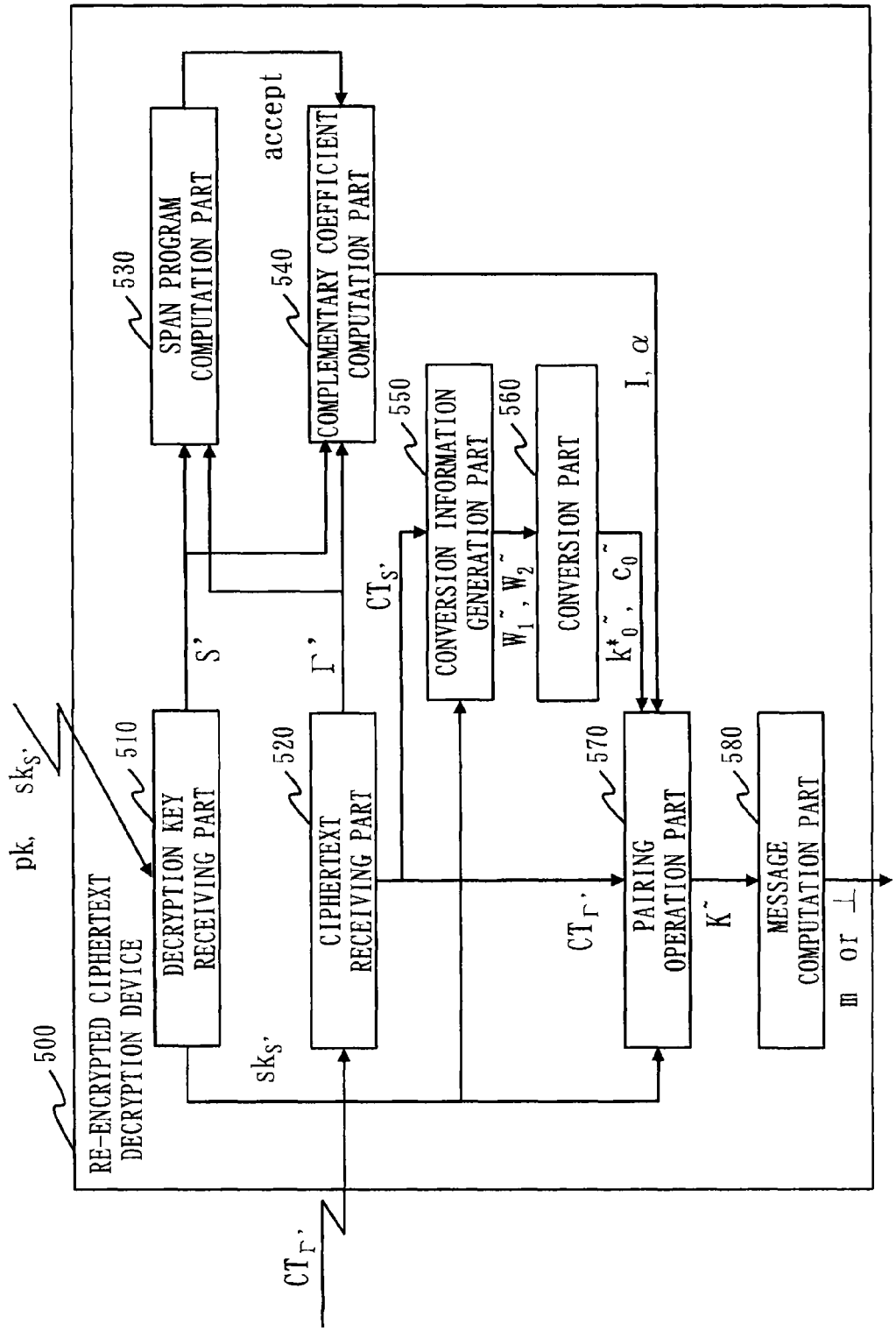
FIG. 23 is a functional block diagram illustrating the function of a re-encrypted ciphertext decryption device 500.

FIG. 19 is a functional block diagram illustrating the function of the key generation device 100. FIG. 20 is a functional block diagram illustrating the function of the encryption device 200. FIG. 21 is a functional block diagram illustrating the function of the decryption device 300. FIG. 22 is a functional block diagram illustrating the function of the re-encryption device 400. FIG. 23 is a functional block diagram illustrating the function of the re-encrypted ciphertext decryption device 500.

Figure 24:
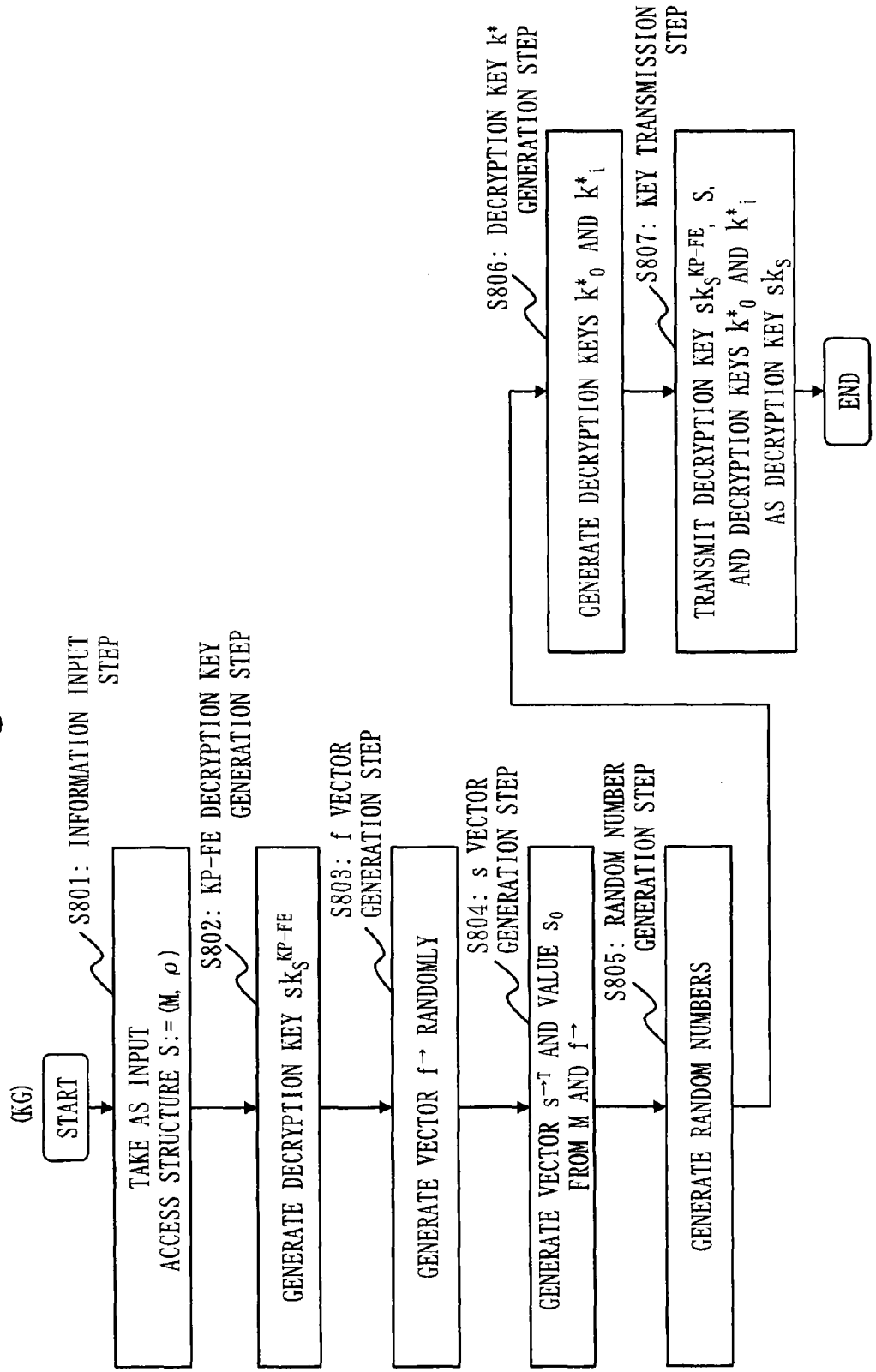
FIG. 24 is a flowchart illustrating the process of a KG algorithm.
Figure 25:
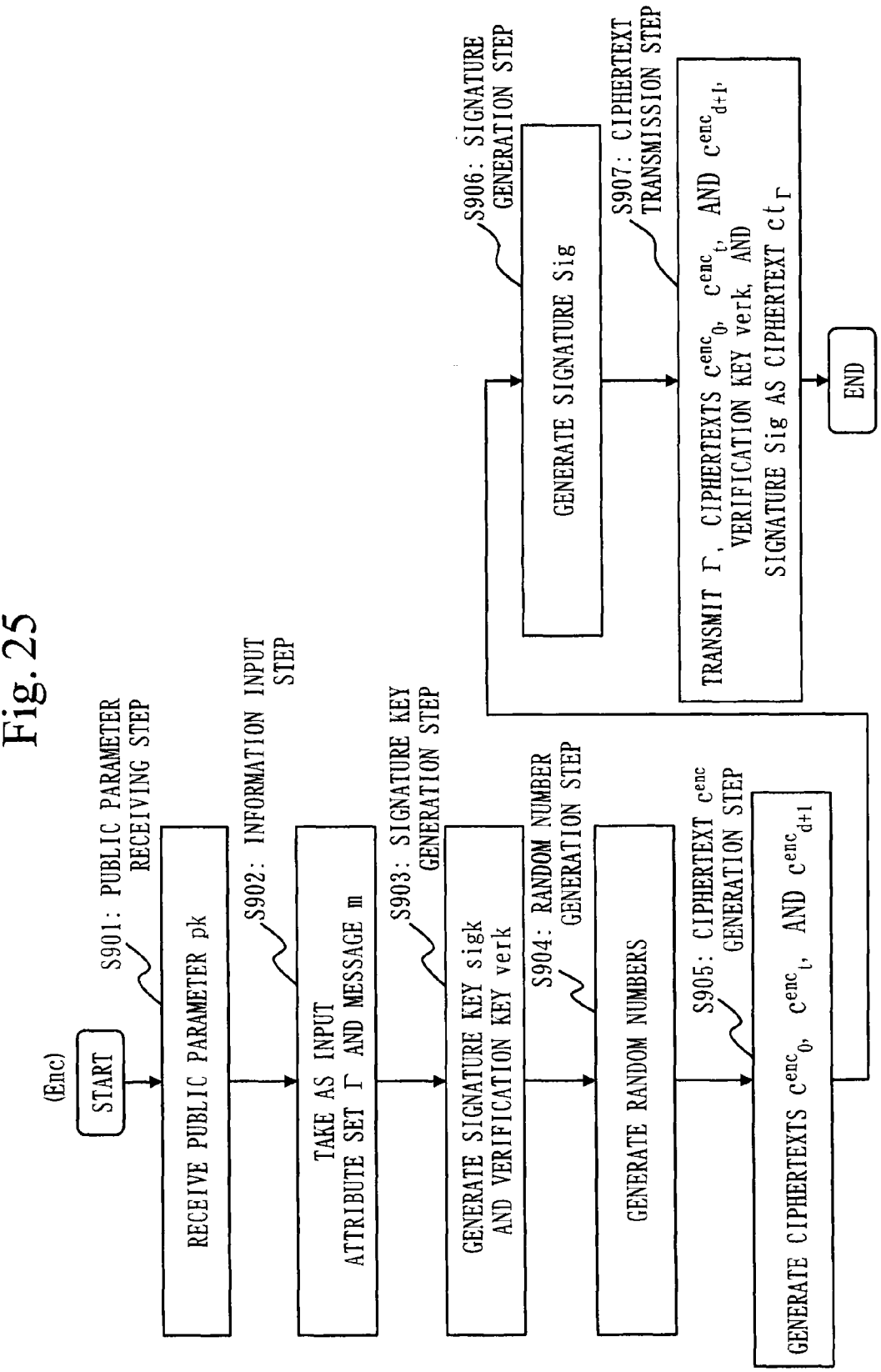
FIG. 25 is a flowchart illustrating the process of an Enc algorithm.
Figure 26:
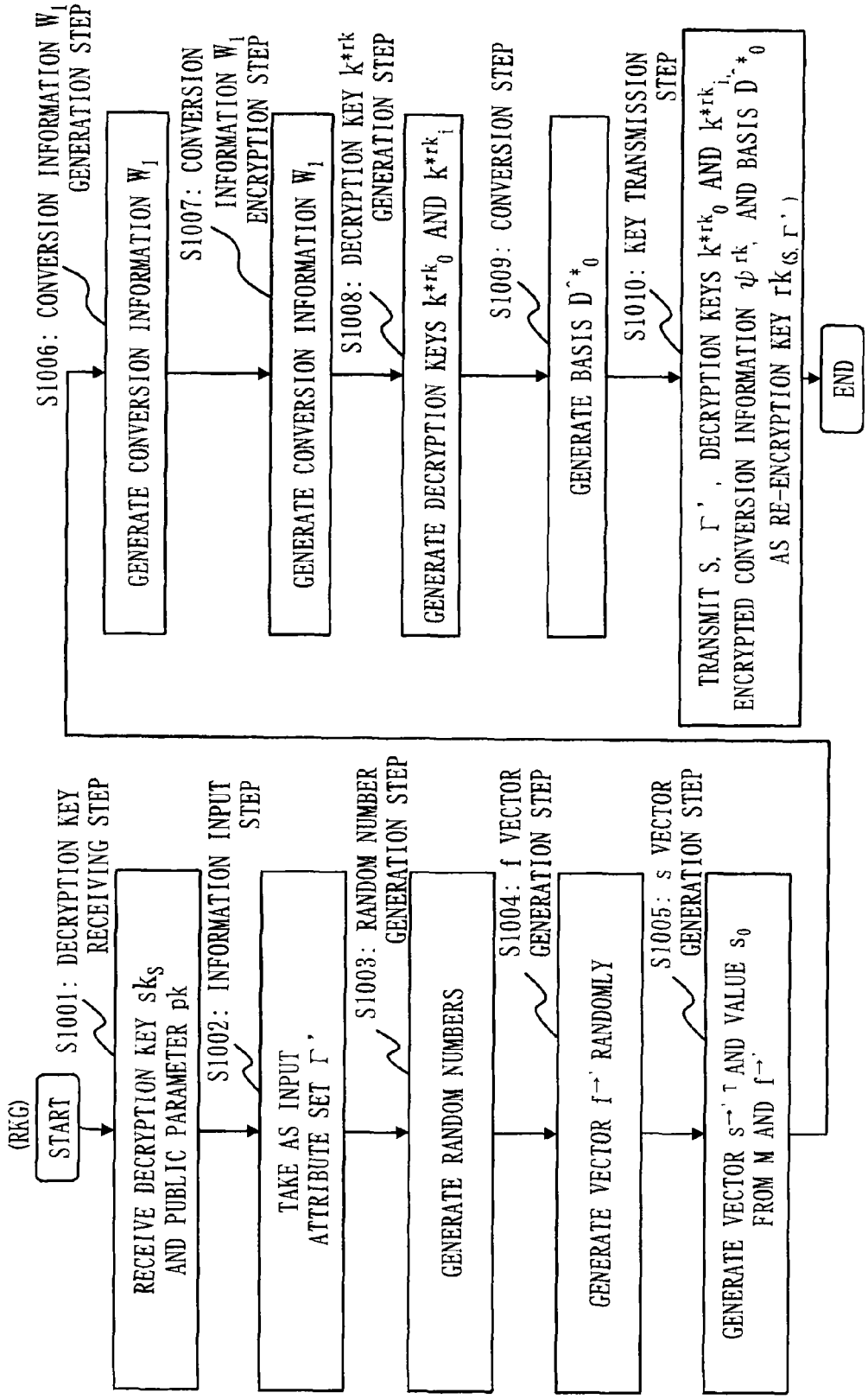
FIG. 26 is a flowchart illustrating the process of an RKG algorithm.
Figure 27:
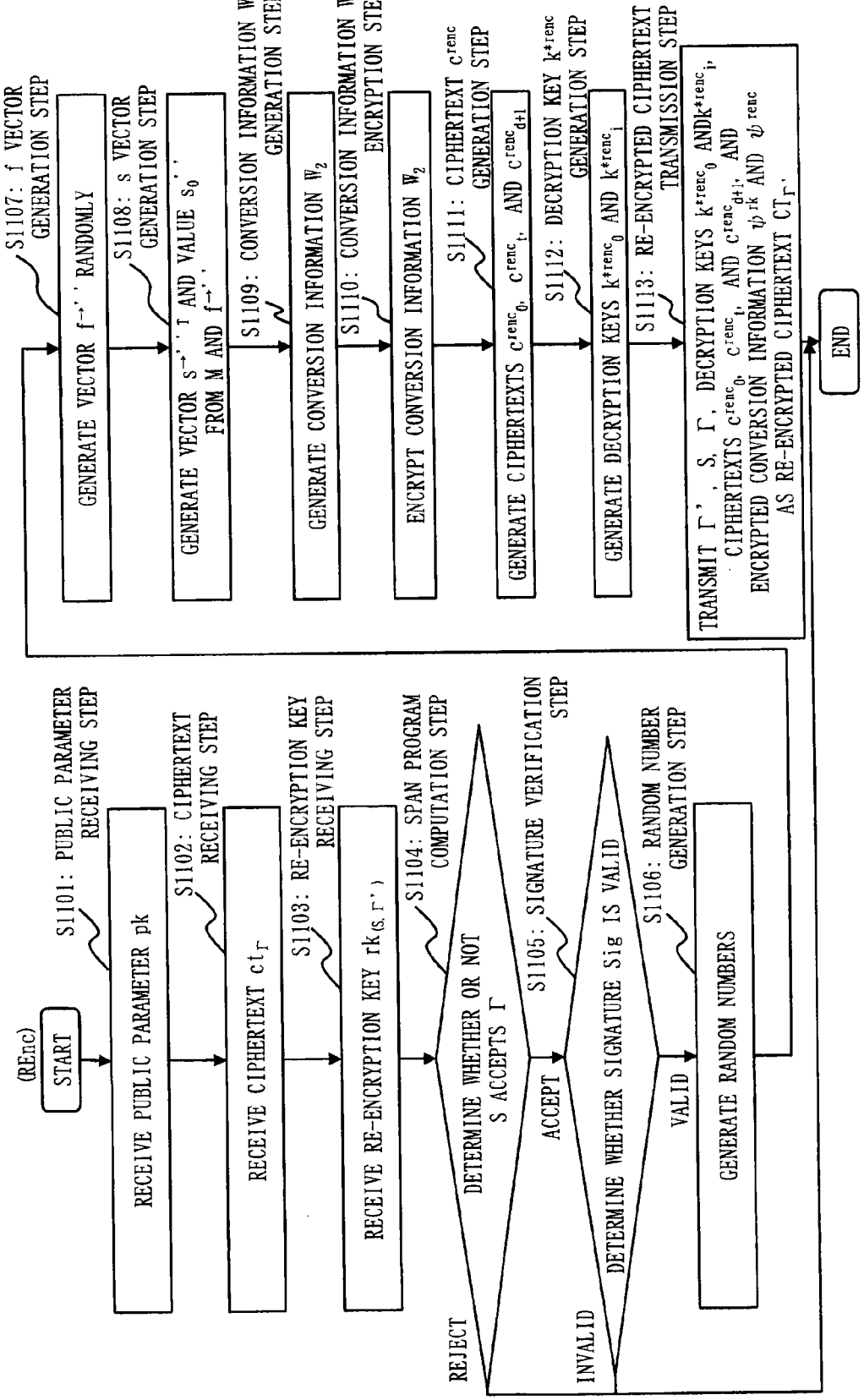
FIG. 27 is a flowchart illustrating the process of an REnc algorithm.
Figure 28:
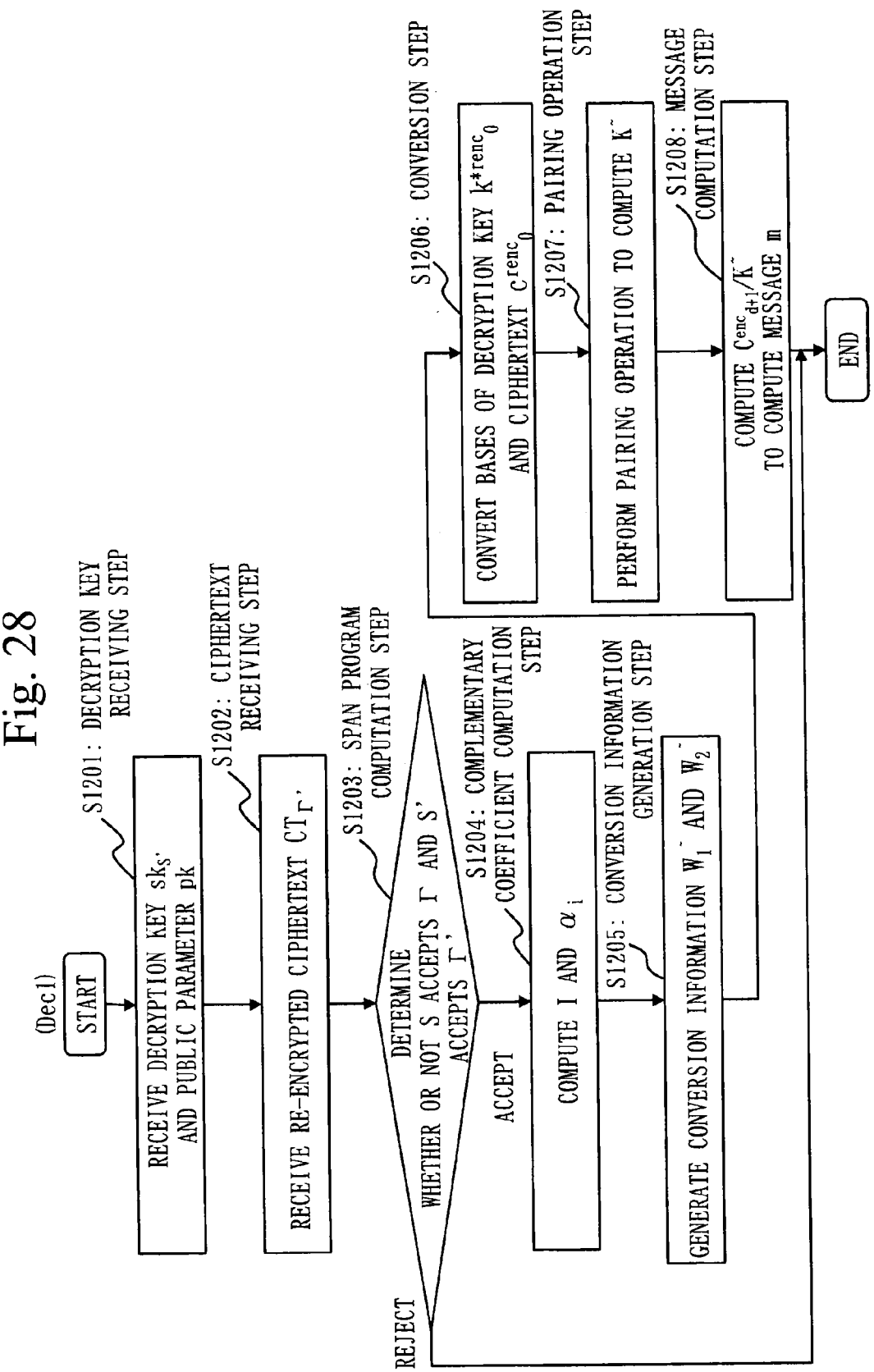
FIG. 28 is a flowchart illustrating the process of a Dec1 algorithm.
Figure 29:
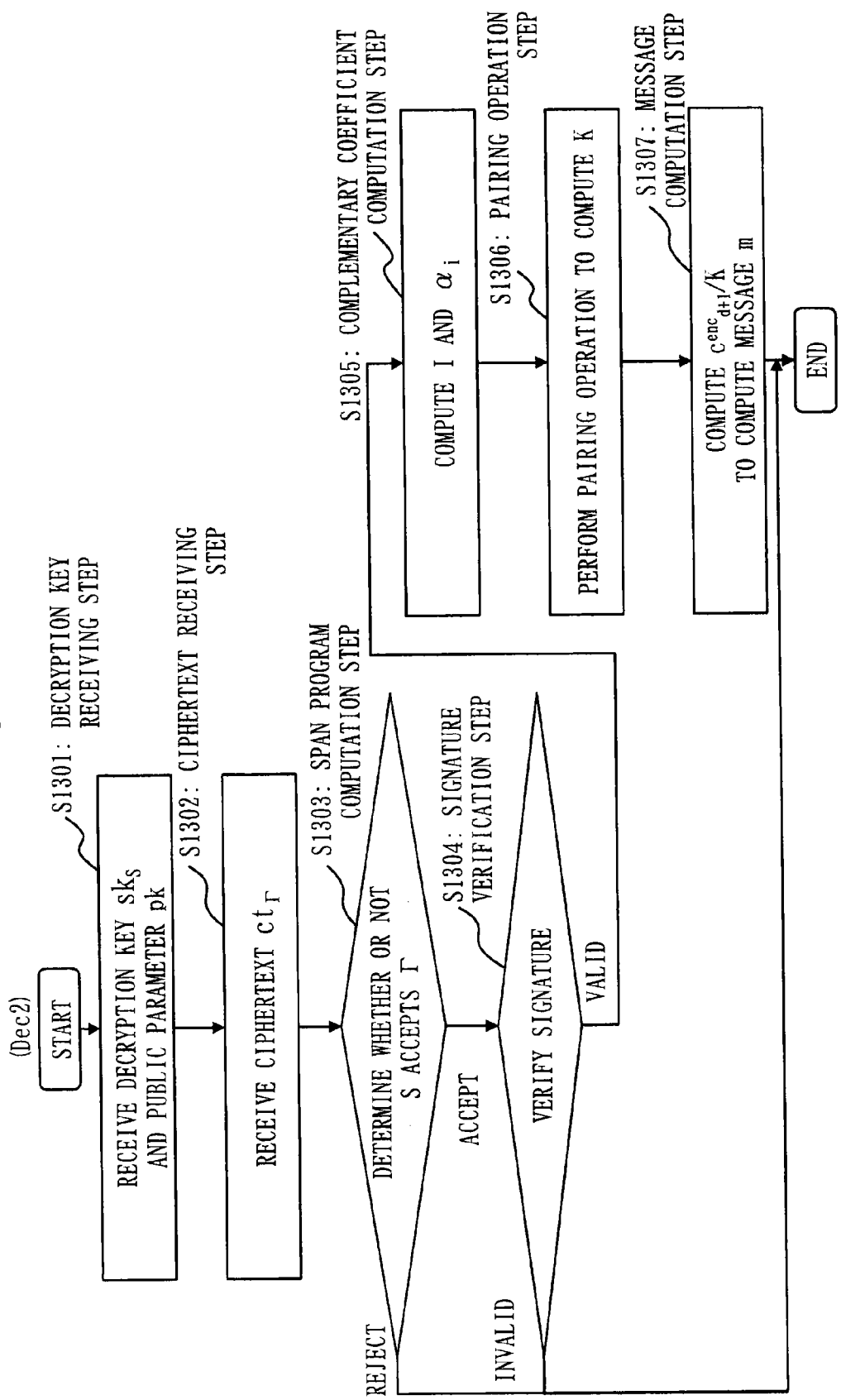
FIG. 29 is a flowchart illustrating the process of a Dec2 algorithm.

FIG. 24 is a flowchart illustrating the operation of the key generation device 100 and illustrating the process of the KG algorithm. FIG. 25 is a flowchart illustrating the operation of the encryption device 200 and illustrating the process of the Enc algorithm. FIG. 26 is a flowchart illustrating the operation of the decryption device 300 and illustrating the process of the RKG algorithm. FIG. 27 is a flowchart illustrating the operation of the re-encryption device 400 and illustrating the process of the REnc algorithm. FIG. 28 is a flowchart illustrating the operation of the re-encrypted ciphertext decryption device 500 and illustrating the process of the Dec1 algorithm. FIG. 29 is a flowchart illustrating the operation of the decryption device 300 and illustrating the process of the Dec2 algorithm.

The function and operation of the key generation device 100 will be described.

The key generation device 100 includes a master key generation part 110, a master key storage part 120, an information input part 130, a decryption key generation part 140, and a key transmission part 150. The decryption key generation part 140 includes a random number generation part 142, a decryption key k* generation part 143, a KP-FE key generation part 144, an f vector generation part 145, and an s vector generation part 146.

The process of the Setup algorithm is the same as the process of the Setup algorithm described in Embodiment 1, and thus description thereof will be omitted. However, in S102 in Embodiment 1, a public parameter $pk^{CP-FE}$ and a master key $sk^{CP-FE}$ of CP-FE are generated, whereas in Embodiment 2 a public parameter $pk^{KP-FE}$ and a master key $sk^{KP-FE}$ of KP-FE are generated. Subbases $\hat{B}_0$, $\hat{B}_t$, $\hat{B}^*_0$, and $\hat{B}^*_t$ are constructed differently from Embodiment 1, as indicated in Formula 171.

$$\hat{\mathbb{B}}_0 := (b_{0,1}, b_{0,2}, b_{0,3}, b_{0,4}, b_{0,6}),$$

$$\hat{\mathbb{B}}_t := (b_{t,1}, \ldots, b_{t,n_t}, b_{t,N_t}) \text{ for } t=1,\ldots,d$$

$$\hat{\mathbb{B}}^*_0 := (b^*_{0,1}, b^*_{0,2}, b^*_{0,3}, b^*_{0,4}, b^*_{0,7}),$$

$$\hat{\mathbb{B}}^*_t := (b^*_{t,1}, \ldots, b^*_{t,n_t}, b^*_{t,N_t+u_t+1}, \ldots, b^*_{t,n_t+u_t+z_t}) \text{ for } t=1,\ldots,d \quad \text{[Formula 171]}$$

In brief, the key generation device 100 generates a public parameter pk and a master key sk by executing the Setup algorithm indicated in Formula 172-1 and Formula 172-2.

Setup($1^\lambda$, [Formula 172-1]
$\vec{n} = (d; n_1, \ldots, n_d; u_1, \ldots, u_d; z_1, \ldots, z_d)$):

$param_\mathbb{G} := (q, \mathbb{G}, \mathbb{G}_T, g, e) \xleftarrow{R} \mathcal{G}_{bpg}(1^\lambda),$ $N_0 := 7,$ $N_t := n_t + u_t + z_t + 1 \text{ for } t = 1, \ldots, d,$ $\psi \xleftarrow{U} \mathbb{F}_q^\times, g_T := e(g,g)^\psi,$ for $t = 0, \ldots, d,$ $parm_{\mathbb{V}_t} :=$ $(q, \mathbb{V}, \mathbb{G}_T, \mathbb{A}_T, e) \xleftarrow{R} \mathcal{G}_{dpvs}(1^\lambda, N_t, param_\mathbb{G}),$ $X_t = \begin{pmatrix} \vec{\chi}_{t,1} \\ \vdots \\ \vec{\chi}_{t,N_t} \end{pmatrix} := (\chi_{t,i,j})_{i,j} \xleftarrow{U} GL(N_t, \mathbb{F}_q),$ $\begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1},$ $b_{t,i} := \sum_{j=1}^{N_t} \chi_{t,i,j} a_{t,j}, \mathbb{B}_t := (b_{t,1}, \ldots, b_{t,N_t}),$ [Formula 172-2]

$b^*_{t,i} := \sum_{j=1}^{N_t} v_{t,i,j} a_{t,j}, \mathbb{B}^*_t := (b^*_{t,1}, \ldots, b^*_{t,N_t}),$ $(pk^{KP-FE}, sk^{KP-FE}) \xleftarrow{R} Setup_{KP-FE}(1^\lambda, \vec{n})$ $\hat{\mathbb{B}}_0 := (b_{0,1}, b_{0,2}, b_{0,3}, b_{0,4}, b_{0,6}),$ $\hat{\mathbb{B}}_t := (b_{t,1}, \ldots, b_{t,n_t}, b_{t,N_t}) \text{ for } t = 1, \ldots, d,$ $\hat{\mathbb{B}}^*_0 := (b^*_{0,1}, b^*_{0,2}, b^*_{0,3}, b^*_{0,4}, b^*_{0,7}),$ $\hat{\mathbb{B}}^*_t :=$ $(b^*_{t,1}, \ldots, b^*_{t,n_t}, b^*_{t,n_t+u_t+1}, \ldots, b^*_{t,n_t+u_t+z_t})$ for $t = 1, \ldots, d,$ $param_{\vec{n}} := (\{param_{\mathbb{V}_t}\}_{t=0,\ldots,d}, g_T),$ $pk := \left( pk^{KP-FE}, 1^\lambda, param_{\vec{n}}, \right.$ $\{\hat{\mathbb{B}}_t\}_{t=0,\ldots,d}, b^*_{0,2}, b^*_{0,3}, b^*_{0,4}, b^*_{0,7},$ $\left\{ \begin{array}{c} b^*_{t,1}, \ldots, b^*_{t,n_t}, b^*_{t,n_t+u_t+1}, \ldots \\ b^*_{t,n_t+u_t+z_t} \end{array} \right\}_{t=1,\ldots,d} \bigg),$ $sk := (sk^{KP-FE}, \hat{\mathbb{B}}^*_0),$ return $pk, sk$.

With reference to FIG. 24, the process of the KG algorithm will be described.

(S801: Information Input Step)

Using the input device, the information input part 130 takes as input an access structure $S := (M, \rho)$. The matrix M of the access structure S is to be set according to the conditions of a system to be implemented. Attribute information of a user of a decryption key $sk_S$ is set in $\rho$ of the access structure S, for example. Note that $\rho(i)=(t, \vec{v}_i:=(v_{i,1}, \ldots, v_{i,n_t})\in\mathbb{F}_q^{n_t}\setminus\{\vec{0}\})$ $(v_{i,n_t} \neq 0)$.

(S802: KP-FE Decryption Key Generation Step)

Using the processing device, the KP-FE key generation part 144 computes Formula 173, and thus generates a decryption key $sk_S^{KP-FE}$ of functional encryption.

$$sk_S^{KP-FE} \xleftarrow{R} KG_{KP-FE}(pk^{KP-FE}, sk^{KP-FE}, S) \quad \text{[Formula 173]}$$

(S803: f Vector Generation Step)

Using the processing device, the f vector generation part 145 randomly generates a vector $\vec{f}$ having r pieces of elements, as indicated in Formula 174.

$$\vec{f} \xleftarrow{U} \mathbb{F}_q^r \quad \text{[Formula 174]}$$

(S804: s Vector Generation Step)

Using the processing device and based on the (L rows×r columns) matrix M included in the access structure S and the vector $\vec{f}$, the s vector generation part 146 generates a vector $\vec{s}^T := (s_1, \ldots, s_L)^T$, as indicated in Formula 175.

$$\vec{s}^T := (s_1, \ldots, s_L)^T := M \cdot \vec{f}^T \quad \text{[Formula 175]}$$

Using the processing device and based on the vector $\vec{f}$, the s vector generation part 146 also generates a value $s_0$, as indicated in Formula 176.

$$s_0 := \vec{1} \cdot \vec{f}^T \quad \text{[Formula 176]}$$

(S805: Random Number Generation Step)

Using the processing device, the random number generation part 142 generates random numbers, as indicated in Formula 177.

$$\eta \xleftarrow{U} \mathbb{F}_q, \quad \text{[Formula 177]}$$
$$\theta_i \text{ for } i = 1, \ldots L,$$
$$\vec{\eta}_i \xleftarrow{U} \mathbb{F}_q^{z_t} \text{ for } i = 1, \ldots L$$

(S806: Decryption Key k* Generation Step)

Using the processing device, the decryption key k* generation part 143 generates a decryption key $k^*_0$, as indicated in Formula 178.

$$k^*_0 := (1, -s_0, 0, 0, 0, 0, \eta)_{\mathbb{B}^*_0} \quad \text{[Formula 178]}$$

Using the processing device, the decryption key k* generation part 143 also generates a decryption key $k^*_i$ for each integer $i = 1, \ldots, L$, as indicated in Formula 179.

for $i = 1, \ldots L$ [Formula 179]

if $\rho(i) =$ $(t, \vec{v}_i := (v_{i,1}, \ldots, v_{i,n_t}) \in \mathbb{F}_q^{n_t} \setminus \{\vec{0}\})(v_{i,n_t} \neq 0),$ $k^*_i := (\overbrace{s_i \vec{e}_{t,1} + \theta_i \vec{v}_i}^{n_t}, \overbrace{0^{u_t}}^{u_t}, \overbrace{\vec{\eta}_i}^{z_t}, \overbrace{0}^{1})_{\mathbb{B}^*_t},$ -continued if $\rho(i) = \neg (t, \vec{v}_i)$, $$k_i^* := \left(\overbrace{s_i \vec{v}_i}^{n_t}, \overbrace{0^{u_t}}^{u_t}, \overbrace{\vec{\eta}_i}^{z_t}, \overbrace{0}^{1}\right)_{\mathbb{B}_t^*},$$

(S807: Key Transmission Step)

Using the communication device and via the network, for example, the key transmission part 150 transmits the decryption key $sk_S$ having, as elements, the access structure S and the decryption keys $k^*_0$ and $k^*_i$ to the decryption device 300 in secrecy. As a matter of course, the decryption key $sk_S$ may be transmitted to the decryption device 300 by another method.

In brief, in (S801) through (S806), the key generation device 100 generates the decryption key $sk_S$ by executing the KG algorithm indicated in Formula 180. In (S807), the key generation device 100 transmits the generated decryption key $sk_S$ to the decryption device 300.

$$KG(pk, sk, \mathbb{S} = (M, \rho)): \qquad \text{[Formula 180]}$$

$$sk_{\mathbb{S}}^{KP-FE} \xleftarrow{R} KG_{KP-FE}(pk^{KP-FE}, sk^{KP-FE}, \mathbb{S}),$$

$$\vec{f} \xleftarrow{U} \mathbb{F}_q^r,$$

$$\vec{s}^T := (s_1, \ldots, s_L)^T := M \cdot \vec{f}^T, s_0 := \vec{1} \cdot \vec{f}^T,$$

$$\eta \xleftarrow{U} \mathbb{F}_q,$$

$$k_0^* := (1, -s_0, 0, 0, 0, 0, \eta)_{\mathbb{B}_0^*},$$

for $i = 1, \ldots L$ if $\rho(i) =$ $$(t, \vec{v}_i := (v_{i,1}, \ldots, v_{i,n_t}) \in \mathbb{F}_q^{n_t} \setminus \{\vec{0}\})(v_{i,n_t} \neq 0),$$

$$\theta_i \xleftarrow{U} \mathbb{F}_q, \vec{\eta}_i \xleftarrow{U} \mathbb{F}_q^{z_t},$$

$$k_i^* := \left(\overbrace{s_i \vec{e}_{t,1} + \theta_i \vec{v}_i}^{n_t}, \overbrace{0^{u_t}}^{u_t}, \overbrace{\vec{\eta}_i}^{z_t}, \overbrace{0}^{1}\right)_{\mathbb{B}_t^*},$$

if $\rho(i) = \neg (t, \vec{v}_i)$, $$\vec{\eta}_i \xleftarrow{U} \mathbb{F}_q,$$

$$k_i^* := \left(\overbrace{s_i \vec{v}_i}^{n_t}, \overbrace{0^{u_t}}^{u_t}, \overbrace{\vec{\eta}_i}^{z_t}, \overbrace{0}^{1}\right)_{\mathbb{B}_t^*},$$

$$sk_{\mathbb{S}} := (sk_{\mathbb{S}}^{KP-FE}, \mathbb{S}, k_0^*, \{k_i^*\}_{i=1,\ldots L}),$$

return $sk_{\mathbb{S}}$.

In (S801), the key generation device 100 generates a decryption key $sk_{S'}$ by executing the KG algorithm taking as input an access structure $S':=(M, \rho')$ in which attribute information of a user of the decryption key $sk_{S'}$ is set. Then, the decryption key $sk_{S'}:=(S', k'^*_0, k'^*_i)$ is transmitted to the re-encrypted ciphertext decryption device 500. Note that $\rho'(i)=(t, \vec{v}'_i:=(v'_{i,1}, \ldots, v'_{i,nt}) \in \mathbb{F}_q^{nt} \setminus \{\vec{0}\})(v'_{i,nt} \neq 0)$.

The function and operation of the encryption device 200 will be described.

The encryption device 200 includes a public parameter receiving part 210, an information input part 220, a signature processing part 230, an encryption part 240, and a ciphertext transmission part 250. The encryption part 240 includes a random number generation part 243 and a ciphertext $c^{enc}$ generation part 244.

With reference to FIG. 25, the process of the Enc algorithm will be described.

(S901: Public Parameter Receiving Step)

Using the communication device and via the network, for example, the public parameter receiving part 210 receives the public parameter pk generated by the key generation device 100.

(S902: Information Input Step)

Using the input device, the information input part 220 also takes as input an attribute set $\Gamma:=\{(t, \vec{x}_t:=(x_{t,1}, \ldots, x_{t,nt}) \in \mathbb{F}_q^{nt}))|1 \leq t \leq d\}$. Note that t may be at least some of integers from 1 to d, instead of being all of integers from 1 to d. Attribute information of a user capable of decryption is set in the attribute set $\Gamma$, for example. Using the input device, the information input part 220 takes as input a message m to be transmitted to the decryption device 300.

(S903: Signature Key Generation Step)

Using the processing device, the signature processing part 230 computes Formula 181, and thus generates a signature key sigk and a verification key verk of one-time signature.

$$(sigk, verk) \xleftarrow{R} SigKG(1^\lambda) \qquad \text{[Formula 181]}$$

(S904: Random Number Generation Step)

Using the processing device, the random number generation part 243 generates random numbers, as indicated in Formula 182.

$$\rho, \varsigma, \delta, \varphi \xleftarrow{U} \mathbb{F}_q, \qquad \text{[Formula 182]}$$

$$\varphi_t \xleftarrow{U} \mathbb{F}_q \text{ for } (t, \vec{x}_t) \in \Gamma$$

(S905: Ciphertext $c^{enc}$ Generation Step)

Using the processing device, the ciphertext $c^{enc}$ generation part 232 generates a ciphertext $c^{enc}_0$, as indicated in Formula 183.

$$c_0^{enc}:=(\zeta, \delta, \rho(verk, 1), 0, \rho, 0)_{\mathbb{B}_0} \qquad \text{[Formula 183]}$$

Using the processing device, the ciphertext $c^{enc}$ generation part 232 generates a ciphertext $c^{enc}_t$ for each integer t included in the attribute information $\Gamma$, as indicated in Formula 184.

$$c_t^{enc} := \left(\overbrace{\delta \vec{x}_t}^{n_t}, \overbrace{0^{u_t}}^{u_t}, \overbrace{0^{z_t}}^{z_t}, \overbrace{\varphi_t}^{1}\right)_{\mathbb{B}_t} \text{ for } (t, \vec{x}_t) \in \Gamma \qquad \text{[Formula 184]}$$

Using the processing device, the ciphertext $c^{enc}$ generation part 232 also generates a ciphertext $c^{enc}_{d+1}$, as indicated in Formula 185.

$$c_{d+1}^{enc} = m \cdot g_T^\zeta \qquad \text{[Formula 185]}$$

(S906: Signature Generation Step)

Using the processing device, the signature processing part 230 computes Formula 186, and thus generates a signature Sig for an element $C:=(S, c^{enc}_0, \{c^{enc}_t\}_{(t, \vec{x}_t) \in \Gamma}, c^{enc}_{d+1})$ of the ciphertext $ct_\Gamma$.

$$Sig \xleftarrow{R} Sig(sigk, C = (\mathbb{S}, c_0^{enc}, \{c_t^{enc}\}_{(t, \vec{x}_t) \in \Gamma}, c_{d+1}^{enc})) \qquad \text{[Formual 186]}$$

(S907: Ciphertext Transmission Step)

Using the communication device and via the network, for example, the ciphertext transmission part 250 transmits the ciphertext $ct_\Gamma$ having, as elements, the attribute set $\Gamma$, the ciphertexts $c^{enc}_0$, $c^{enc}_t$, and $c^{enc}_{d+1}$, the verification key verk, and the signature Sig to the decryption device 300. As a matter of course, the ciphertext $ct_\Gamma$ may be transmitted to the decryption device 300 by another method.

In brief, in (S901) through (S906), the encryption device 200 generates the ciphertext $ct_\Gamma$ by executing the Enc algorithm indicated in Formula 187. In (S907), the encryption device 200 transmits the generated ciphertext $ct_\Gamma$ to the decryption device 300.

$$Enc(pk, m, \Gamma = (\{(t, \vec{x}_t) | \vec{x}_t \in \mathbb{F}_q^{n_t} \setminus \{\vec{0}\}, 1 \leq t \leq d\}):$$
$$(sigk, verk) \xleftarrow{R} SigKG(1^\lambda),$$
$$\rho, \zeta, \delta, \varphi, \varphi_t \xleftarrow{U} \mathbb{F}_q \text{ for } (t, \vec{x}_t) \in \Gamma,$$
$$c_0^{enc} := (\zeta, \delta, \rho(verk, 1), 0, \varphi, 0)_{\mathbb{B}_0},$$
$$\text{for } (t, \vec{x}_t) \in \Gamma$$
$$c_t^{enc} := (\overbrace{\delta \vec{x}_t}^{n_t}, \overbrace{0^{u_t}}^{u_t}, \overbrace{0^{z_t}}^{z_t}, \overbrace{\varphi_t}^{1})_{\mathbb{B}_t},$$
$$c_{d+1}^{enc} = m \cdot g_T^\zeta,$$
$$Sig \xleftarrow{R} Sig(sigk, C = (\mathbb{S}, c_0^{enc}, \{c_t^{enc}\}_{(t,\vec{x}_t) \in \Gamma}, c_{d+1}^{enc})),$$
$$ct_\Gamma(\Gamma, c_0^{enc}, \{c_t^{enc}\}_{(t,\vec{x}_t) \in \Gamma}, c_{d+1}^{enc}, verk, Sig),$$
$$\text{return } ct_\Gamma.$$
[Formula 187]

The function and operation of the decryption device 300 will be described.

The decryption device 300 includes a decryption key receiving part 310, an information input part 320, a re-encryption key generation part 330, a re-encryption key transmission part 340, a ciphertext receiving part 350, a verification part 360, a complementary coefficient computation part 370, a pairing operation part 380, and a message computation part 390. The re-encryption key generation part 330 includes a random number generation part 331, a conversion information $W_1$ generation part 332, a conversion information $W_1$ encryption part 333, a decryption key $k^{*rk}$ generation part 334, a conversion part 335, an f vector generation part 336, and an s vector generation part 337. The verification part 360 includes a span program computation part 361 and a signature verification part 362.

With reference to FIG. 26, the process of the RKG algorithm will be described. The Dec2 algorithm will be described later.

(S1001: Decryption Key Receiving Step)

Using the communication device and via the network, for example, the decryption key receiving part 310 receives the decryption key $sk_S$ transmitted by the key generation device 100. The decryption key receiving part 310 also receives the public parameter pk generated by the key generation device 100.

(S1002: Information Input Step)

Using the input device, the information input part 320 takes as input an attribute set $\Gamma':=\{(t, x'^{\rightarrow}_t:=(x'^{\rightarrow}_{t,1}, \ldots, x_{t,nt}) \in \mathbb{F}_q^{nt} \setminus \{0^{\rightarrow}\}) | 1 \leq t \leq d\}$. Note that t may be at least some of integers from 1 to d, instead of being all of integers from 1 to d. Attribute information of a user who can decrypt a re-encrypted ciphertext $CT_{\Gamma'}$ is set in the attribute set $\Gamma'$, for example.

(S1003: Random Number Generation Step)

Using the processing device, the random number generation part 331 generates random numbers, as indicated in Formula 188.

$$\eta' \xleftarrow{U} \mathbb{F}_q,$$
$$\theta'_i \xleftarrow{U} \mathbb{F}_q \text{ for } i = 1, \ldots, L,$$
$$\eta'_i \xleftarrow{U} \mathbb{F}_q^{z_t} \text{ for } i = 1, \ldots, L$$
[Formula 188]

(S1004: f Vector Generation Step)

Using the processing device, the f vector generation part 336 randomly generates a vector $f^{\rightarrow'}$ having r pieces of elements, as indicated in Formula 189.

$$\vec{f}' \xleftarrow{R} \mathbb{F}_q^r$$
[Formula 189]

(S1005: s Vector Generation Step)

Using the processing device and based on the (L rows×r columns) matrix M included in the access structure S and the vector $f^{\rightarrow'}$, the s vector generation part 337 generates a vector $s^{\rightarrow'T}$, as indicated in Formula 190.

$$\vec{s}'^T := (s'_1, \ldots, s'_L)^T := M \cdot \vec{f}'^T$$
[Formula 190]

Using the processing device and based on the vector $f^{\rightarrow'}$, the s vector generation part 337 also generates a value $s_{0'}$, as indicated in Formula 191.

$$s'_0 := \vec{1} \cdot \vec{f}'^T$$
[Formula 191]

(S1006: Conversion Information $W_1$ Generation Step)

Using the processing device, the conversion information $W_1$ generation part 332 generates conversion information $W_1$, as indicated in Formula 192.

$$W_1 \xleftarrow{R} GL(7, \mathbb{F}_q)$$
[Formula 192]

(S1007: Conversion Information $W_1$ Encryption Step)

Using the processing device, the conversion information $W_1$ encryption part 333 computes Formula 193, and thus encrypts the conversion information $W_1$ with functional encryption and generates encrypted conversion information $\psi^{rk}$. Since the conversion information $W_1$ is encrypted with functional encryption on input of the attribute information $\Gamma'$, the conversion information $W_1$ is encrypted with the attribute information of the user who can decrypt the re-encrypted ciphertext $CT_{\Gamma'}$ being set.

$$\psi^{rk} \xleftarrow{R} Enc_{KP-FE}(pk^{KP-FE}, \Gamma', W_1)$$
[Formula 193]

(S1008: Decryption Key $k^{*rk}$ Generation Step)

Using the processing device, the decryption key generation part 334 generates a decryption key $k^{*rk}_0$, as indicated in Formula 194.

$$k^{*rk}_0 := (k^*_0 + (0, -s'_0, 0, 0, 0, 0, \eta')_{\mathbb{B}^*_0}) W_1$$
[Formula 194]

Using the processing device, the decryption key generation part 334 also generates a decryption key $k^{*rk}_i$ for each integer $i=1, \ldots, L$, as indicated in Formula 195.

for $i = 1, \ldots L$ [Formual 195]

if $\rho(i) =$ $(t, \vec{v}_i := (v_{i,1}, \ldots, v_{i,n_t}) \in \mathbb{F}_q^{n_t} \setminus \{\vec{0}\})(v_{i,n_t} \neq 0)$, $k_i^{*rk} := k_i^* + \overbrace{(s_i' \vec{e}_{t,1} + \theta_i' \vec{v}_i, \overbrace{0^{u_t}}^{u_t}, \overbrace{\eta_i'}^{z_t}, \overbrace{0}^{1})}^{n_t}_{\mathbb{B}_t^*}$, if $\rho(i) = \neg (t, \vec{v}_i)$, $k_i^{*rk} := k_i^* + \overbrace{(s_i' \vec{v}_i, \overbrace{0^{u_t}}^{u_t}, \overbrace{\eta_i'}^{z_t}, \overbrace{0}^{1})}^{n_t}_{\mathbb{B}_t^*}$, (S1009: Conversion Step)
Using the processing device, the conversion part 335 computes Formula 196, and thus generates a basis $\hat{D}^*_0$.

$d^*_{0,i} := b^*_{0,i} W_1$ for $i = 2, 3, 4, 7$, $\hat{\mathbb{D}}^*_0 := (d^*_{0,2}, d^*_{0,3}, d^*_{0,4}, d^*_{0,7})$, [Formula 196]

(S1010: Key Transmission Step)
Using the communication device and via the network, for example, the re-encryption key transmission part 340 transmits the re-encryption key $rk_{(S,\Gamma')}$ having, as elements, the access structure S, the attribute set $\Gamma'$, the decryption keys $k^{*rk}_0$ and $k^{*rk}_i$, the encrypted conversion information $\psi^{rk}$, and the basis $\hat{D}^*_0$ to the re-encryption device 400 in secrecy. As a matter of course, the re-encryption key $rk_{(S,\Gamma')}$ may be transmitted to the re-encryption device 400 by another method.

In brief, in (S1001) through (S1009), the decryption device 300 generates the re-encryption key $rk_{(S,\Gamma')}$ by executing the RKG algorithm indicated in Formula 197. In (S1010), the decryption device 300 transmits the generated re-encryption key $rk_{(S,\Gamma')}$ to the re-encryption device 400.

$RKG(pk, sk_S = (sk_S^{KP-FE}, \mathbb{S}, k_0^*, \{k_i^*\}_{i=1,\ldots,L}), \Gamma')$: [Formual 197]

$\eta' \xleftarrow{U} \mathbb{F}_q$, $\vec{f}' \xleftarrow{R} \mathbb{F}_q^r$, $\vec{s}'^T := (s'_1, \ldots, s'_L)^T := M' \cdot \vec{f}'^T, s'_0 := \vec{1} \cdot \vec{f}'^T$, $W_1 \xleftarrow{R} GL(7, \mathbb{F}_q)$, $\psi^{rk} \xleftarrow{R} Enc_{KP-FE}(pk^{KP-FE}, \Gamma', W_1)$, $k_0^{*rk} := (k_0^* + (0, -s'_0, 0, 0, 0, 0, \eta')_{\mathbb{B}_0^*}) W_1$, for $i = 1, \ldots L$ if $\rho(i) =$ $(t, \vec{v}_i := (v_{i,1}, \ldots, v_{i,n_t}) \in \mathbb{F}_q^{n_t} \setminus \{\vec{0}\})(v_{i,n_t} \neq 0)$, $\theta_i' \xleftarrow{U} \mathbb{F}_q, \eta_i' \xleftarrow{U} \mathbb{F}_q^{z_t}$ $k_i^{*rk} := k_i^* + \overbrace{(s_i' \vec{e}_{t,1} + \theta_i' \vec{v}_i, \overbrace{0^{u_t}}^{u_t}, \overbrace{\eta_i'}^{z_t}, \overbrace{0}^{1})}^{n_t}_{\mathbb{B}_t^*}$, if $\rho(i) = \neg (t, \vec{v}_i)$, $\eta_i' \xleftarrow{U} \mathbb{F}_q^{z_t}$ $k_i^{*rk} := k_i^* + \overbrace{(s_i' \vec{v}_i, \overbrace{0^{u_t}}^{u_t}, \overbrace{\eta_i'}^{z_t}, \overbrace{0}^{1})}^{n_t}_{\mathbb{B}_t^*}$, $d^*_{0,i} := b^*_{0,i} W_1$ for $i = 2, 3, 4, 7$, $\hat{\mathbb{D}}^*_0 := (d^*_{0,2}, d^*_{0,3}, d^*_{0,4}, d^*_{0,7})$, $rk_{(S,\Gamma')} := (\mathbb{S}, \Gamma', k_0^{*rk}, \{k_i^{*rk}\}_{i=1,\ldots,L}, \psi^{rk}, \hat{\mathbb{D}}^*_0)$, return $rk_{(S,\Gamma')}$.

The function and operation of the re-encryption device 400 will be described.

The re-encryption device 400 includes a public parameter receiving part 410, a ciphertext receiving part 420, a re-encryption key receiving part 430, a verification part 440, an encryption part 450, and a re-encrypted ciphertext transmission part 460. The verification part 440 includes a span program computation part 441 and a signature verification part 442. The encryption part 450 includes a random number generation part 451, an f vector generation part 452, an s vector generation part 453, a conversion information $W_2$ generation part 454, a conversion information $W_2$ encryption part 455, a ciphertext $c^{renc}$ generation part 456, and a decryption key $k^{*renc}$ generation part 457.

With reference to FIG. 27, the process of the REnc algorithm will be described.

(S1101: Public Parameter Receiving Step)
Using the communication device and via the network, for example, the public parameter receiving part 410 receives the public parameter pk generated by the key generation device 100.

(S1102: Ciphertext Receiving Step)
Using the communication device and via the network, for example, the ciphertext receiving part 420 receives the ciphertext $ct_\Gamma$ transmitted by the encryption device 200.

(S1103: Re-Encryption Key Receiving Step)
Using the communication device and via the network, for example, the re-encryption key receiving part 430 receives the re-encryption key $rk_{(S,\Gamma')}$ transmitted by the decryption device 300.

(S1104: Span Program Computation Step)
Using the processing device, the span program computation part 441 determines whether or not the access structure S included in the re-encryption key $rk_{(S,\Gamma')}$ accepts $\Gamma$ included in the ciphertext $ct_\Gamma$. The method for determining whether or not the access structure S accepts $\Gamma$ is as described in "3. Concept for Implementing FPRE" in Embodiment 1.

If the access structure S accepts $\Gamma$ (accept in S1104), the span program computation part 441 advances the process to (S1105). If the access structure S rejects $\Gamma$ (reject in S1104), the span program computation part 441 ends the process.

(S1105: Signature Verification Step)
Using the processing device, the signature verification part 442 determines whether or not a result of computing Formula 198 is 1. If the result is 1 (valid in S1105), the signature verification part 442 advances the process to (S1106). If the result is 0 (invalid in S1105), the signature verification part 442 ends the process.

$Ver(verk, C=(\Gamma, c_0^{enc}, \{c_t^{enc}\}_{(t, \vec{x}_t) \in \Gamma}, c_{d+1}^{enc}), Sig)$ [Formula 198]

(S1106: Random Number Generation Step)
Using the processing device, the random number generation part 451 generates random numbers, as indicated in Formula 199.

$\sigma, \zeta', \delta', \rho', \varphi', \eta'', \theta_i'' \xleftarrow{U} \mathbb{F}_q$ for $i = 1, \ldots, L$, [Formula 199]

$\vec{\eta}_i'' \xleftarrow{U} \mathbb{F}_q^{z_t}$ for $i = 1, \ldots, L$, $\varphi_t' \xleftarrow{U} \mathbb{F}_q$ for $(t, x_t') \in \Gamma$ (S1107: f Vector Generation Step)

Using the processing device, the f vector generation part 452 randomly generates a vector $\vec{f}''$ having r pieces of elements, as indicated in Formula 200.

$$\vec{f}'' \xleftarrow{R} \mathbb{F}_q^r \qquad \text{[Formual 200]}$$

(S1108: s Vector Generation Step)

Using the processing device and based on the (L rows×r columns) matrix M included in the access structure S and the vector $\vec{f}''$, the s vector generation part 453 generates a vector $\vec{s}''^T$, as indicated in Formula 201.

$$\vec{s}''^T := (s''_1, \ldots, s''_L)^T := M \cdot \vec{f}''^T \qquad \text{[Formula 201]}$$

Using the processing device and based on the vector $\vec{f}''$, the s vector generation part 453 also generates a value $s_0''$, as indicated in Formula 202.

$$s_0'' := \vec{1} \cdot \vec{f}''^T \qquad \text{[Formula 202]}$$

(S1109: Conversion Information $W_2$ Generation Step)

Using the processing device, the conversion information $W_2$ generation part 454 generates conversion information $W_2$, as indicated in Formula 203.

$$W_2 \xleftarrow{R} GL(7, \mathbb{F}_q) \qquad \text{[Formual 203]}$$

(S1110: Conversion Information $W_2$ Encryption Step)

Using the processing device, the conversion information $W_2$ encryption part 455 computes Formula 204, and thus encrypts the conversion information $W_2$ with functional encryption and generates encrypted conversion information $\psi^{renc}$. Since the conversion information $W_2$ is encrypted with functional encryption on input of the attribute information Γ', the conversion information $W_2$ is encrypted with the attribute information of the user who can decrypt the re-encrypted ciphertext $CT_{\Gamma'}$ being set.

$$\psi^{renc} \xleftarrow{R} Enc_{KP-FE}(pk^{KP-FE}, \Gamma', W_2) \qquad \text{[Formual 204]}$$

(S1111: Ciphertext $c^{renc}$ Generation Step)

Using the processing device, the ciphertext $c^{renc}$ generation part 456 generates a ciphertext $c^{renc}_0$, as indicated in Formula 205.

$$c_0^{renc} := (c_0^{enc} + (\zeta', \delta', \rho'(verk, 1), 0, \varphi', 0) \mathbb{B}_0) W_2 \qquad \text{[Formula 205]}$$

Using the processing device, the ciphertext $c^{renc}$ generation part 456 also generates a ciphertext $c^{renc}_t$ for each integer t included in the attribute information Γ, as indicated in Formula 206.

$$c_t^{renc} := c_t^{enc} + (\underbrace{\delta' \vec{x}_t}_{n_t}, \underbrace{0 u_t}_{u_t}, \underbrace{0 z_t}_{z_t}, \underbrace{\varphi'_t}_{1})_{\mathbb{B}_t} \qquad \text{[Formula 206]}$$

for $(t, x_t) \in \Gamma$

Using the processing device, the ciphertext $c^{renc}$ generation part 456 also generates a ciphertext $c^{renc}_{d+1}$, as indicated in Formula 207.

$$c_{d+1}^{renc} = c_{d+1}^{enc} \cdot g_T^{\zeta'} \qquad \text{[Formula 207]}$$

(S1112: Decryption Key $k^{*renc}$ Generation Step)

Using the processing device, the decryption key $k^{*renc}$ generation part 457 generates a decryption key $k^{*renc}_0$, as indicated in Formula 208.

$$k_0^{*renc} := k_0^{*rk} + (0, -s_0'', \sigma(-1, verk), 0, 0, \eta'') \mathbb{D}^*_0 \qquad \text{[Formula 208]}$$

Using the processing device, the decryption key $k^{*renc}$ generation part 457 also generates a decryption key $k^{*renc}_i$ for each integer i=1, ..., L, as indicated in Formula 209.

for $i = 1, \ldots, L$ [Formula 209]

if $\rho(i) =$ $(t, \vec{v} := (v_{i,1}, \ldots, v_{i,n_t}) \in \mathbb{F}_q^{n_t} \setminus \{\vec{0}\})(v_{i,n_t} \neq 0)$ $$k_i^{*renc} := k_i^{*rk} + (\underbrace{s_i'' \vec{e}_{t,1} + \theta_i'' \vec{v}_i}_{n_t}, \underbrace{0 u_t}_{u_t}, \underbrace{\vec{\eta}_i''}_{z_t}, \underbrace{\vec{0}}_{1})_{\mathbb{B}_t^*}$$

if $\rho(i) = \neg (t, \vec{v}_i)$, $$k_i^{*renc} := k_i^{*rk} + (\underbrace{s_i'' \vec{v}_i}_{n_t}, \underbrace{0 u_t}_{u_t}, \underbrace{\vec{\eta}_i''}_{z_t}, \underbrace{\vec{0}}_{1})_{\mathbb{B}_t^*}$$

(S1113: Re-Encrypted Ciphertext Transmission Step)

Using the communication device and via the network, for example, the re-encrypted ciphertext transmission part 460 transmits the re-encrypted ciphertext $CT_{\Gamma'}$ having, as elements, the attribute set Γ', the access structure S, the attribute set Γ, the decryption keys $k^{*renc}_0$ and $k^{*renc}_i$, the ciphertexts $c^{renc}_0$, $c^{renc}_t$, and $c^{renc}_{d+1}$, the encrypted conversion information $\psi^{rk}$, and the encrypted conversion information $\psi^{renc}$ to the re-encryption device 400 in secrecy. As a matter of course, the re-encrypted ciphertext $CT_{\Gamma'}$ may be transmitted to the re-encryption device 400 by another method.

In brief, in (S1101) through (S1112), the re-encryption device 400 generates the re-encrypted ciphertext $CT_{\Gamma'}$ by executing the REnc algorithm indicated in Formula 210-1 and Formula 210-2. In (S1113), the re-encryption device 400 transmits the generated re-encrypted ciphertext $CT_{\Gamma'}$ to the re-encrypted ciphertext decryption device 500.

$$REnc(rk_{(S,\Gamma')} = (S, \Gamma', k_0^{*rk}, \{k_i^{*rk}\}_{i=1,\ldots,L}, \psi^{rk}, \mathbb{D}_0^*), \qquad \text{[Formula 210-1]}$$

$$ct_\Gamma = (\Gamma, c_0^{enc}, \{c_t^{enc}\}_{(t,\vec{x}_t) \in \Gamma}, c_{d+1}^{enc}, verk, Sig)):$$

If S accepts $\Gamma := \{(t, \vec{x}_t)\}$, and $Ver(verk, C = (\Gamma, c_0^{enc}, \{c_t^{enc}\}_{(t,\vec{x}_t) \in \Gamma}, c_{d+1}^{enc}, Sig) = 1$ then compute following $c_0^{renc}$, $\{c_t^{renc}\}_{(t,\vec{x}_t) \in \Gamma}, c_{d+1}^{renc}, k^{*renc}$, and $\{k^{*renc}\}_{i=0,\ldots,L}$ $\sigma, \zeta', \delta', \rho', \varphi', \eta'' \xleftarrow{U} \mathbb{F}_q$, $\varphi'_t \xleftarrow{U} \mathbb{F}_q$ for $(t, \vec{x}_t) \in \Gamma$ $\vec{f}'' \xleftarrow{R} \mathbb{F}_q^r$, $\vec{s}''^T := (s''_1, \ldots, s''_L)^T := M \cdot \vec{f}''^T, s_0'' := \vec{1} \cdot \vec{f}''^T$, $W_2 \xleftarrow{R} GL(7, \mathbb{F}_q)$, $\psi^{renc} \xleftarrow{R} Enc_{KP-FE}(pk^{KP-FE}, \Gamma', W_2)$, -continued $$c_0^{renc} := (c_0^{enc} + (\zeta', \delta', \rho'(verk), 1), 0, \varphi', 0)_{\mathbb{B}_0})W_2, \quad \text{[Formula 210-2]}$$

$$c_t^{renc} := c_t^{enc} + (\frac{n_t}{\delta'\vec{x}_t}, \frac{u_t}{0 u_t}, \frac{z_t}{0 z_t}, \frac{1}{\varphi'_t})_{\mathbb{B}_t},$$

for $(t, x_t) \in \Gamma$ $$c_{d+1}^{renc} := c_{d+1}^{enc} \cdot g_T^{\zeta'},$$

$$k_0^{*renc} := k_0^{*rk} + (0, -s_0'', \sigma(-1, verk), 0, 0, \eta_0'')_{\mathbb{D}_0^*},$$

for $i = 1, \ldots, L$
if $\rho(i) = $
$$(t, \vec{v}_i := (v_{i,1}, \ldots, v_{i,n_t}) \in \mathbb{F}_q^{n_t} \setminus \{\vec{0}\})(v_{i,n_t} \neq 0),$$

$$\theta_i'' \xleftarrow{U} \mathbb{F}_q, \eta_i'' \xleftarrow{U} \mathbb{F}_q^{z_t},$$

$$k_i^{*renc} := k_i^{*rk} + (\frac{n_t}{s_i''\vec{e}_{t,1} + \theta_i''\vec{v}_i}, \frac{u_t}{0 u_t}, \frac{z_t}{\eta_i''}, \frac{1}{0})_{\mathbb{B}_t^*},$$

if $\rho(i) = \neg (t, \vec{v}_i),$ $$\eta_i'' \xleftarrow{U} \mathbb{F}_q,$$

$$k_i^{*renc} := k_i^{*rk} + (\frac{n_t}{s_i''\vec{v}_i}, \frac{u_t}{0 u_t}, \frac{z_t}{\eta_i''}, \frac{1}{0})_{\mathbb{B}_t^*},$$

$$CT_{\Gamma'} := (\Gamma', \mathbb{S}, \Gamma, k_0^{*renc}, \{k_i^{*renc}\}_{i=1,\ldots,L},$$
$$c_0^{renc}\{c_t^{renc}\}_{(t,\vec{x}_t) \in \Gamma'}, c_{d+1}^{renc}, c_{d+1}^{rk}, c_{d+1}^{enc}),$$

return $CT_{\Gamma'}$.

The function and operation of the re-encrypted ciphertext decryption device 500 will be described.

The re-encrypted ciphertext decryption device 500 includes a decryption key receiving part 510, a ciphertext receiving part 520, a span program computation part 530, a complementary coefficient computation part 540, a conversion information generation part 550, a conversion part 560, a pairing operation part 570, and a message computation part 580. The pairing operation part 570 and the message computation part 580 will be referred to collectively as a decryption part.

With reference to FIG. 28, the process of the Dec1 algorithm will be described.

(S1201: Decryption Key Receiving Step)

Using the communication device and via the network, for example, the decryption key receiving part 510 receives the decryption key $sk_{S'}$ transmitted by the key generation device 100. The decryption key receiving part 310 also receives the public parameter pk generated by the key generation device 100.

(S1202: Ciphertext Receiving Step)

Using the communication device and via the network, for example, the ciphertext receiving part 520 receives the re-encrypted ciphertext $CT_\Gamma$ transmitted by the re-encryption device 400.

(S1203: Span Program Computation Step)

Using the processing device, the span program computation part 530 determines whether or not the access structure S included in the re-encrypted ciphertext $CT_\Gamma$ accepts Γ included in the re-encrypted ciphertext $CT_\Gamma$, and determines whether or not the access structure S' included in the decryption key $sk_{S'}$ accepts Γ' included in the re-encrypted ciphertext $CT_\Gamma$. The method for determining whether or not the access structure S accepts Γ and whether or not the access structure S' accepts Γ' is as described in "3. Concept for Implementing FPRE" in Embodiment 1.

If the access structure S accepts Γ and the access structure S' accepts Γ' (accept in S1203), the span program computation part 530 advances the process to (S1204). If the access structure S rejects Γ or the access structure S' rejects Γ' (reject in S1203), the span program computation part 530 ends the process.

(S1204: Complementary Coefficient Computation Step)

Using the processing device, the complementary coefficient computation part 540 computes I and a constant (complementary coefficient) $\{\alpha_i\}_{i \in I}$ such that Formula 211 is satisfied.

$$\vec{1} = \sum_{i \in I} \alpha_i M_i \quad \text{[Formula 211]}$$

where $M_i$ is the $i$-th row of $M$, and $I \subseteq \{i \in \{1, \ldots, L\} \mid [$
$$\rho(i) = (t, \vec{v}_i) \wedge (t, \vec{x}_t) \in \Gamma \wedge \vec{v}_i \cdot \vec{x}_t = 0] \vee [$$
$$\rho(i) = \neg (t, \vec{v}_i) \wedge (t, \vec{x}_t) \in \Gamma \wedge \vec{v}_i \cdot \vec{x}_t \neq 0]\}$$

(S1205: Conversion Information Generation Step)

Using the processing device, the conversion information generation part 550 generates conversion information $\tilde{W}_1$ and $\tilde{W}_2$, as indicated in Formula 212.

$$\tilde{W}_1 \xleftarrow{R} Dec_{KP-FE}(pk^{KP-FE}, sk_\Gamma^{KP-FE}, \psi^{rk}), \quad \text{[Formula 212]}$$

$$\tilde{W}_2 \xleftarrow{R} Dec_{KP-FE}(pk^{KP-FE}, sk_\Gamma^{KP-FE}, \psi^{renc})$$

Using the processing device, the conversion part 560 converts the basis of the decryption key $k_0^{*renc}$ and thus generates a decryption key $\tilde{k}_0^*$, and converts the basis of the ciphertext $c_0^{renc}$ and thus generates a ciphertext $\tilde{c}_0$, as indicated in Formula 213.

$$\tilde{k}_0^* := k_0^{*renc} \tilde{W}_1^{-1},$$

$$\tilde{c}_0 := c_0^{renc} \tilde{W}_2^{-1} \quad \text{[Formula 213]}$$

(S1207: Pairing Operation Step)

Using the processing device, the pairing operation part 570 computes Formula 214, and thus generates a session key $\tilde{K}$.

$$\tilde{K} := e(\tilde{c}_0, \tilde{k}_0^*) \cdot \prod_{i \in I \wedge \rho(i) = (t, \vec{v}_i)} e(c_t^{renc}, k_i^{*renc}) \quad \text{[Formula 214]}$$

$$\alpha_i \cdot \prod_{i \in I \wedge \rho(i) = \neg(t, \vec{v}_i)} e(c_t^{renc}, k_i^{*renc})^{\alpha_i / (\vec{v}_i \cdot \vec{x}_t)}$$

(S1208: Message Computation Step)

Using the processing device, the message computation part 390 computes m'=$c_{d+1}^{enc}/\tilde{K}$, and thus generates a message m'(=m).

In brief, in (S1201) through (S1208), the re-encrypted ciphertext decryption device 500 generates the message m'(=m) by executing the Dec1 algorithm indicated in Formula 215.

$$Dec_1(pk, sk_{S'} = (sk_{S'}^{KP-FE}, \mathbb{S}', k_0^*, \{k_i^*\}_{i=1,\ldots,L}), \quad \text{[Formula 215]}$$

$$CT_{\Gamma'} = (\Gamma', \mathbb{S}, \Gamma, k_0^{*renc}, \{k_i^{renc}\}_{i=1,\ldots,L},$$

$$c_0^{renc}\{c_t^{renc}\}_{(t,\vec{x}_t) \in \Gamma'}, c_{d+1}^{renc}, c_{d+1}^{rk}, c_{d+1}^{enc})):$$

-continued

If $\mathbb{S}$ accepts $\Gamma := \{(t, \vec{x}_t)\}$ and $\mathbb{S}'$ accepts $\Gamma' := \{(t, \vec{x}_t)\}$, then compute $I$ and $\{\alpha_i\}_{i \in I}$ such that $$\vec{1} = \sum_{i \in I} \alpha_i M_i$$

where $M_i$ is the $i$-th row of $M$, and $I \subseteq \{i \in \{1, \ldots, L\} \mid [$ $\rho(i) = (t, \vec{v}_i) \wedge (t, \vec{x}_t) \in \Gamma \wedge \vec{v}_i \cdot \vec{x}_t = 0] \vee [$ $\rho(i) = \neg (t, \vec{v}_i) \wedge (t, \vec{x}_t) \in \Gamma \wedge \vec{v}_i \cdot \vec{x}_t \neq 0]\}$, $\tilde{W}_1 \xleftarrow{R} Dec_{KP-FE}(pk^{KP-FE}, sk_\Gamma^{KP-FE}, \psi^{rk})$, $\tilde{W}_2 \xleftarrow{R} Dec_{KP-FE}(pk^{KP-FE}, sk_\Gamma^{KP-FE}, \psi^{renc})$, $\tilde{k}_0^* := k_0^{*renc} \tilde{W}_1^{-1}$, $\tilde{c}_0 := c_0^{renc} \tilde{W}_2^{-1}$, $\tilde{K} := e(\tilde{c}_0, \tilde{k}_0^*) \cdot \prod_{i \in I \wedge \rho(i) = (t, \vec{v}_i)} e(c_t^{renc}, k_i^{*renc})$ $\alpha_i \cdot \prod_{i \in I \wedge \rho(i) = \neg (t, \vec{v}_i)} e(c_t^{renc}, k_i^{*renc}) \alpha_i / (\vec{v}_i \cdot \vec{x}_t)$ $m' := c_{d+1}^{enc} / \tilde{K}$, return $m'$.

With reference to FIG. 29, the process of the Dec2 algorithm will be described.

(S1301: Decryption Key Receiving Step)

Using the communication device and via the network, for example, the decryption key receiving part 310 receives the decryption key $sk_S$ transmitted by the key generation device 100. The decryption key receiving part 310 also receives the public parameter pk generated by the key generation device 100.

(S1302: Ciphertext Receiving Step)

Using the communication device and via the network, for example, the ciphertext receiving part 350 receives the ciphertext $ct_\Gamma$ transmitted by the re-encryption device 400.

(S1303: Span Program Computation Step)

Using the processing device, the span program computation part 361 determines whether or not the access structure S included in the decryption key $sk_S$ accepts $\Gamma$ included in the ciphertext $ct_\Gamma$. The method for determining whether or not the access structure S accepts $\Gamma$ is as described in "3. Concept for Implementing FPRE" in Embodiment 1.

If the access structure S accepts $\Gamma$ (accept in S1303), the span program computation part 361 advances the process to (S1304). If the access structure S rejects $\Gamma$ (reject in S1303), the span program computation part 361 ends the process.

(S1304: Signature Verification Step)

Using the processing device, the signature verification part 362 determines whether or not a result of computing Formula 216 is 1. If the result is 1 (valid in S1304), the signature verification part 442 advances the process to (S1305). If the result is 0 (invalid in S1304), the signature verification part 442 ends the process.

$Ver(verk, C=(\Gamma, c_0^{enc}, \{c_t^{enc}\}_{(t, x_t) \in \Gamma}, c_{d+1}^{enc}), Sig)$ [Formula 216]

(S1305: Complementary Coefficient Computation Step)

Using the processing device, the complementary coefficient computation part 370 computes I and a constant (complementary coefficient) $\{\alpha_i\}_{i \in I}$ such that Formula $$\vec{1} = \sum_{i \in I} \alpha_i M_i$$ [Formula 217]

where $M_i$ is the $i$-th row of $M$ and $I \subseteq$ $\{i \in \{1, \ldots, L\} \mid [\rho(i) = (t, \vec{v}_i) \wedge (t, \vec{x}_t) \in \Gamma \wedge \vec{v}_i \cdot \vec{x}_t =$ $0] \vee [\rho(i) = \neg (t, \vec{v}_i) \wedge (t, \vec{x}_t) \in \Gamma \wedge \vec{v}_i \cdot \vec{x}_t \neq 0]\}$ (S1306: Pairing Operation Step)

Using the processing device, the pairing operation part 570 computes Formula 128, and thus generates a session key K.

$K := e(c_0^{enc}, k_0^*) \cdot \prod_{i \in I \wedge \rho(i) = (t, \vec{v}_i)} e(c_t^{renc}, k_i^*)$ [Formula 218]

$\alpha_i \cdot \prod_{i \in I \wedge \rho(i) = \neg (t, \vec{v}_i)} e(c_t^{enc}, k_i^*) \alpha_i / (\vec{v}_i \cdot \vec{x}_i)$ (S1307: Message Computation Step)

Using the processing device, the message computation part 390 computes $m' = c_{d+1}^{enc}/K$, and thus generates a message $m'(=m)$.

In brief, in (S1301) through (S1307), the decryption device 300 generates the message $m'(=m)$ by executing the Dec2 algorithm indicated in Formula 219.

$Dec_2(pk, sk_\mathbb{S} = (sk_\mathbb{S}^{KP-FE}, \mathbb{S}, k_0^*, \{k_i^*\}_{i=1,\ldots L})$, [Formula 219]

$ct_\Gamma = (\Gamma, c_0^{enc}, \{c_t^{enc}\}_{(t, \vec{x}_t) \in \Gamma}, c_{d+1}^{enc}, verk, Sig))$:

If $\mathbb{S}$ accepts $\Gamma := \{(t, \vec{x}_t)\}$ and $Ver(verk, C = (\Gamma, c_0^{enc}, \{c_t^{enc}\}_{(t, \vec{x}_t) \in \Gamma}, c_{d+1}^{enc}), Sig) = 1$, then compute $I$ and $\{\alpha_i\}_{i \in I}$ such that $$\vec{1} = \sum_{i \in I} \alpha_i M_i$$

where $M_i$ is the $i$-th row of $M$, and $I \subseteq \{i \in \{1, \ldots, L\} \mid [$ $\rho(i) = (t, \vec{v}_i) \wedge (t, \vec{x}_t) \in \Gamma \wedge \vec{v}_i \cdot \vec{x}_t = 0] \vee [$ $\rho(i) = \neg (t, \vec{v}_i) \wedge (t, \vec{x}_t) \in \Gamma \wedge \vec{v}_i \cdot \vec{x}_t \neq 0]\}$, $K := e(c_0^{enc}, k_0^*) \cdot \prod_{i \in I \wedge \rho(i) = (t, \vec{v}_i)} e(c_t^{enc}, k_i^*) \alpha_i \cdot$ $\prod_{i \in I \wedge \rho(i) = \neg (t, \vec{v}_i)} e(c_t^{enc}, k_i^{*r}) \alpha_i / (\vec{v}_i \cdot \vec{x}_t)$ $m' := c_{d+1}^{enc} / K$, return $m'$.

As described above, the cryptographic system according to Embodiment 2 can implement the KP-FPRE scheme. Thus, a ciphertext can be forwarded to a set of various types of users with a single re-encryption key.

As a result, for example, various ciphertexts existing on a network can be securely forwarded to users having various attributes, without decrypting the ciphertexts. It is thus possible to securely and practically entrust processing of ciphertexts to a trusted third party.

It has been described that the decryption device 300 also functions as a re-encryption key generation device, and that the decryption device 300 executes the RKG algorithm as well as the Dec2 algorithm. However, the decryption device 300 and the re-encryption key generation device may be implemented separately. In this case, the decryption device 300 executes the Dec2 algorithm, and the re-encryption key generation device executes the RKG algorithm. In this case, therefore, the decryption device 300 includes functional components that are required to execute the Dec2 algorithm, and the re-encryption key generation device includes functional components that are required to execute the RKG algorithm.

In the above embodiments, it has been described that the re-encryption device 400 re-encrypts a ciphertext and changes the destination of the ciphertext, assuming a case where a message is encrypted with FE and transmitted to the destination.

FE can be used not only to encrypt a message and transmit the encrypted message to the destination, but also to implement searchable encryption which allows searching without decrypting a ciphertext. When searchable encryption is implemented with FE, a specified search keyword can be changed with the algorithms described in the above embodiments.

In the above embodiments, a user capable of decryption is specified by attribute information which is set in a ciphertext. Then, the destination of the ciphertext is changed by changing the attribute information. When searchable encryption is implemented with FE, a part of attribute information which is set in a ciphertext specifies a user capable of searching, and a part of the remaining attribute information specifies a search keyword. Thus, it is possible to change the specified keyword by changing the part that specifies the search keyword in the attribute information with the algorithms described in the above embodiments.

In the above embodiments, a single key generation device 100 generates a decryption key. However, it is possible to arrange that a single decryption key is generated by a plurality of key generation devices 100 by combining the algorithms of the above embodiments with a multi-authority scheme discussed in Non-Patent Literature 3.

In the above embodiments, adding an attribute category (increasing the value of d in the attribute format $n^{\rightarrow}$) requires that the public parameter be re-issued. However, it is possible to arrange that an attribute category can be added without re-issuing the public parameter by combining the algorithms of the above embodiments with an unbounded scheme discussed in Non-Patent Literature 4.

In the above embodiments, when the length of vectors used for inner-product encryption is defined as N, the size of the public parameter and the master secret key is proportional to $N^2$, and it takes time proportional to $N^2$ to generate or encrypt a decryption key to be given to a user. However, it is possible to reduce the size of the public parameter and the master secret key and reduce time necessary for generating and encrypting the decryption key to be given to the user by combining the algorithms of the above embodiments with a scheme discussed in Non-Patent Literature 5.

Embodiment 3

In the above embodiments, the methods for implementing the cryptographic processes in dual vector spaces have been described. In Embodiment 3, a method for implementing the cryptographic processes in dual modules will be described.

That is, in the above embodiments, the cryptographic processes are implemented in cyclic groups of prime order q. However, when a ring R is expressed using a composite number M as indicated in Formula 220, the cryptographic processes described in the above embodiments can be adapted to a module having the ring R as a coefficient.

$$\mathbb{R} := \mathbb{Z}/M\mathbb{Z} \qquad \text{[Formula 220]}$$

where $\mathbb{Z}$ : integer, and
M: composite number.

By changing $F_q$ to R in the algorithms described in the above embodiments, the cryptographic processes in dual additive groups can be implemented.

From the view point of security proof, in the above embodiments, $\rho(i)$ for each integer $i=1, \ldots, L$ may be limited to a positive tuple $(t, v^{\rightarrow})$ or negative tuple $\neg (t, v^{\rightarrow})$ for respectively different identification information t.

In other words, when $\rho(i)=(t, v^{\rightarrow})$ or $\rho(i)=\neg(t, v^{\rightarrow})$, let a function $\rho^-$ be map of $(\{1, \ldots, L\} \rightarrow \{1, \ldots, d\}$ such that $\rho^-(i)=t$. In this case, $\rho^-$ may be limited to injection. Note that $\rho(i)$ is $\rho(i)$ in the access structure S:=(M, $\rho(i)$) described above.

A hardware configuration of the cryptographic system 10 (the key generation device 100, the encryption device 200, the decryption device 300, the re-encryption device 400, and the re-encrypted ciphertext decryption device 500) according to the embodiments will now be described.

Figure 30:
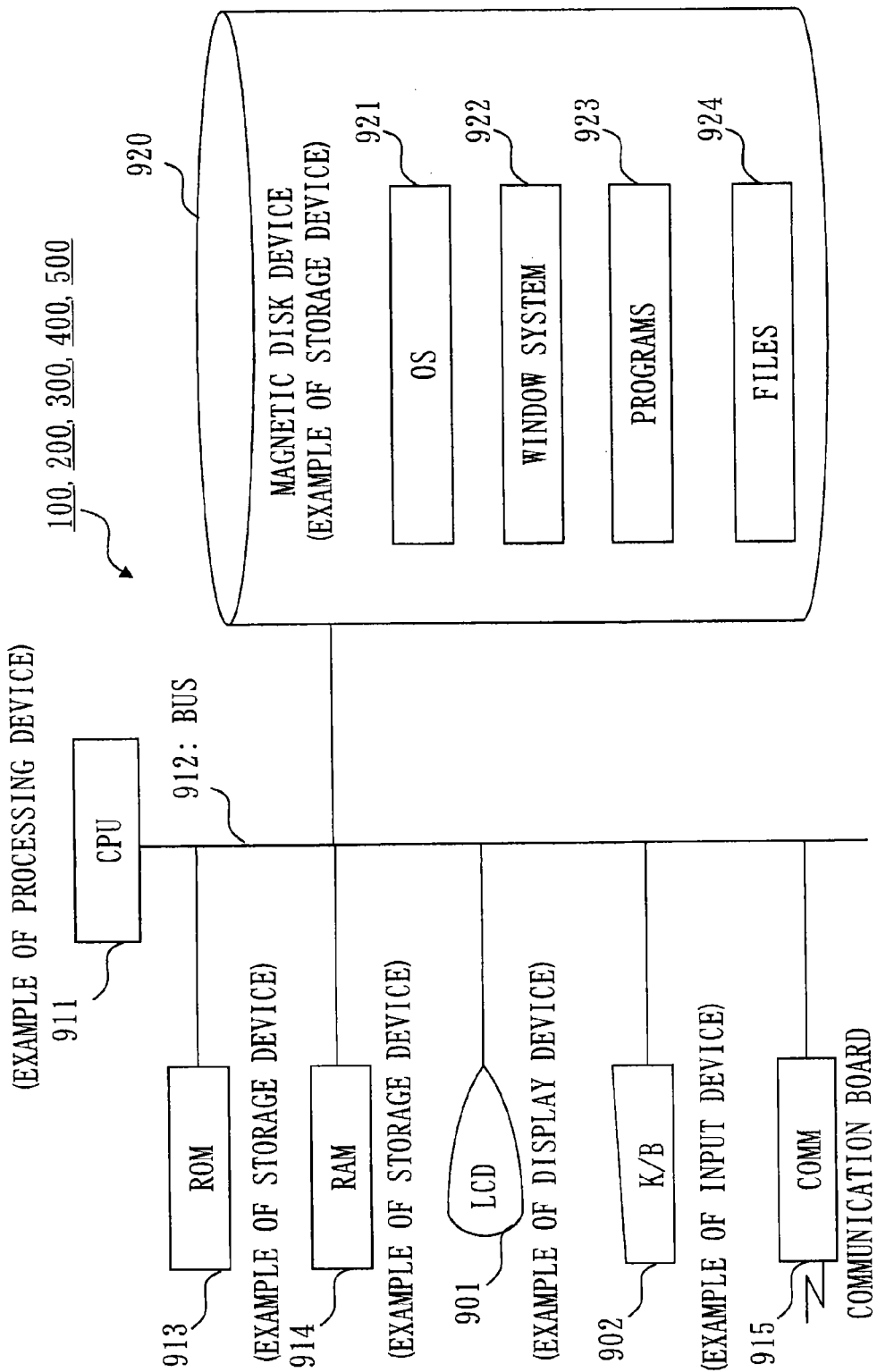
FIG. 30 is a diagram illustrating an example of a hardware configuration of the key generation device 100, the encryption device 200, the decryption device 300, the re-encryption device 400, and the re-encrypted ciphertext decryption device 500.

FIG. 30 is a diagram illustrating an example of a hardware configuration of the key generation device 100, the encryption device 200, the decryption device 300, the re-encryption device 400, and the re-encrypted ciphertext decryption device 500.

As illustrated in FIG. 30, each of the key generation device 100, the encryption device 200, the decryption device 300, the re-encryption device 400, and the re-encrypted ciphertext decryption device 500 includes the CPU 911 (also referred to as a Central Processing Unit, central processing device, processing device, arithmetic device, microprocessor, microcomputer, or processor) that executes programs. The CPU 911 is connected via a bus 912 to the ROM 913, the RAM 914, an LCD 901 (Liquid Crystal Display), the keyboard 902 (K/B), the communication board 915, and the magnetic disk device 920, and controls these hardware devices. In place of the magnetic disk device 920 (fixed disk device), a storage device such as an optical disk device or memory card read/write device may be employed. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of a storage device (memory). The keyboard 902 and the communication board 915 are examples of an input device. The keyboard 902 is an example of a communication device. The LCD 901 is an example of a display device.

The magnetic disk device 920, the ROM 913, or the like stores an operating system 921 (OS), a window system 922, programs 923, and files 924. The programs 923 are executed by the CPU 911, the operating system 921, and the window system 922.

The programs 923 store software and programs that execute the functions described in the above description as the "master key generation part 110", the "master key storage part 120", the "information input part 130", the "decryption key generation part 140", the "key transmission part 150", the "public parameter receiving part 210", the "information input part 220", the "signature processing part 230", the "encryption part 240", the "ciphertext transmission part 250", the "decryption key receiving part 310", the "information input part 320", the "re-encryption key generation part 330", the "re-encryption key transmission part 340", the "ciphertext receiving part 350", the "verification part 360", the "complementary coefficient computation part 370", the "pairing operation part 380", the "message computation part 390", the "public parameter receiving part 410", the "ciphertext receiving part 420", the "re-encryption key receiving part 430", the "verification part 440", the "encryption part 450", the "re-encrypted ciphertext transmission part 460", the "decryption key receiving part 510", the "ciphertext receiving part 520", the "span program computation part 530", the "complementary coefficient computation part 540", the "conversion information generation part 550", the "conversion part 560", the "pairing operation part 570", the "message computation part 580", and the like. The programs 923 store other programs as well. The programs are read and executed by the CPU 911.

The files 924 store information, data, signal values, variable values, and parameters such as the "public parameter pk", the "master secret key sk", the "decryption keys $sk_S$ and $sk_\Gamma$", the "ciphertexts $ct_\Gamma$ and $ct_S$", the "re-encryption keys $rk_{(\Gamma,S')}$ and $rk_{(S,\Gamma')}$", the "re-encrypted ciphertexts $CT_{S'}$ and $CT_{\Gamma'}$", the "access structures S and S'", the "attribute sets $\Gamma$ and $\Gamma'$", and the "message m" in the above description, as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a read/write circuit, and are used for operations of the CPU 911 such as extraction, search, look-up, comparison, calculation, computation, processing, output, printing, and display. The information, data, signal values, variable values, and parameters are temporarily stored in the main memory, cache memory, or buffer memory during the operations of the CPU 911 including extraction, search, look-up, comparison, calculation, computation, processing, output, printing, and display.

The arrows in the flowcharts in the above description mainly indicate input/output of data and signals. The data and signal values are stored in the memory of the RAM 914, the recording medium such as an optical disk, or in an IC chip. The data and signals are transmitted online via a transmission medium such as the bus 912, signal lines, or cables, or via electric waves.

What is described as a "part" in the above description may be a "circuit", "device", "equipment", "means", or "function", and may also be a "step", "procedure", or "process". What is described as a "device" may be a "circuit", "equipment", "means", or "function", and may also be a "step", "procedure", or "process". What is described as a "process" may be a "step". In other words, what is described as a "part" may be realized by firmware stored in the ROM 913. Alternatively, what is described as a "part" may be implemented solely by software, or solely by hardware such as an element, a device, a substrate, or a wiring line, or by a combination of software and firmware, or by a combination including firmware. The firmware and software are stored as programs in the recording medium such as the ROM 913. The programs are read by the CPU 911 and are executed by the CPU 911. That is, each program causes the computer or the like to function as each "part" described above. Alternatively, each program causes the computer or the like to execute a procedure or a method of each "part" described above.

REFERENCE SIGNS LIST

100: key generation device, 110: master key generation part, 120: master key storage part, 130: information input part, 140: decryption key generation part, 141: CP-FE key generation part, 142: random number generation part, 143: decryption key k* generation part, 144: KP-FE key generation part, 145: f vector generation part, 146: s vector generation part, 150: key transmission part, 200: encryption device, 210: public parameter receiving part, 220: information input part, 230: signature processing part, 240: encryption part, 241: f vector generation part, 242: s vector generation part, 243: random number generation part, 244: ciphertext $c^{enc}$ generation part, 250: ciphertext transmission part, 300: decryption device, 310: decryption key receiving part, 320: information input part, 330: re-encryption key generation part, 331: random number generation part, 332: conversion information $W_1$ generation part, 333: conversion information $W_1$ encryption part, 334: decryption key $k^{*rk}$ generation part, 335: conversion part, 336: f vector generation part, 337: s vector generation part, 340: re-encryption key transmission part, 350: ciphertext receiving part, 360: verification part, 361: span program computation part, 362: signature verification part, 370: complementary coefficient computation part, 380: pairing operation part, 390: message computation part, 400: re-encryption device, 410: public parameter receiving part, 420: ciphertext receiving part, 430: re-encryption key receiving part, 440: verification part, 441: span program computation part, 442: signature verification part, 450: encryption part, 451: random number generation part, 452: f vector generation part, 453: s vector generation part, 454: conversion information $W_2$ generation part, 455: conversion information $W_2$ encryption part, 456: ciphertext $c^{renc}$ generation part, 457: decryption key $k^{*renc}$ generation part, 460: re-encrypted ciphertext transmission part, 500: re-encrypted ciphertext decryption device, 510: decryption key receiving part, 520: ciphertext receiving part, 530: span program computation part, 540: complementary coefficient computation part, 550: conversion information generation part, 560: conversion part, 570: pairing operation part, 580: message computation part

The invention claimed is:

1. A hardware-including cryptographic system that implements a proxy re-encryption function in a cryptographic scheme according to which when two pieces of information correspond to each other, a ciphertext which is set to one of the two pieces of information which is decrypted with a decryption key which is set to the other one of the two pieces of information, the hardware-including cryptographic system comprising a re-encryption key generation hardware-including device and a re-encryption hardware-including device, wherein the re-encryption key generation hardware-including device includes a decryption key $k^{*rk}$ generation part that generates a decryption key $k^{*rk}$ by converting, using conversion information $W_1$, a decryption key k* which is set to one of attribute information x and attribute information v corresponding to each other;

a conversion information $W_1$ encryption part that generates encrypted conversion information $\psi^{rk}$ by encrypting the conversion information $W_1$ with one of attribute information x' and attribute information v' corresponding to each other being set; and a re-encryption key transmission part that transmits to the re-encryption hardware-including device the decryption key $k^{*rk}$ and the encrypted conversion information $\psi^{rk}$, as a re-encryption key rk; and wherein the re-encryption hardware-including device includes a ciphertext receiving part that receives a ciphertext $c^{enc}$ which is set to the other one of the attribute information x and the attribute information v;

a ciphertext $c^{renc}$ generation part that generates a ciphertext $c^{renc}$ by setting at least one of additional information H and additional information Θ corresponding to each other in the ciphertext $c^{enc}$ received by the ciphertext receiving part;

a decryption key $k^{*renc}$ generation part that generates a decryption key $k^{*renc}$ by setting at least the other one of the additional information H and the additional information Θ in the decryption key $k^{*rk}$ included in the re-encryption key rk; and a re-encrypted ciphertext transmission part that transmits the ciphertext $c^{renc}$, the decryption key $k^{*renc}$, and the encrypted conversion information $\psi^{rk}$, as a re-encrypted ciphertext CT.

2. The hardware-including cryptographic system according to claim 1, wherein the ciphertext $c^{renc}$ generation part generates the ciphertext $c^{renc}$ by converting the ciphertext $c^{enc}$ using conversion information $W_2$, wherein the re-encryption hardware-including device further includes a conversion information $W_2$ encryption part that generates encrypted conversion information $\psi^{renc}$ by encrypting the conversion information $W_2$ using the one of the attribute information x' and the attribute information v', and wherein the re-encrypted ciphertext transmission part transmits the ciphertext $c^{renc}$, the decryption key $k^{*renc}$, the encrypted conversion information $\psi^{rk}$, and the encrypted conversion information $\psi^{renc}$, as the re-encrypted ciphertext CT.

3. The hardware-including cryptographic system according to claim 2, wherein the ciphertext receiving part receives the ciphertext $c^{enc}$ which is set to a verification key verk for verifying a signature which is attached with a signature key sigk, a signature Sig which is attached to the ciphertext $c^{enc}$ with the signature key sigk, and the verification key verk, and wherein the ciphertext $c^{renc}$ generation part generates the ciphertext $c^{renc}$ by setting the verification key verk in the ciphertext $c^{enc}$ as the one of the additional information H and the additional information Θ.

4. The hardware-including cryptographic system according to claim 3, further comprising a re-encrypted ciphertext decryption device, wherein the re-encrypted ciphertext transmission part transmits the re-encrypted ciphertext CT to the re-encrypted ciphertext decryption device, wherein the re-encrypted ciphertext decryption device includes a decryption key receiving part that receives a decryption key $k^{*\prime}$ which is generated using the other one of the attribute information x' and the attribute information v';

a conversion information generation part that generates the conversion information $W_1$ by decrypting the encrypted conversion information $\psi^{rk}$ with the decryption key $k^{*\prime}$ received by the decryption key receiving part, and generates the conversion information $W_2$ by decrypting the encrypted conversion information $\psi^{renc}$ with the decryption key $k^{*\prime}$;

a conversion part that generates a decryption key $k^{*\sim}$ by converting the decryption key $k^{*renc}$ with the conversion information $W_1$, and generates a ciphertext $c^{enc\sim}$ by converting the ciphertext $c^{renc}$ with the conversion information $W_2$; and a decryption part that decrypts the ciphertext $c^{enc\sim}$ with the decryption key $k^{*\sim}$ generated by the conversion part.

5. The hardware-including cryptographic system according to claim 4, wherein the decryption key $k^{*rk}$ generation part generates the decryption key $k^{*rk}$ including $k^{*rk}_0$ and $k^{*rk}_t$ indicated in Formula 2 from the decryption key $k^*$ including $k^*_0$ and $k^*_t$ indicated in Formula 1, wherein the ciphertext receiving part receives the ciphertext $c^{enc}$ including $c^{enc}_0$, $c^{enc}_i$, and $c^{enc}_{d+1}$ indicated in Formula 3, wherein the ciphertext $c^{renc}$ generation part generates the ciphertext $c^{renc}$ including $c^{renc}_0$, $c^{renc}_i$, and $c^{renc}_{d+1}$ indicated in Formula 4, wherein the decryption key $k^{*renc}$ generation part generates the decryption key $k^{*renc}$ including $k^{*renc}_0$ and $k^{*renc}_t$ indicated in Formula 5, wherein the conversion part generates $k^{*\sim}$ and $c^{\sim}_0$ indicated in Formula 6, and wherein the decryption part computes a message m indicated in Formula 7, $$k_0^* := (1, \delta, 0, 0)_{B_0^*}, \qquad \text{[Formula 1]}$$

$$k_t^* := (\overbrace{\delta \vec{x}_t}^{n_t})_{B_0^*}, \text{ for } (t, \vec{x}_t) \in \Gamma$$

where $$\delta \xleftarrow{U} F_q,$$

$\Gamma = (\{(t, \vec{x}_t), 1 \leq t \leq d\}$, $\vec{x}_t := (x_{t,1}, \ldots, x_{t,n_t})$, $n_t$ is an integer of 1 or more, and $d$ is an integer of 1 or more, $$k_0^{*rk} := (k_0^* + (0, \delta', 0, 0)_{B_0^*})W_1, \qquad \text{[Formula 2]}$$

$$k_t^{*rk} := k_t^* + (\overbrace{\delta' \vec{x}_t}^{n_t})_{B_0^*}, \text{ for } (t, \vec{x}_t) \in \Gamma$$

where $$\delta' \xleftarrow{U} F_q$$

$$c_0^{enc} := (\zeta, -s_0, \rho(verk, 1))_{B_0}, \qquad \text{[Formula 3]}$$

for $i = 1, \ldots, L$ if $\rho(i) = (t, \vec{v}_i := (v_{i,1}, \ldots, v_{i,n_t}))$, $$c_i^{enc} := (\overbrace{s_i \vec{e}_{t,1} + \theta_i \vec{v}_i}^{n_t})_{B_t},$$

if $\rho(i) = \neg (t, \vec{v}_i)$, $$c_i^{enc} := (\overbrace{s_i \vec{v}_i}^{n_t})_{B_t},$$

$$c_{d+1}^{enc} = m \cdot g_T^\zeta$$

where $$\vec{f} \xleftarrow{U} F_q^r,$$

$$\vec{s}^T := (s_1, \ldots, s_L)^T := M \cdot \vec{f}^T,$$

$$s_0 := \vec{1} \cdot \vec{f}^T,$$

$$\rho, \zeta, \theta_i \xleftarrow{U} F_q,$$

$M$ is a matrix with $L$ rows and $r$ columns,

-continued $$c_0^{renc} := \left(c_0^{enc} + (\zeta', -s_0', \rho'(verk, 1))_{B_0}\right)W_2 \quad \text{[Formula 4]}$$

for $i = 1, \ldots, L$ if $\rho(i) = (t, \vec{v}_i)$, $$c_i^{enc} := c_i^{enc} + (\overbrace{s_i' \vec{e}_{t,1} + \theta_i' \vec{v}_i}^{n_t})_{B_t},$$

if $\rho(i) = \neg(t, \vec{v}_i)$, $$c_i^{renc} := c_i^{enc} + (\overbrace{s_i' \vec{v}_i}^{n_t})_{B_t},$$

$$c_{d+1}^{renc} = c_{d+1}^{enc} \cdot g_T^{\zeta'}$$

where $\vec{f}' \xleftarrow{R} F_q^r$, $\vec{s}'^T := (s_1', \ldots, s_L')^T := M \cdot \vec{f}'^T$, $s_0' := \vec{1} \cdot \vec{f}'^T$, $\rho', \zeta', \theta_i' \xleftarrow{U} F_q$ $$k_0^{*renc} := k_0^{*rk} + (0, \delta'', \sigma(-1, verk))_{D_0^*}, \quad \text{[Formula 5]}$$

$$k_t^{*renc} := k_t^{*rk} + (\overbrace{\delta'' \vec{x}_t}^{n_t})_{B_0^*}, \text{ for } (t, \vec{x}_t) \in \Gamma$$

where $\delta'', \sigma \xleftarrow{U} F_q$, $D_0^* := B_0^* W_1$ $$\tilde{k}_0^* := k_0^{*renc} W_1^{-1}, \quad \text{[Formula 6]}$$
$$\tilde{c}_0 := c_0^{renc} W_2^{-1},$$
$$\tilde{k}_0^* := k_0^{*renc} \tilde{W}_1^{-1},$$
$$\tilde{c}_0 := c_0^{renc} \tilde{W}_2^{-1}$$

$$\tilde{K} := e(\tilde{c}_0, \tilde{k}_0^*) \cdot \prod_{i \in I \wedge \rho(i) = (t, \vec{v}_i)} e(c_t^{renc}, k_i^{*renc}) \quad \text{[Formula 7]}$$

$$\alpha_i \cdot \prod_{i \in I \wedge \rho(i) = \neg(t, \vec{v}_i)} e(c_t^{renc}, k_i^{*renc})^{\alpha_i/(\vec{v}_i \cdot \vec{x}_t)}$$

$m := c_{d+1}^{enc} / \tilde{K}$ where $\vec{1} = \sum_{i \in I} \alpha_i M_i$ where $M_i$ is the $i$-th row of $M$, and $I \subseteq$ $\{i \in \{1, \ldots, L\} \mid [\rho(i) = (t, \vec{v}_i) \wedge (t, \vec{x}_t) \in \Gamma \wedge \vec{v}_i \cdot \vec{x}_t = 0] \vee [$
$\rho(i) = \neg(t, \vec{v}_i) \wedge (t, \vec{x}_t) \in \Gamma \wedge \vec{v}_i \cdot \vec{x}_t \neq 0]\}$.

6. The hardware-including cryptographic system according to claim 4,
wherein the decryption key $k^{*rk}$ generation part generates the decryption key $k^{*rk}$ including $k^{*rk}_0$ and $k^{*rk}_i$ indicated in Formula 9 from the decryption key $k^*$ including $k^*_0$ and $k^*_i$ indicated in Formula 8,
wherein the ciphertext receiving part receives the ciphertext $c^{enc}$ including $c^{enc}_0$, $c^{enc}_t$, and $c^{enc}_{d+1}$ indicated in Formula 10,
wherein the ciphertext $c^{renc}$ generation part generates the ciphertext $c^{renc}$ including $c^{renc}_0$, $c^{renc}_t$, an $c^{renc}_{d+1}$ indicated in Formula 11,
wherein the decryption key $k^{*renc}$ generation part generates the decryption key $k^{*renc}$ including $k^{*renc}_0$ and $k^{*renc}_i$ indicated in Formula 12,
wherein the conversion part generates $k^{*\sim}_0$ and $c^{\sim}_0$ indicated in Formula 13, and
wherein the decryption part computes a message m indicated in Formula 14, $$k_0^* := (1, s_0, 0, 0)_{B_0^*}, \quad \text{[Formula 8]}$$

for $i = 1, \ldots L$ if $\rho(i) = (t, \vec{v}_i := (v_{i,1}, \ldots, v_{i,n_t}))$, $$k_i^* := (\overbrace{s_i \vec{e}_{t,1} + \theta_i \vec{v}_i}^{n_t})_{B_t},$$

if $\rho(i) = \neg(t, \vec{v}_i)$, $$k_i^* := (\overbrace{s_i \vec{v}_i}^{n_t})_{B_0^*}$$

where $\theta_i \xleftarrow{U} F_q$, $\vec{f}_t \xleftarrow{U} F_q^r$, $\vec{s}^T := (s_1, \ldots, s_L)^T := M \cdot \vec{f}^T$, $s_0 := \vec{1} \cdot \vec{f}^T$, $M$ is a matrix with $L$ rows and $r$ columns, and
$n_t$ is an integer of 1 or more, $$k_0^{*rk} := \left(k_0^* + (0, -s_0', 0, 0)_{B_0^*}\right)W_1 \quad \text{[Formula 9]}$$

for $i = 1, \ldots L$ if $\rho(i) = (t, \vec{v}_i)$, $$k_i^{*rk} := k_i^* (\overbrace{s_i' \vec{e}_{t,1} + \theta_i' \vec{v}_i}^{n_t})_{B_0^*},$$

if $\rho(i) = \neg(t, \vec{v}_i)$, $$k_i^{*rk} := (\overbrace{s_i' \vec{v}_i}^{n_t})_{B_0^*}$$

where $\theta_i' \xleftarrow{U} F_q$, $\vec{f}_t' \xleftarrow{U} F_q^r$, $\vec{s}'^T := (s_1', \ldots, s_L')^T := M \cdot \vec{f}'^T$, $s_0' := \vec{1} \cdot \vec{f}'^T$ $$c_0^{enc} := (\zeta, \delta, \rho(verk, 1))_{B_0}, \quad \text{[Formula 10]}$$

$$c_t^{enc} := (\overbrace{\delta \vec{x}_t}^{n_t})_{B_t}, \text{ for } (t, \vec{x}_t) \in \Gamma$$

$$c_{d+1}^{enc} = m \cdot g_T^{\zeta}$$

where $\zeta, \delta, \rho \xleftarrow{U} F_q$, $\Gamma = (\{(t, \vec{x}_t), 1 \leq t \leq d\}$, $d$ is an integer of 1 or more, $$c_0^{renc} := \left(c_0^{enc} + (\zeta', -\delta', \rho'(verk, 1))_{B_0}\right)W_2, \quad \text{[Formula 11]}$$

$$c_t^{renc} := c_t^{enc} + (\overbrace{\delta' \vec{x}_t}^{n_t})_{B_t} \text{ for } (t, x_t) \in \Gamma,$$

$$c_{d+1}^{renc} = c_{d+1}^{enc} \cdot g_T^{\zeta'}$$

where $\zeta', \delta', \rho' \xleftarrow{U} F_q$

-continued $$k_0^{*renc} := k_0^{*rk} + (0, -s_0'', \sigma(-1, verk))_{D_0^*},$$ [Formula 12]

for $i = 1, \ldots, L$ if $\rho(i) = (t, \vec{v}_i)$, $$k_i^{*renc} := k_i^{*rk} (\overline{s_i'' \vec{e}_{t,1} + \theta_i'' \vec{v}_i})_{B_0^*},$$

if $\rho(i) = \neg (t, \vec{v}_i)$, $$k_i^{*renc} := k_i^{*rk} + (\overline{s_i'' \vec{v}_i})_{B_0^*}$$

where $$\vec{f}'' \xleftarrow{R} F_q^r,$$

$$\vec{s}''^T := (s_1'', \ldots, s_L'')^T := M \cdot \vec{f}''^T,$$

$$s_0'' := \vec{1} \cdot \vec{f}''^T,$$

$$\sigma, \theta_i'' \xleftarrow{U} F_q$$

$$\tilde{k}_0^* := k_0^{*renc} W_1^{-1},$$ [Formula 13]

$$\tilde{c}_0 := c_0^{renc} W_2^{-1},$$

$$\tilde{k}_0^* := k_0^{*renc} \tilde{W}_1^{-1},$$

$$\tilde{c}_0 := c_0^{renc} \tilde{W}_2^{-1}$$

$$\tilde{K} := e(\tilde{c}_0, \tilde{k}_0^*) \cdot \prod_{i \in I \wedge \rho(i)=(t,\vec{v}_i)} e(c_t^{renc}, k_i^{*renc}) $$ [Formula 14]

$$\alpha_i \cdot \prod_{i \in I \wedge \rho(i)=\neg(t,\vec{v}_i)} e(c_t^{renc}, k_i^{*renc}) \alpha_i / (\vec{v}_i \cdot \vec{x}_t)$$

$$m := c_{d+1}^{enc} / \tilde{K}$$

where $$\vec{1} = \sum_{i \in I} \alpha_i M_i$$

where $M_i$ is the $i$-th row of $M$,
and $I \subseteq$ $\{i \in \{1, \ldots, L\} \mid [\rho(i) = (t, \vec{v}_i) \wedge (t, \vec{x}_t) \in \Gamma \wedge \vec{v}_i \cdot \vec{x}_t = 0] \vee$
$[\rho(i) = \neg (t, \vec{v}_i) \wedge (t, \vec{x}_t) \in \Gamma \wedge \vec{v}_i \cdot \vec{x}_t \neq 0]\}.$ 7. A re-encryption key generation hardware-including device of a hardware-including cryptographic system that implements a proxy re-encryption function in a cryptographic scheme according to which when two pieces of information correspond to each other, a ciphertext which is set to one of the two pieces of information which is decrypted with a decryption key which is set to the other one of the two pieces of information, the re-encryption key generation hardware-including device comprising:
  a decryption key $k^{*rk}$ generation part that generates a decryption key $k^{*rk}$ by converting, using conversion information $W_1$, a decryption key $k^*$ which is set to one of attribute information x and attribute information v corresponding to each other;
  a conversion information $W_1$ encryption part that generates encrypted conversion information $\psi^{rk}$ by encrypting the conversion information $W_1$ with one of attribute information x' and attribute information v' corresponding to each other being set; and
  a re-encryption key transmission part that transmits to a re-encryption hardware-including device the decryption key $k^{*rk}$ and the encrypted conversion information $\psi^{rk}$, as a re-encryption key rk.

8. A re-encryption hardware-including device of a hardware-including cryptographic system that implements a proxy re-encryption function in a cryptographic scheme according to which when two pieces of information correspond to each other, a ciphertext which is set to one of the two pieces of information which is decrypted with a decryption key which is set to the other one of the two pieces of information, the re-encryption hardware-including device comprising:
  a re-encryption key receiving part that receives, as a re-encryption key rk, a decryption key $k^{*rk}$ which is generated by converting, using conversion information $W_1$, a decryption key $k^*$ which is set to one of attribute information x and attribute information v corresponding to each other, and encrypted conversion information $\psi^{rk}$ which is generated by encrypting the conversion information $W_1$ with one of attribute information x' and attribute information v' corresponding to each other being set;
  a ciphertext receiving part that receives a ciphertext $c^{enc}$ which is set to the other one of the attribute information x and the attribute information v;
  a ciphertext $c^{renc}$ generation part that generates a ciphertext $c^{renc}$ by setting at least one of additional information H and additional information $\Theta$ corresponding to each other in the ciphertext $c^{enc}$ received by the ciphertext receiving part;
  a decryption key $k^{*renc}$ generation part that generates a decryption key $k^{*renc}$ by setting at least the other one of the additional information H and the additional information $\Theta$ in the decryption key $k^{*rk}$ included in the re-encryption key rk; and
  a re-encrypted ciphertext transmission part that transmits the ciphertext $c^{renc}$, the decryption key $k^{*renc}$, and the encrypted conversion information $\psi^{rk}$, as a re-encrypted ciphertext CT.

9. A cryptographic method for implementing a proxy re-encryption function in a cryptographic scheme according to which when two pieces of information correspond to each other, a ciphertext which is set to one of the two pieces of information which is decrypted with a decryption key which is set to the other one of the two pieces of information, the cryptographic method comprising:
  generating a decryption key $k^{*rk}$ by converting, using conversion information $W_1$, a decryption key $k^*$ which is set to one of attribute information x and attribute information v corresponding to each other, by a re-encryption key generation hardware-including device;
  generating encrypted conversion information $\psi^{rk}$ by encrypting the conversion information $W_1$ with one of attribute information x' and attribute information v' corresponding to each other being set, by the re-encryption key generation hardware-including device;
  transmitting to a re-encryption device the decryption key $k^{*rk}$ and the encrypted conversion information $\psi^{rk}$, as a re-encryption key rk, by the re-encrypted key generation hardware-including device;
  receiving a ciphertext $c^{enc}$ which is set to the other one of the attribute information x and the attribute information v, by the re-encryption hardware-including device;
  generating a ciphertext $c^{renc}$ by setting at least one of additional information H and additional information $\Theta$ corresponding to each other in the ciphertext $c^{enc}$, by the re-encryption hardware-including device;
  generating a decryption key $k^{*renc}$ by setting at least the other one of the additional information H and the additional information $\Theta$ in the decryption key $k^{*rk}$ included in the re-encryption key rk, by the re-encryption hardware-including device; and transmitting the ciphertext $c^{renc}$, the decryption key $k^{*renc}$, and the encrypted conversion information $\psi^{rk}$, as a re-encrypted ciphertext CT, by the re-encryption hardware-including device.

10. A non-transitory computer readable medium storing a cryptographic program that implements a proxy re-encryption function in a cryptographic scheme according to which when two pieces of information correspond to each other, a ciphertext which is set to one of the two pieces of information which is decrypted with a decryption key which is set to the other one of the two pieces of information, the cryptographic program comprising a non-transitory re-encryption key generation program product and a non-transitory re-encryption program product, the non-transitory re-encryption key generation program product causing a computer to execute a decryption key $k^{*rk}$ generation process of generating a decryption key $k^{*rk}$ by converting, using conversion information $W_1$, a decryption key $k^*$ which is set to one of attribute information x and attribute information v corresponding to each other;

a conversion information $W_1$ encryption process of generating encrypted conversion information $\psi^{rk}$ by encrypting the conversion information $W_1$ with one of attribute information x' and attribute information v' corresponding to each other being set; and a re-encryption key transmission process of transmitting to the non-transitory re-encryption program product the decryption key $k^{*rk}$ and the encrypted conversion information $\psi^{rk}$, as a re-encryption key rk, the non-transitory re-encryption program product causing a computer to execute a ciphertext receiving process of receiving a ciphertext $c^{enc}$ which is set to the other one of the attribute information x and the attribute information v;

a ciphertext $c^{renc}$ generation process of generating a ciphertext $c^{renc}$ by setting at least one of additional information H and additional information $\Theta$ corresponding to each other in the ciphertext $c^{enc}$ received in the ciphertext receiving process;

a decryption key $k^{*renc}$ generation step of generating a decryption key $k^{*renc}$ by setting at least the other one of the additional information H and the additional information $\Theta$ in the decryption key $k^{*rk}$ included in the re-encryption key rk; and a re-encrypted ciphertext transmission process of transmitting the ciphertext $c^{renc}$, the decryption key $k^{*renc}$, and the encrypted conversion information $\psi^{rk}$, as a re-encrypted ciphertext CT.

* * * * *